(12) United States Patent
Komatsu et al.

(10) Patent No.: US 7,867,581 B2
(45) Date of Patent: Jan. 11, 2011

(54) RETARDATION FILM AND LIQUID CRYSTAL DISPLAY DEVICE USING THE SAME

(75) Inventors: Shinichi Komatsu, Yokohama (JP); Toshikatsu Shoko, Yokohama (JP); Tadahiro Kaminade, Yokohama (JP)

(73) Assignee: Nippon Oil Corporation, Minato-ku, Tokyo (JP)

( * ) Notice: Subject to any disclaimer, the term of this patent is extended or adjusted under 35 U.S.C. 154(b) by 0 days.

(21) Appl. No.: 12/379,533

(22) Filed: Feb. 24, 2009

(65) Prior Publication Data

US 2009/0156770 A1    Jun. 18, 2009

Related U.S. Application Data

(63) Continuation-in-part of application No. PCT/JP2007/066129, filed on Aug. 20, 2007.

(30) Foreign Application Priority Data

Aug. 25, 2006   (JP)   .............................. 2006-229363
Jun. 21, 2007   (JP)   .............................. 2007-164285

(51) Int. Cl.
*C09K 19/38*   (2006.01)
*G02F 1/00*    (2006.01)
*C08G 61/06*   (2006.01)

(52) U.S. Cl. ..................... 428/1.1; 526/281; 526/348.1; 349/117

(58) Field of Classification Search ................. 526/281, 526/348.1; 428/1.1; 349/117
See application file for complete search history.

(56) References Cited

U.S. PATENT DOCUMENTS 5,219,966 A * 6/1993 Asrar .......................... 526/262
5,612,801 A   3/1997 Winker
6,790,579 B1 * 9/2004 Goodall et al. ............... 430/170
7,101,496 B2 * 9/2006 Sekiguchi et al. ........... 252/585
2004/0152843 A1   8/2004 Taguchi et al.
2004/0242823 A1  12/2004 Sekiguchi
2005/0148746 A1   7/2005 Taguchi et al.

FOREIGN PATENT DOCUMENTS

| JP | 10-068816 | 3/1998 |
| JP | 2001-194527 | 7/2001 |
| JP | 2002-048919 | 2/2002 |
| JP | 2002-363263 | 12/2002 |
| JP | 2003-255102 | 9/2003 |
| JP | 2003-292586 | 10/2003 |
| JP | 2004-176051 | 6/2004 |
| JP | 2004-323489 | 11/2004 |
| JP | 2005-036201 | 2/2005 |

* cited by examiner

*Primary Examiner*—Fred M Teskin
(74) *Attorney, Agent, or Firm*—Fitch, Even, Tabin & Flannery

(57) ABSTRACT

A retardation film, formed by stretching a film including a norbornene-based, ring-opening polymer containing a structural unit (A) represented by a formula (1), has high transparency, excellent wavelength dispersion characteristics in a single layer, is capable of providing specific retardation to broadband light, is extremely adhesive to other materials, is capable of attaining optical characteristics that are unique among negative birefringence characteristics, and is capable of providing a reverse dispersion of birefringence wavelength dispersion characteristics. The present invention also provides a liquid crystal display device using the foregoing film.

12 Claims, 8 Drawing Sheets

RETARDATION FILM AND LIQUID CRYSTAL DISPLAY DEVICE USING THE SAME

CROSS-REFERENCE TO RELATED APPLICATIONS

This is a continuation-in-part of International Application No. PCT/JP2007/066119, filed on Aug. 20, 2007, designating the U.S. and claiming the benefit of Japanese Patent Application No. JP2006-229363, filed on Aug. 25, 2006, and Japanese Patent Application No. JP2007-164285, filed on Jun. 21, 2007. The entire disclosures of the prior applications are hereby incorporated by reference herein in their entireties.

BACKGROUND OF THE INVENTION

1. Field of the Invention

The present invention relates to a retardation film and a liquid crystal display device using the retardation film, and, in particular, relates to a retardation film which is suitably applicable to a ½λ plate, a ¼λ plate, a protection film, an anti-reflection film, and the like, and to a liquid crystal display device using the retardation film.

2. Related Background Art

In liquid crystal display devices, such as liquid crystal display (LCD), a retardation film having a controlled optical anisotropy is used for the purpose of optical compensation. Conventionally, materials like polycarbonate and cyclic polyolefin, which have positive birefringences, have been mainly employed.

Under such a circumstance, norbornene-based ring-opening polymers based on norbornene derivatives, which are especially highly reactive among cyclic polyolefins, as precursors, have been developed. For example, Japanese Unexamined Patent Application Publication No. 2003-255102 (Document 1), Japanese Unexamined Patent Application Publication No. 2004-176051 (Document 2), and Japanese Unexamined Patent Application Publication No. 2004-323489 (Document 3) each disclose an optical film made of a specific norbornene-based ring-opening polymer. However, such conventional norbornene-based ring-opening polymers disclosed in Documents 1 to 3 do not have a sufficient adhesiveness to other materials, and do not sufficiently achieve negative birefringences which are expected to be utilized for a reverse wavelength dispersion film and the like.

Meanwhile, U.S. Pat. No. 5,612,801 (Document 4) discloses a so-called negative A-plate retardation film which exhibits optical characteristics unique even among negative birefringence characteristics. However, such conventional materials like polystyrene and polymethyl methacrylate which have negative birefringences do not have a sufficiently high heat resistance, and it has been difficult to obtain a negative A-plate retardation film made of any of these materials.

In addition, various studies have been conducted on retardation films (broadband retardation plate: reverse wavelength dispersion film) providing a ¼ wavelength retardation in a wide wavelength range of the entire visible light region (400 to 800 nm), which is required for the applications of LCDs, pickups for optical disks, and the like. For example, Japanese Unexamined Patent Application Publication No. Hei 10-68816 (Document 5) discloses a retardation film in which two retardation films are pasted and laminated in a substantially orthogonal direction. Furthermore, Japanese Patent Unexamined Application Publication 2002-48919 (Document 6) discloses a retardation film which is obtained by polycondensation of two kinds of monomers, and which exhibits positive or negative inherent birefringence. Furthermore, Japanese Unexamined Patent Application Publication 2001-194527 (Document 7) discloses a retardation film which is obtained by alloying of polymers exhibiting positive and negative inherent birefringences. Japanese Unexamined Patent Application Publication 2005-36201 (Document 8) discloses a retardation film which is obtained by ring-opening (co)polymerization of two kinds of norbornene-based monomers exhibiting positive or negative inherent birefringence after the polymerization.

However, in the retardation film disclosed in Document 5, it is necessary that two films be pasted with each other using an adhesive agent in the production. Accordingly, there have been problems, in productivity, that the yield is lowered due to the complicated production process, and that the cost is high. Meantime, in the conventional retardation films disclosed in Documents 6 to 8, white turbidity is frequently formed by phase separation in blending during the production because polymers are difficult to be mixed with each other. Accordingly, it is difficult to use the obtained retardation film for optical applications. Furthermore, since monomers exhibiting negative birefringence which are used in the production of these retardation films have a special structure, there is a problem that the production is difficult and costly.

SUMMARY OF THE INVENTION

The present invention has been made in consideration of the above-described problems in the conventional techniques. An object of the present invention is to provide a retardation film: having high transparency and excellent wavelength dispersion characteristics in a single layer; being capable of providing a specific retardation to broadband light; having an extremely high adhesiveness to other materials; being further capable of attaining optical characteristics as a negative A which are unique even among negative birefringence characteristics; and being also capable of providing a reverse dispersion of birefringence wavelength dispersion characteristics. An object of the present invention is also to provide a liquid crystal display device using the same.

The present inventors have earnestly studied in order to achieve the above object. As a result, the inventors have revealed that, by using a norbornene-based ring-opening polymer including a structural unit represented by a specific structural formula, and by setting a proportion of an exo isomer of the structural unit included in the polymer to be in a specific range, it is possible to obtain a retardation film: having high transparency and excellent wavelength dispersion characteristics in a single layer; being capable of providing a specific retardation to broadband light; having an extremely high adhesiveness to other materials; being further capable of attaining optical characteristics as a negative A which are unique even among negative birefringence characteristics; and being also capable of providing reverse dispersion of birefringence wavelength dispersion characteristics. This discovery has led the inventors to complete the present invention.

To be more specific, a retardation film of the present invention is the one formed by stretching a film comprising a norbornene-based ring-opening polymer containing structural units (A) represented by the following general formula (1):

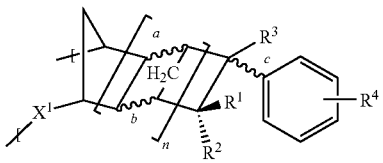
(1)

[in the formula (1), n represents an integer of any one of 0 and 1,

X$^1$ represents any one of a group represented by a formula: —CH=CH— and a group represented by a formula: —CH$_2$CH$_2$—, R$^1$, R$^2$, R$^3$, and R$^4$, which may be the same or different, each represent any one of atoms and groups selected from the group consisting of: a hydrogen atom; halogen atoms; substituted or unsubstituted hydrocarbon groups, each of which may include at least one of linking group selected from the group consisting of an oxygen atom, a nitrogen atom, a sulfur atom, and a silicon atom, and which has 1 to 30 carbon atoms; and polar groups, wavy lines a and b each represent a configuration of any one of an endo and an exo, and a wavy line c represents a configuration of any one of an endo and an exo], wherein a content percentage of a structural unit (A-1), in which the wavy line c represents an exo configuration, among the structural units (A) is in a range from 20 mol % to 100 mol %.

Such a retardation film of the present invention is capable of having reverse dispersion as wavelength dispersion characteristics of birefringence. From the perspective of causing such reverse dispersion characteristics to be exhibited, in the above retardation film of the present invention, the content percentage of the structural unit (A-1), in which the wavy line c represents the exo configuration, among the structural units (A) is preferably in a range from 20 mol % to 65 mol %, and also the retardation film is preferably a reverse dispersion retardation film.

Furthermore, in the above retardation film of the present invention, optical characteristics as a negative A can also be achieved which are unique even among negative birefringence. From the perspective of attaining optical characteristics as a negative A, the retardation film of the present invention preferably has the content percentage of the structural unit (A-1), in which the wavy line c represents the exo configuration, among the structural units (A) in a range between above 65 mol % and 100 mol % or less, and also the retardation film is preferably a negative A-plate retardation film.

Here, the optical characteristics as a negative A refer to an X-axis refractive index (Nx), a Y-axis refractive index (Ny), and a Z-axis refractive index (Nz) satisfying a relationship expressed by a following relational expression (1):

$$Ny=Nz>Nx \qquad (1),$$

when a stretching direction in uniaxial stretching of the film is defined as X-axis, and directions orthogonal to the X-axis are defined as Y-axis and Z-axis, respectively. Accordingly, the retardation film of the present invention preferably satisfies the condition expressed by the above relational expression (1). Then, according to a negative A-plate retardation film satisfying such a condition, view angle improvement, color improvement and the like, which are conventionally difficult, in TFT-LCD and TN-TFT are possible.

Furthermore, in the above retardation film of the present invention, the content percentage of a structural unit, in which X$^1$ in the general formula (1) represents a group represented by a formula —CH$_2$CH$_2$—, to all structural units in the norbornene-based ring-opening polymer is preferably not less than 90 mol %.

In the above retardation film of the present invention, the norbornene-based ring-opening polymer may be a norbornene-based ring-opening copolymer which further contains a structural unit (B) represented by a general formula (3) described below. In such a case, the structural unit (A) is preferably a structural unit (A') represented by a general formula (2) described below, and a content percentage of a structural unit (A'-1), in which the configuration of a substituted or unsubstituted phenyl group in a general formula (2) described below is an exo configuration, to a total amount of structural units (A') is preferably in a range not less than 90 mol %. To be more specific, in the retardation film of the present invention, the norbornene-based ring-opening polymer is preferably a norbornene-based ring-opening copolymer containing the structural unit (A') represented by the following general formula (2):

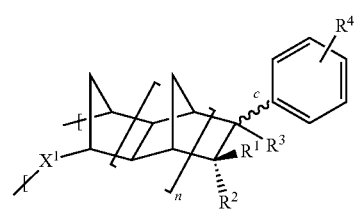
(2)

[in the formula (2), n, X$^1$, R$^1$, R$^2$, R$^3$, R$^4$, and a wavy line c are respectively synonymous with n, X$^1$, R$^1$, R$^2$, R$^3$, R$^4$, and the wavy line c in the above general formula (1)]; and the structural unit (B) represented by the following general formula (3):

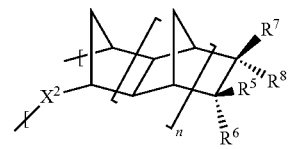
(3)

[in the formula (3), n represents an integer of any one of 0 and 1,

X$^2$ represents any one of a group represented by a formula: —CH=CH— and a group represented by a formula: —CH$_2$CH$_2$—, R$^5$, R$^6$, R$^7$, and R$^8$, which may be the same or different, each represent any one of atoms and groups selected from the group consisting of: a hydrogen atom; halogen atoms; a cyano group; alkyl groups having 1 to 20 carbon atoms; alkenyl groups having 1 to 20 carbon atoms; alkyl carbonyl groups having 1 to 20 carbon atoms; and ester groups comprising hydrocarbon groups having 1 to 20 carbon atoms, any two or more of R$^5$ to R$^8$ may link with each other to form a monocyclic hydrocarbon, which may contain an unsaturated bond, having 3 to 20 carbon atoms, or a polycyclic hydrocarbon, which may contain an unsaturated bond, having 4 to 20 carbon atoms, and $R^5$ and $R^6$ or $R^7$ and $R^8$ may form together an alkylidene group having 1 to 20 carbon atoms].

In the above retardation film of the present invention, the norbornene-based ring-opening polymer is preferably a norbornene-based ring-opening copolymer having a content percentage of the structural unit (A'-1), in which a configuration of a substituted or unsubstituted phenyl group in the general formula (2) is an exo configuration, among the structural units (A') being in a range not less than 90 mol %. As described above, in the present invention, even in the case of using, as the norbornene-based ring-opening polymer, a norbornene-based ring-opening copolymer, which contains the structural unit (A') represented by the above general formula (2) and the structural unit (B) represented by the above general formula (3), and has a proportion of the structural unit (A'-1) in a specific range, it is possible, in a single layer, to have high transparency and excellent wavelength dispersion characteristics, to provide a specific retardation to broadband light, to have an extremely high adhesiveness to other materials, to attain optical characteristics as a negative A which are unique even among negative birefringence characteristics, and to provide reverse dispersion of birefringence wavelength dispersion characteristics.

In the above retardation film of the present invention, even in the case where the norbornene-based ring-opening polymer is the norbornene-based ring-opening copolymer containing the structural unit (A') and the structural unit (B), it is possible to make a wavelength dispersion characteristics of birefringence into a reverse dispersion. Then, from the perspective of causing such reverse dispersion characteristics to be exhibited in the case where the norbornene-based ring-opening polymer is the norbornene-based ring-opening copolymer containing the structural unit (A') and the structural unit (B), in the above retardation film of the present invention, a proportion of the structural unit (A'-1) to all the structural units of the norbornene-based ring-opening copolymer is preferably in a range from 40 mol % to less than 80 mol %, and the retardation film is preferably a reverse dispersion retardation film.

Furthermore, in the above-described retardation film of the present invention, even in the case where the norbornene-based ring-opening polymer is the norbornene-based ring-opening copolymer containing the structural unit (A') and the structural unit (B), optical characteristics as a negative A which are unique even among negative birefringence can also be achieved. Then, from the perspective of attaining optical characteristics as a negative A in the case where the norbornene-based ring-opening polymer is the norbornene-based ring-opening copolymer containing the structural unit (A') and the structural unit (B), as above retardation film of the present invention, a proportion of the structural unit (A'-1) to all the structural units contained in the norbornene-based ring-opening copolymer is preferably in a range from 80 mol % to 99 mol %, and the retardation film is preferably a negative A-plate retardation film.

It should be noted that, as described above, optical characteristics as a negative A refers to satisfying the relationship expressed by the above relational expression (1). Accordingly, even when the norbornene-based ring-opening polymer is the norbornene-based ring-opening copolymer containing the structural unit (A') and the structural unit (B), the retardation film of the present invention preferably satisfies the condition expressed by the above relational expression (1).

Furthermore, when the norbornene-based ring-opening polymer is the norbornene-based ring-opening copolymer containing the structural unit (A') and the structural unit (B), it is preferable that a structural unit in which $X^1$ in the above general formula (2) represents a group represented by a formula —$CH_2CH_2$— and a structural unit in which $X^2$ in the above general formula (3) represents a group represented by a formula —$CH_2CH_2$— be contained in the above retardation film of the present invention at a proportion not less than 90 mol % to all structural units in the norbornene-based ring-opening polymer.

In addition, the liquid crystal display device of the present invention is the one comprising the above retardation film of the present invention.

According to the present invention, it is possible to provide a retardation film: having high transparency and an excellent wavelength dispersion characteristics in a single layer; being capable of providing a specific retardation to broadband light; having an extremely high adhesiveness to other materials; being further capable of attaining optical characteristics as a negative A which are unique among negative birefringence characteristics; and being also capable of providing reverse dispersion of birefringence wavelength dispersion characteristics. It is also possible to provide a liquid crystal display device using the same.

Moreover, such a retardation film of the present invention can be made into a thin film. In addition, since having a simplified production process, the retardation film of the present invention can be produced in good yield and at low cost.

DETAILED DESCRIPTION OF THE PREFERRED EMBODIMENTS

Figure 1:
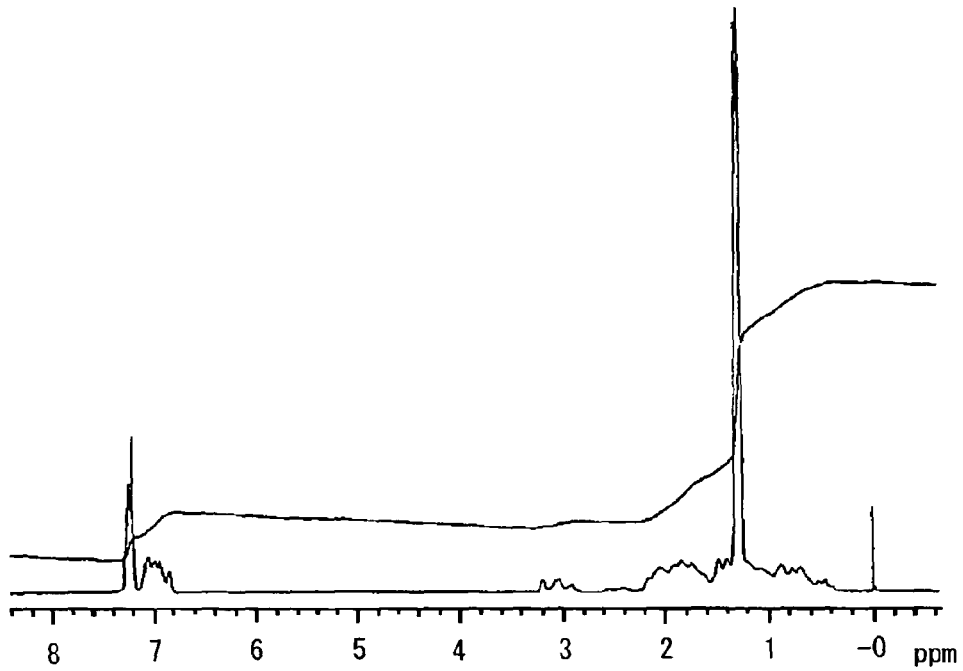
FIG. 1 is an NMR chart of a hydrogenated norbornene ring-opening polymer (HpA) obtained in Synthesis Example 1.

The present invention will be described in detail below according to preferred embodiments.

Firstly, the retardation film of the present invention will be described. To be more specific, the retardation film of the present invention is the one formed by stretching a film: comprising a norbornene-based ring-opening polymer including a structural unit (A) represented by the following general formula (1):

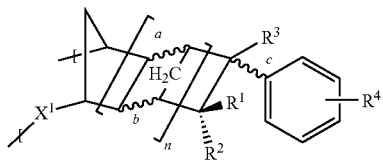

(1)

[in the formula (1), n represents an integer of any one of 0 and 1, $X^1$ represents any one of a group represented by a formula: —CH=CH— and a group represented by a formula: —CH$_2$CH$_2$—, $R^1$, $R^2$, $R^3$, and $R^4$, which may be the same or different, each represent any one of atoms and groups selected from the group consisting of: a hydrogen atom; halogen atoms; hydrocarbon groups, each of which may include at least one of linking group selected from the group consisting of an oxygen atom, a nitrogen atom, a sulfur atom, and a silicon atom, and which has 1 to 30 substituted or unsubstituted carbon atoms; and polar groups, wavy lines a and b each represent a configuration of any one of an endo or an exo, and a wavy line c represents an endo or exo configuration.];
wherein a content percentage of a structural unit (A-1), in which the wavy line c represents an exo configuration, among the structural units (A) is in a range from 20 mol % to 100 mol %.

An example of such a norbornene-based ring-opening polymer according to the present invention is the one which comprises the structural unit (A) represented by the above general formula (1), and which has an aromatic ring as a substituent, and in which a cyclopentane ring obtained by ring-opening polymerization of a norbornene monomer and the aromatic ring are linked with each other directly or by a bicyclo structure.

In the meantime, in the structural unit (A), n in the general formula (1) represents an integer of 0 or 1. The norbornene-based ring-opening polymer may be a homopolymer comprising a structural unit (A) in which n in the general formula (1) is 0 or 1, and may also be a copolymer comprising a structural unit (A) in which n in the general formula (1) is 0 and a structural unit (A) in which n in the general formula (1) is 1. The n value can be adjusted appropriately according to an intended design in order to control optical characteristics and various properties of a norbornene-based ring-opening polymer to be obtained in a balanced manner. In other words, by changing the n value appropriately, different norbornene-based ring-opening copolymers can be formed appropriately according to purposes.

Meanwhile, wavy lines a and b in the general formula (1) each represent a configuration of any one of an endo and an exo. In the present invention, a proportion of structural units in which configurations represented by the wavy lines a and b are exo among all structural units (A) (to a total amount of structural units (A)) in the norbornene-based ring-opening polymer is preferably from 35 to 100 mol %, and more preferably from 65 to 100 mol %. If a content percentage of the structural units in which configurations represented by the wavy lines a and b are exo falls below 35 mol %, reverse dispersion characteristics are likely not to be exhibited. On the other hand, if the content percentage is 65 mol % or below, negative A characteristics are likely not to be exhibited.

Further, a wavy line c in the general formula (1) also represents a configuration of any one of endo and exo. In the present invention, a content percentage of a structural unit (A-1), in which the wavy line c represents an exo configuration, among all the structural units (A) in the norbornene-based ring-opening polymer is in a range from 20 to 100 mol % (more preferably in a range from 35 to 100 mol %). If a proportion of the structural unit (A-1), in which the wave line c represents an exo configuration, in a total amount of structural units (A) falls below 20 mol %, it is not possible to obtain a film exhibiting unique optical characteristics which are having a wavelength dispersion value of reverse dispersion. The wavy line c representing an exo configuration refers to a configuration of substituted or unsubstituted phenyl group linked to the wavy line c being an exo configuration. As a method for measuring birefringence Δn, a method for measuring by using a measurement apparatus called "KOBRA21DH" manufactured by Oji Scientific Instruments Co. may be adopted.

In addition, in the retardation film of the present invention, in order to attain reverse wavelength dispersion characteristics, a proportion of the structural unit (A-1), in which the wavy line c represents an exo configuration, to a total amount of structural units (A) in the norbornene-based ring-opening polymer is preferably in a range from 20 mol % to 65 mol % (more preferably in a range from 35 mol % to 65 mol %, further preferably in a range from 40 mol % to 60 mol %). In other words, the retardation film of the present invention can be formed as a reverse dispersion retardation film by setting a proportion of the structural unit (A-1), in which the wavy line c represents an exo configuration, to a total amount of structural units (A) in a range from 20 mol % to 65 mol % (more preferably in a range from 35 mol % to 65 mol %). If a proportion of the structural unit in which the wavy line c represents an exo configuration to a total amount of structural units (A) exceeds 65 mol %, it is difficult to attain reverse wavelength dispersion characteristics.

Moreover, in the retardation film of the present invention, in order to attain optical characteristics as a negative A, a proportion of the structural unit (A-1), in which the wavy line c represents an exo configuration, among all structural units (A) in the norbornene-based ring-opening polymer is preferably in a range between above 65 mol % and 100 mol % or less (more preferably in a range from 70 mol % to 100 mol %). In other words, the retardation film of the present invention can be formed as a negative A-plate retardation film by setting a proportion of the structural unit (A-1), in which the wavy line c represents an exo configuration, to a total amount of the structural units (A) in the norbornene-based ring-opening polymer in a range between above 65 mol % and 100 mol % or less. If a proportion of the structural unit (A-1), in which the wavy line c represents an exo configuration, to a total amount of structural units (A) in the norbornene-based ring-opening polymer is 65 mol % or less, optical characteristics as a negative A which are unique even among negative birefringence characteristics are unlikely to be achieved. Then, in the case where a stretching direction in uniaxial stretching of the film is defined as X-axis, and directions orthogonal to the X-axis as Y-axis and Z-axis, such a negative A-plate retardation film is preferably one having the X-axis refractive index (Nx), the Y-axis refractive index (Ny) and the Z-axis refractive index (Nz) satisfying a relationship expressed by the following relational expression (1):

$$Ny=Nz>Nx \tag{1}.$$

Here, as a method for measuring the refractive indexes (Nx, Ny, and Nz), a method for measuring by using a refractive index measurement apparatus called "2010 Prism Coupler" manufactured by Metricon Corp. may be adopted.

Note that, configurations respectively represented by the wavy lines a, b, and c can be adjusted appropriately by reaction conditions in the production of monomer, reaction processing after the production or the like. For example, configurations represented by the wavy lines a and b can be easily controlled by isomerization treatment after the production, while a configuration represented by the wavy line c can be controlled by reaction conditions in the production of monomer or heat treatment after the production.

Meanwhile, the substituents represented by $R^1$, $R^2$, $R^3$ and $R^4$ in the general formula (1), which may be the same or different, each represents any one of atoms and groups selected from the group consisting of: a hydrogen atom; halogen atoms; substituted or unsubstituted hydrocarbon groups, which may include at least one of linking group selected from the group consisting of an oxygen atom, a nitrogen atom, a sulfur atom, and a silicon atom, and which has 1 to 30 carbon atoms (more preferably 1 to 10); and polar groups.

As the substituted or unsubstituted hydrocarbon groups, which can be selected as $R^1$, $R^2$, $R^3$, and $R^4$, which may includes at least one of linking group selected from the group consisting of an oxygen atom, a nitrogen atom, a sulfur atom, and a silicon atom, and which has 1 to 30 carbon atoms, those having 1 to 10 carbon atoms are more preferable. Such a hydrocarbon group may be in a straight-chain form, a branched-chain form, or a cyclic form, and is not particularly limited. Examples of such a hydrocarbon group include an alkyl group, a cycloalkyl group, an alkenyl group, an alkynyl group, a phenyl group, and an aryl group. From the perspective of transparency and weather resistance, such a hydrocarbon group is preferably an alkyl group, a cycloalkyl group, a phenyl group, an aryl group, or the like. From the perspective of being capable of providing further excellent transparency and weather resistance by a retardation film to be obtained, alkyl groups, such as a tert-butyl group, are especially preferable among the above-listed substituents. In addition, as such a hydrocarbon group, any one of straight-chain hydrocarbon groups having a number of carbon atoms in a range from 1 to 5 and branch-chain hydrocarbon groups having 3 to 7 carbon atoms is preferable. Furthermore, as such a hydrocarbon group, saturated hydrocarbon groups are preferable.

In the meantime, examples of a polar group which can be selected as $R^1$, $R^2$, $R^3$, and $R^4$ include hydroxyl groups, mercapto groups, cyano groups, amino groups, carboxyl groups, sulfonic groups, and ester groups. Moreover, as the substituents represented by $R^1$, $R^2$, $R^3$, and $R^4$ in the general formula (1), from the perspective of being capable of providing higher heat resistance by a retardation film to be obtained, cyano groups and the like are preferable among the above-listed substituents. From the perspective of transparency and weather resistance, ester groups and the like are preferable.

Furthermore, from the perspective of availability (production efficiency) and the like of a monomer used for production of the norbornene-based ring-opening polymer, $R^1$, $R^2$, and $R^3$ in the general formula (1) are preferably a hydrogen atom, a fluorine atom, and a chlorine atom, independently, and especially preferably a hydrogen atom. From the perspective of availability (production efficiency) of a monomer used for production of the norbornene-based ring-opening polymer, $R^4$ in the general formula (1) is more preferably a branched-chain hydrocarbon group having 3 to 7 carbon atoms (further preferably a branched-chain hydrocarbon group having 3 to 5 carbon atoms, and especially preferably t-butyl group).

Meanwhile, $X^1$ in the general formula (1) is any one of a group represented by a formula —CH=CH— and a group represented by a formula —$CH_2CH_2$—. The norbornene-based ring-opening polymer according to the present invention may include the structural units (A) in each of which $X^1$ comprises only one of the above-described groups, or may include a mixture of structural units (A) in which $X^1$ comprises both of the above-described groups. In the norbornene-based ring-opening polymer according to the present invention, when a degree of hydrogenation is higher, in other words, when the number of double bonds in the main chain is smaller, the polymer is more stable. Accordingly, as a norbornene-based ring-opening polymer according to the present invention, a polymer to which sufficient hydrogen is added and which has a smaller number of double bonds in the main chain is preferable. From such a perspective, $X^1$ in the general formula (1) is preferably a group represented by a formula —$CH_2CH_2$—. Furthermore, a proportion of a structural unit (A), in which $X^1$ in the general formula (1) is a group represented by a formula —$CH_2CH_2$—, in all the structural units (A) in the norbornene-based ring-opening polymer is preferably 90 mol % (more preferably 95 mol %, and especially preferably 98 mol %) or above. If the proportion falls below 90 mol %, the stability of polymer is lowered, and it tends to be difficult to prevent coloring and deterioration caused by heat.

Furthermore, in the present invention, the norbornene-based ring-opening polymer is preferably a norbornene-based ring-opening copolymer comprising a structural unit (A') represented by the following general formula (2):

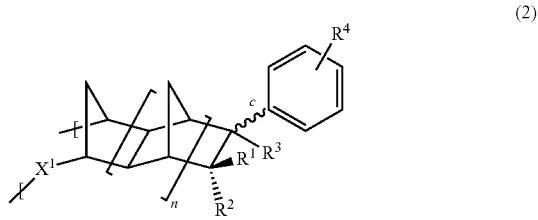

[in the formula (2), n, $X^1$, $R^1$, $R^2$, $R^3$, $R^4$ and the wavy line c are respectively synonymous with n, $X^1$, $R^1$, $R^2$, $R^3$, $R^4$, and the wavy line c in the above general formula (1)] and a structural unit (B) represented by the following general formula (3):

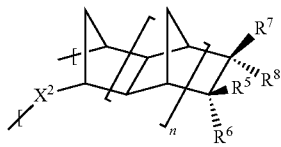

(3)

[in the formula (3), n represents an integer of any one of 0 and 1;

$X^2$ represents any one of a group represented by a formula —CH═CH— and a group represented by a formula —CH$_2$CH$_2$—;

$R^5$, $R^6$, $R^7$, and $R^8$, which may be the same or different, each represent any one of atoms and groups selected from the group consisting of a hydrogen atom, halogen atoms, a cyano group, alkyl groups having 1 to 20 carbon atoms, alkenyl groups having 1 to 20 carbon atoms, alkyl carbonyl groups having 1 to 20 carbon atoms, and ester groups comprising a hydrocarbon group having 1 to 20 carbon atoms;

any two or more of $R^5$ to $R^8$ may link with each other to form a monocyclic hydrocarbon, which may contain an unsaturated bond, having 3 to 20 carbon atoms, or a polycyclic hydrocarbon, which may contain an unsaturated bond, having 4 to 20 carbon atoms; and $R^5$ and $R^6$ or $R^7$ and $R^8$ may form together an alkylidene group having 1 to 20 carbon atoms]. The norbornene-based ring-opening copolymer is preferably a norbornene-based ring-opening copolymer having a content percentage of the structure unit (A'-1), in which a configuration of a substituted or unsubstituted phenyl group in the general formula (2) is an exo configuration, among the structural units (A') being in a range from 90 mol % and above.

In the general formula (2), n, $X^1$, $R^1$, $R^2$, $R^3$, $R^4$, and the wavy line c are synonymous with n, $X^1$, $R^1$, $R^2$, $R^3$, $R^4$, and the wavy line c in the above general formula (1). In addition, the structural unit (A'-1) is a structural unit in which the wavy line c in the general formula (2) represents an exo configuration.

Meanwhile, n in the above general formula (3) is the same as n in the above general formula (1). In addition, $X^2$ in the general formula (3) is the same as $X^1$ in the general formula (1).

In the meantime, substituents represented by $R^5$, $R^6$, $R^7$, and $R^8$ in the above general formula (3) may be the same or different, and each represent any one of atoms and groups selected from the group consisting of a hydrogen atom, halogen atoms, a cyano group, alkyl groups having 1 to 20 carbon atoms, alkenyl groups having 1 to 20 carbon atoms, alkyl carbonyl groups having 1 to 20 carbon atoms, and ester groups comprising a hydrocarbon group having 1 to 20 carbon atoms. Here, any two or more of $R^5$ to $R^8$ may link with each other to form a monocyclic hydrocarbon, which may contain an unsaturated bond, having 3 to 20 carbon atoms, or a polycyclic hydrocarbon, which may contain an unsaturated bond, having 4 to 20 carbon atoms. Alternatively, $R^5$ and $R^6$ together may form an alkylidene group having 1 to 20 carbon atoms, or $R^7$ and $R^8$ together may form an alkylidene group having 1 to 20 carbon atoms.

As for the alkyl group having 1 to 20 carbon atoms (more preferably 1 to 10), it may be in a straight-chain form, a branched-chain form, or a cyclic form, and is not particularly limited. From the perspective of transparency and weather resistance, methyl groups, ethyl groups, and the like are preferable. If the number of carbon atoms in such an alkyl group exceeds the upper limit, purification by methods, such as distillation and recrystallization, is difficult.

As for the alkenyl group having 1 to 20 carbon atoms (more preferably from 1 to 10), it may be in a straight-chain form, a branched-chain form, or a cyclic form, and is not particularly limited. From the perspective of transparency and weather resistance, an ethylidene group and the like are preferable. If the number of carbon atoms in such an alkenyl group exceeds the upper limit, purification by methods, such as distillation and recrystallization, is difficult.

As for the alkyl carbonyl group having 1 to 20 carbon atoms (more preferably 1 to 10), it may be in a straight-chain form, a branched-chain form, or a cyclic form, and is not particularly limited. From the perspective of transparency and weather resistance, methyl carbonyl groups, ethyl carbonyl groups, and the like are preferable. If the number of carbon atoms in such an alkyl carbonyl group exceeds the upper limit, purification by methods, such as distillation and recrystallization, is difficult.

Furthermore, as for the ester group comprising a hydrocarbon group having 1 to 20 carbon atoms (more preferably 1 to 10), it may be in a straight-chain form, a branched-chain form, or a cyclic form, and is not particularly limited. From the perspective of transparency and weather resistance, methoxycarbonyl groups, ethoxycarbonyl groups, and the like are preferable. If the number of carbon atoms in such an ester group exceeds the upper limit, purification by methods, such as distillation and recrystallization, is difficult.

Meanwhile, as for the monocyclic hydrocarbon, which may have an unsaturated bond, having 3 to 20 carbon atoms (more preferably 3 to 10), it is not particularly limited, and may further contain another substituent. As such a monocyclic hydrocarbon, cyclopentene, cyclohexene, and the like are preferable from the perspective of transparency and weather resistance. If the number of carbon atoms in such a monocyclic hydrocarbon exceeds the upper limit, purification by methods, such as distillation and recrystallization, is difficult.

Meanwhile, as for the polycyclic hydrocarbon, which may contain an unsaturated bond, having 4 to 20 carbon atoms (more preferably 4 to 12) is not particularly limited, and may further contain another substituent. As such a polycyclic hydrocarbon, naphthalene, biphenyl, and the like are preferable from the perspective of transparency and weather resistance. If the number of carbon atoms in such a polycyclic hydrocarbon exceeds the upper limit, purification by methods, such as distillation and recrystallization, is difficult.

Furthermore, as for the alkylidene group having 1 to 20 carbon atoms (more preferably 1 to 10), although it is not particularly limited, indane, tetralin, and the like are preferable from the perspective of transparency and weather resistance. If the number of carbon atoms in such an alkylidene group exceeds the upper limit, purification by methods, such as distillation and recrystallization, is difficult.

Meanwhile, in the case where the norbornene-based ring-opening polymer according to the present invention is the norbornene-based ring-opening copolymer comprising the structural unit (A') and the structural unit (B), the norbornene-based ring-opening copolymer is formed to contain a phenyl group or a substituted phenyl group, which are derived from the structural unit (A'), as a substituent. Furthermore, such a norbornene-based ring-opening copolymer is formed to comprise a cyclopentane ring and the phenyl group or substituted phenyl group being connected directly or by a bicyclo structure, since obtained by ring-opening polymerization of norbornene monomers (raw materials of the structural unit (A') and the structural unit (B)).

Furthermore, in such a norbornene-based ring-opening copolymer comprising the structural unit (A') and the structural unit (B), a content percentage of a structural unit (A'-1), in which a configuration of a substituted or unsubstituted phenyl group (a benzene ring linked to R⁴) in the general formula (2) is an exo configuration, to a total amount of structural units (A') contained in the norbornene-based ring-opening copolymer is in a range of 90 mol % (more preferably 95 mol %) or above. If a content percentage of the structural unit (A'-1) among the structural units (A') falls below the lower limit in such a norbornene-based ring-opening copolymer, intended optical characteristics of an obtained film is difficult to be exhibited.

In the case where the norbornene-based ring-opening polymer is the norbornene-based ring-opening copolymer comprising the structural unit (A') and the structural unit (B), a content ratio of the structural unit (A') and the structural unit (B) in the norbornene-based ring-opening copolymer in a molar ratio (structural unit (A'): structural unit (B)) is preferably in a range from 99:1 to 40:60, and more preferably in a range from 99:1 to 50:50 mol %. If such a content ratio of the structural unit (A') is below the lower limit, optical characteristics, such as reverse dispersion characteristics, tend not to be expressed.

Furthermore, in the case where the norbornene-based ring-opening polymer is the norbornene-based ring-opening copolymer comprising the structural unit (A') and the structural unit (B), a content percentage of the structural unit (A'-1) to all structural units contained in the norbornene-based ring-opening copolymer is preferably in a range from 40 to 99 mol %, and more preferably from 50 to 99 mol %. If a content percentage of the structural unit (A'-1) in the norbornene-based ring-opening copolymer falls below 40 mol %, reverse dispersion characteristics are likely not to be exhibited. In the case where the norbornene-based ring-opening polymer is the norbornene-based ring-opening copolymer, if a content percentage of the structural unit (A'-1) falls below 80 mol %, negative A characteristics are likely not to be exhibited. In the case where the norbornene-based ring-opening polymer is the norbornene-based ring-opening copolymer comprising the structural unit (A') and the structural unit (B), if a proportion of the structural unit (A'-1) among all the structural units falls below 40 mol %, a wavelength dispersion value (D=Δn (λ=481 nm)/Δn(λ=589 nm)) falls in a range from 0.92 to less than 1.0. Accordingly, it tends to be unable to obtain a film exhibiting unique characteristics which are having a wavelength dispersion value of less than 0.92 or having a wavelength dispersion value of high dispersion (D is 1.0 or above).

Furthermore, in the case where the norbornene-based ring-opening polymer is the norbornene-based ring-opening copolymer comprising the structural unit (A') and the structural unit (B), in order to attain reverse wavelength dispersion characteristics in a retardation film to be obtained, a content percentage of the structural unit (A'-1), in which a configuration of a substituted or unsubstituted phenyl group is an exo configuration, to all the structural units contained in the norbornene-based ring-opening copolymer is preferably in a range from 40 mol % to less than 80 mol % (more preferably in a range from 50 to 70 mol %). In other words, in the case where the norbornene-based ring-opening polymer is the norbornene-based ring-opening copolymer, by setting a content percentage of the structural unit (A'-1) in a range from 40 mol % to less than 80 mol %, the retardation film can be formed as a reverse dispersion retardation film. If a proportion of such a structural unit (A'-1), in which the configuration of the benzene ring is exo, is the above-mentioned 80 mol % or above, it is difficult to attain reverse wavelength dispersion characteristics.

Moreover, in the case where the norbornene-based ring-opening polymer is the norbornene-based ring-opening copolymer comprising the structural unit (A') and the structural unit (B), in order to attain optical characteristics as a negative A in an obtained retardation film, a content percentage of the structural unit (A'-1), in which a configuration of a substituted or unsubstituted phenyl group in the general formula (2) is an exo configuration, to all the structural units contained in the norbornene-based ring-opening copolymer is preferably in a range from 80 to 99 mol % (more preferably in from 90 to 99 mol %). In other words, in the case where the norbornene-based ring-opening polymer is the norbornene-based ring-opening copolymer comprising the structural unit (A') and the structural unit (B), by setting a content percentage of the structural unit (A'-1) in a range from 80 to 99 mol %, the retardation film can be formed as a negative A-plate retardation film. If a content percentage of the structural unit (A'-1) in all the structural units in the norbornene-based ring-opening copolymer falls below 80 mol %, it tends to be unable to attain optical characteristics as a negative A which is unique among negative birefringence in an obtained retardation film. As such a negative A-plate retardation film, one satisfying the relationship expressed by the relational expression (1) is preferable.

Furthermore, in the case where the norbornene-based ring-opening polymer is the norbornene-based ring-opening copolymer, the structural unit (A'), in which $X^1$ in the general formula (2) is a group represented by a formula —$CH_2CH_2$—, and the structural unit (B), in which $X^2$ in the general formula (3) is a group represented by a formula —$CH_2CH_2$—, are preferably contained in a proportion of 90 mol % (more preferably 95 mol %, and especially preferably 98 mol %) or above to all structural units in the norbornene-based ring-opening polymer. If the proportion falls below 90 mol %, the stability of the copolymer is lowered, and it tends to be difficult to prevent coloring and deterioration which are caused by heat.

Meanwhile, in the present invention, a weight-average molecular weight of the norbornene-based ring-opening polymer is preferably from 1000 to 10000000, and more preferably from 10000 to 1000000. If a weight-average molecular weight of the norbornene-based ring-opening polymer falls below the lower limit, the strength of an obtained norbornene-based ring-opening polymer tends to be low. On the other hand, if it exceeds the upper limit, the melt viscosity of an obtained norbornene-based ring-opening polymer tends to be too high.

In the following section, a preferred method for producing a norbornene-based ring-opening polymer according to the present invention will be described. Such a method for producing a norbornene-based ring-opening polymer is not particularly limited, and, for example, a method represented by the following reaction formula (I) can be preferably adopted.

[reaction formula (I)]

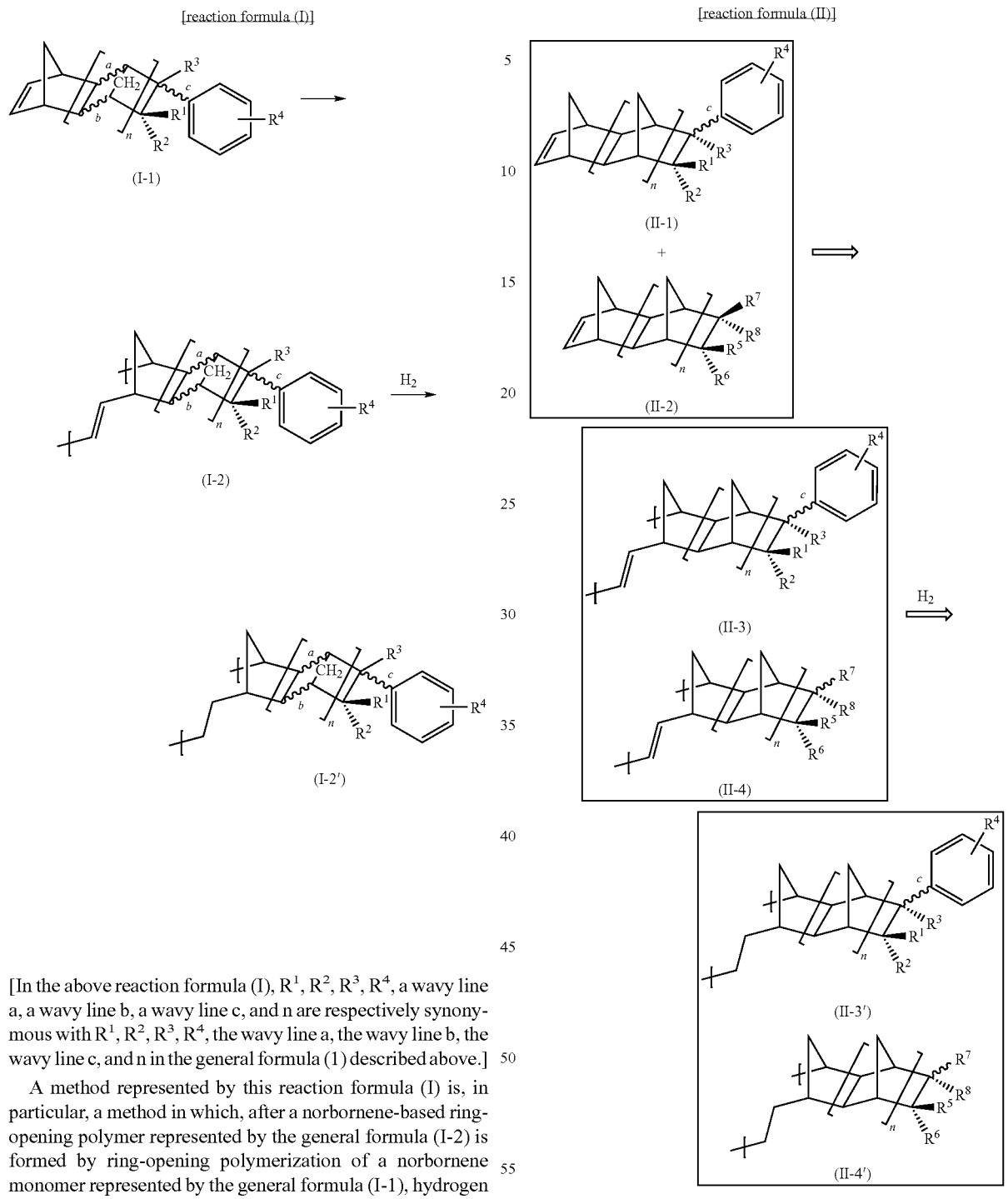

[reaction formula (II)]

[In the above reaction formula (I), $R^1$, $R^2$, $R^3$, $R^4$, a wavy line a, a wavy line b, a wavy line c, and n are respectively synonymous with $R^1$, $R^2$, $R^3$, $R^4$, the wavy line a, the wavy line b, the wavy line c, and n in the general formula (1) described above.]

A method represented by this reaction formula (I) is, in particular, a method in which, after a norbornene-based ring-opening polymer represented by the general formula (I-2) is formed by ring-opening polymerization of a norbornene monomer represented by the general formula (I-1), hydrogen is added to the obtained ring-opening polymer to form a norbornene-based ring-opening polymer represented by the general formula (I-2'). It should be noted that the structural units respectively represented by the general formulas (I-2) and (I-2') both correspond to the structural unit (A).

For production of the norbornene-based ring-opening copolymer comprising the structural unit (A') and the structural unit (B) as the norbornene-based ring-opening polymer, a method represented by the following reaction formula (II) can be preferably adopted, for example.

[$R^1$, $R^2$, $R^3$, $R^4$, n, and the wavy line c in the reaction formula (II) are respectively synonymous with $R^1$, $R^2$, $R^3$, $R^4$, n, and the wavy line c in the general formula (1), while $R^5$, $R^6$, $R^7$, $R^8$, and n in the reaction formula (II) are respectively synonymous with $R^5$, $R^6$, $R^7$, $R^8$, and n in the general formula (3).]

A method represented by this reaction formula (II) is, in particular, a method in which, after a norbornene-based ring-opening copolymer comprising structural units represented by the general formulas (II-3) and (II-4) is formed by ring-opening copolymerization of a norbornene monomer represented by the general formula (II-1) and a norbornene monomer represented by the general formula (II-2) in the reaction formula (II), hydrogen is added to the obtained ring-opening copolymer to form a norbornene-based ring-opening copolymer comprising structural units represented by the general formulas (II-3') and (II-4'). It should be noted that the structural units respectively represented by the general formulas (II-3) and (II-3') both correspond to the structural unit (A'), and that the structural units respectively represented by the general formulas (II-4) and (II-4') both correspond to the structural unit (B).

Examples of a norbornene monomer represented by the general formula (I-1) in the reaction formula (I) and a norbornene monomer expressed by the general formula (II-1) in the reaction formula (II) include the following: 5-phenylbicyclo[2.2.1]-2-heptene; 8-phenyltetracyclo[4.4.1$^{2,5}$.1$^{7,10}$.0]-3-dodecene; 5-(p-tBu-phenyl)bicyclo[2.2.1]-2-heptene; 8-(p-tBu-phenyl)tetracyclo[4.4.1$^{2,5}$.1$^{7,10}$.0]-3-dodecene; 5-(p-aminophenyl)bicyclo[2.2.1]-2-heptene; 8-(p-aminophenyl)tetracyclo[4.4.1$^{2,5}$.1$^{7,10}$.0]-3-dodecene; 5-(o-acetoxyphenyl)bicyclo[2.2.1]-2-heptene; 8-(o-acetoxyphenyl)tetracyclo[4.4.1$^{2,5}$.1$^{7,10}$.0]-3-dodecene; 5-(p-acetoxyphenyl)bicyclo[2.2.1]-2-heptene; 8-(p-acetoxyphenyl)tetracyclo[4.4.1$^{2,5}$.1$^{7,10}$.0]-3-dodecene; 6-bromo-5-phenylbicyclo[2.2.1]-2-heptene; 8-phenyl-9-bromotetracyclo[4.4.1$^{2,5}$.1$^{7,10}$.0]-3-dodecene; 5-(p-isopropyl phenyl)bicyclo[2.2.1]-2-heptene; 8-(p-isopropylphenyl)tetracyclo[4.4.1$^{2,5}$.1$^{7,10}$.0]-3-dodecene; 5-(m-bromophenyl)bicyclo[2.2.1]-2-heptene; 8-(m-bromophenyl)tetracyclo[4.4.1$^{2,5}$.1$^{7,10}$.0]-3-dodecene; 5-(p-bromophenyl)bicyclo[2.2.1]-2-heptene; 8-(p-bromophenyl)tetracyclo[4.4.1$^{2,5}$.1$^{7,10}$.0]-3-dodecene; 5-(o-bromophenyl)bicyclo[2.2.1]-2-heptene; 8-(o-bromophenyl)tetracyclo[4.4.1$^{2,5}$.1$^{7,10}$.0]-3-dodecene; 6,6-difluoro-5-(p-bromophenyl)bicyclo[2.2.1]-2-heptene; 8-(p-bromophenyl)-9,9-difluorotetracyclo[4.4.1$^{2,5}$.1$^{7,10}$.0]-3-dodecene; 5-(p-chlorophenyl)-5-methylbiclo[2.2.1]-2-heptene; 8-(p-chlorophenyl)-9-methyltetracyclo[4.4.1$^{2,5}$.1$^{7,10}$.0]-3-dodecene; 5-(o-chlorophenyl)bicyclo[2.2.1]-2-heptene; 8-(o-chlorophenyl)tetracyclo[4.4.1$^{2,5}$.1$^{7,10}$.0]-3-dodecene; 5-(m-chlorophenyl)bicyclo[2.2.1]-2-heptene; 8-(m-chlorophenyl)tetracyclo[4.4.1$^{2,5}$.1$^{7,10}$.0]-3-dodecene; 5-(p-chlorophenyl)bicyclo[2.2.1]-2-heptene; 8-(p-chlorophenyl)tetracyclo[4.4.1$^{2,5}$.1$^{7,10}$.0]-3-dodecene; 5-(m-chloromethylphenyl)bicyclo[2.2.1]-2-heptene; 8-(m-chloromethylphenyl)tetracyclo[4.4.1$^{2,5}$.1$^{7,10}$.0]-3-dodecene; 5-(p-chloromethylphenyl)bicyclo[2.2.1]-2-heptene; 8-(p-chloromethylphenyl)tetracyclo[4.4.1$^{2,5}$.1$^{7,10}$.0]-3-dodecene; 5-(p-cyanomethylphenyl)bicyclo[2.2.1]-2-heptene; 8-(p-cyanomethylphenyl)tetracyclo[4.4.1$^{2,5}$.1$^{7,10}$.0]-3-dodecene; 5-(o-chloromethylphenyl)bicyclo[2.2.1]-2-heptene; 8-(o-chloromethylphenyl)tetracyclo[4.4.1$^{2,5}$.1$^{7,10}$.0]-3-dodecene; 5-(2,6-dichlorophenyl)bicyclo[2.2.1]-2-heptene; 8-(2,6-dichlorophenyl)tetracyclo[4.4.1$^{2,5}$.1$^{7,10}$.0]-3-dodecene; 5-(p-fluorophenyl)-5-methylbicyclo[2.2.1]-2-heptene; 8-(p-fluorophenyl)-9-methyltetracyclo[4.4.1$^{2,5}$.1$^{7,10}$.0]-3-dodecene; 5-(o-fluorophenyl)bicyclo[2.2.1]-2-heptene; 8-(o-fluorophenyl)tetracyclo[4.4.1$^{2,5}$.1$^{7,10}$.0]-3-dodecene; 5-(m-fluorophenyl)bicyclo[2.2.1]-2-heptene; 8-(m-fluorophenyl)tetracyclo[4.4.1$^{2,5}$.1$^{7,10}$.0]-3-dodecene; 5-(p-fluorophenyl)bicyclo[2.2.1]-2-heptene; 8-(p-fluorophenyl)tetracyclo[4.4.1$^{2,5}$.1$^{7,10}$.0]-3-dodecene; 5-(pentafluorophenyl)bicyclo[2.2.1]-2-heptene; 8-(pentafluorophenyl)tetracyclo[4.4.1$^{2,5}$.1$^{7,10}$.0]-3-dodecene; 5-(o-methoxyphenyl)bicyclo[2.2.1]-2-heptene; 8-(o-methoxyphenyl)tetracyclo[4.4.1$^{2,5}$.1$^{7,10}$.0]-3-dodecene; 5-(p-ethoxyphenyl)bicyclo[2.2.1]-2-heptene; 8-(p-ethoxyphenyl)tetracyclo[4.4.1$^{2,5}$.1$^{7,10}$.0]-3-dodecene; 5-(p-phenoxyphenyl)bicyclo[2.2.1]-2-heptene; 8-(p-phenoxyphenyl)tetracyclo[4.4.1$^{2,5}$.1$^{7,10}$.0]-3-dodecene; 5-(p-hydroxymethylphenyl)bicyclo[2.2.1]-2-heptene; 8-(p-hydroxymethylphenyl)tetracyclo[4.4.1$^{2,5}$.1$^{7,10}$.0]-3-dodecene; 5-(p-methoxyphenyl)bicyclo[2.2.1]-2-heptene; 8-(p-methoxylphenyl)tetracyclo[4.4.1$^{2,5}$.1$^{7,10}$.0]-3-dodecene; 5-(o-methylphenyl)bicyclo[2.2.1]-2-heptene; 8-(o-methylphenyl)tetracyclo[4.4.1$^{2,5}$.1$^{7,10}$.0]-3-dodecene; 5-(m-methylphenyl)bicyclo[2.2.1]-2-heptene; 8-(m-methylphenyl)tetracyclo[4.4.1$^{2,5}$.1$^{7,10}$.0]-3-dodecene; 5-(p-methylphenyl)bicyclo[2.2.1]-2-heptene; 8-(p-methylphenyl)tetracyclo[4.4.1$^{2,5}$.1$^{7,10}$.0]-3-dodecene; 5-methyl-5-phenylbicyclo[2.2.1]-2-heptene; 8-methyl-8-phenyltetracyclo[4.4.1$^{2,5}$.1$^{7,10}$.0]-3-dodecene; 6-methyl-5-phenylbicyclo[2.2.1]-2-heptene; 9-methyl-8-phenyltetracyclo[4.4.1$^{2,5}$.1$^{7,10}$.0]-3-dodecene; 5-(m-nitrophenyl)bicyclo[2.2.1]-2-heptene; 8-(m-nitrophenyl)tetracyclo[4.4.1$^{2,5}$.1$^{7,10}$.0]-3-dodecene; 5-(p-nitrophenyl)bicyclo[2.2.1]-2-heptene; 8-(p-nitrophenyl)tetracyclo[4.4.1$^{2,5}$.1$^{7,10}$.0]-3-dodecene; 5-(p-cyanophenyl)bicyclo[2.2.1]-2-heptene; 8-(p-cyanophenyl)tetracyclo[4.4.1$^{2,5}$.1$^{7,10}$.0]-3-dodecene; 5-(p-n-octylphenyl)bicyclo[2.2.1]-2-heptene; 8-(p-n-octylphenyl)tetracyclo[4.4.1$^{2,5}$.1$^{7,10}$.0]-3-dodecene; 5-trimethylsiloxy-5-phenylbicyclo[2.2.1]-2-heptene; 8-(trimethylsiloxy)-8-phenyltetracyclo[4.4.1$^{2,5}$.1$^{7,10}$.0]-3-dodecene; 5-(2,4,6-trimethylphenyl)bicyclo[2.2.1]-2-heptene; 8-(2,4,6-trimethylphenyl)tetracyclo[4.4.1$^{2,5}$.1$^{7,10}$.0]-3-dodecene; 5-(o-methylphenyl)bicyclo[2.2.1]-2-heptene; 8-(o-methylphenyl)tetracyclo[4.4.1$^{2,5}$.1$^{7,10}$.0]-3-dodecene; 5-(m-methylphenyl)bicyclo[2.2.1]-2-heptene; 8-(m-methylphenyl)tetracyclo[4.4.1$^{2,5}$.1$^{7,10}$.0]-3-dodecene; 5-(p-methylphenyl)bicyclo[2.2.1]-2-heptene; 8-(p-methyl phenyl)tetracyclo[4.4.1$^{2,5}$.1$^{7,10}$.0]-3-dodecene; 5-(2,4-dimethylphenyl)bicyclo[2.2.1]-2-heptene; 8-(2,4-dimethylphenyl)tetracyclo[4.4.1$^{2,5}$.1$^{7,10}$.0]-3-dodecene; 5-(2,5-dimethylphenyl)bicyclo[2.2.1]-2-heptene; 8-(2,5-dimethylphenyl)tetracyclo[4.4.1$^{2,5}$.1$^{7,10}$.0]-3-dodecene; 5-(2,5-dichlorophenyl)bicyclo[2.2.1]-2-heptene; 8-(2,5-dichlorophenyl)tetracyclo[4.4.1$^{2,5}$.1$^{7,10}$.0]-3-dodecene; 5-(2,6-dichlorophenyl)bicyclo[2.2.1]-2-heptene; 8-(2,6-dichlorophenyl)tetracyclo[4.4.1$^{2,5}$.1$^{7,10}$.0]-3-dodecene; 5-(3,4-dichlorophenyl)bicyclo[2.2.1]-2-heptene; 8-(3,4-dichlorophenyl)tetracyclo[4.4.1$^{2,5}$.1$^{7,10}$.0]-3-dodecene; 5-(o-iodophenyl)bicyclo[2.2.1]-2-heptene; 8-(o-iodophenyl)tetracyclo[4.4.1$^{2,5}$.1$^{7,10}$.0]-3-dodecene; 5-(biphenyl)bicyclo[2.2.1]-2-heptene; 8-(biphenyl)tetracyclo[4.4.1$^{2,5}$.1$^{7,10}$.0]-3-dodecene; 5-(p-sulfophenyl)bicyclo[2.2.1]-2-heptene; 8-(p-sulfophenyl)tetracyclo[4.4.1$^{2,5}$.1$^{7,10}$.0]-3-dodecene; 5-(p-chlorosulfonylphenyl)bicyclo[2.2.1]-2-heptene; 8-(p-chlorosulfonylphenyl)tetracyclo[4.4.1$^{2,5}$.1$^{7,10}$.0]-3-dodecene; 5-(p-carboxyphenyl)bicyclo[2.2.1]-2-heptene; 8-(p-carboxyphenyl)tetracyclo[4.4.1$^{2,5}$.1$^{7,10}$.0]-3-dodecene; 5,6-diphenylbicyclo[2.2.1]-2-heptene; 8,9-diphenyltetracyclo[4.4.1$^{2,5}$.1$^{7,10}$.0]-3-dodecene; 5,5-diphenylbicyclo[2.2.1]-2-heptene; 8,8-diphenyltetracyclo[4.4.1$^{2,5}$.1$^{7,10}$.0]-3-dodecene; 5-(1-naphthyl)bicyclo[2.2.1]-2-heptene; 8-(1-naphthyl)tetracyclo[4.4.1$^{2,5}$.1$^{7,10}$.0]-3-dodecene; 5-(2-naphthyl)bicyclo[2.2.1]-2-heptene; 8-(2-naphthyl)tetracyclo[4.4.1$^{2,5}$.1$^{7,10}$.0]-3-dodecene; 5-(9-anthracenyl)bicyclo[2.2.1]-2-heptene; 8-(9-anthracenyl)tetracyclo[4.4.1$^{2,5}$.1$^{7,10}$.0]-3-dodecene; 5-(m-isopropenylphenyl)-5-methylbicyclo[2.2.1]-2-heptene; 8-(m-isopropenylphenyl)-8-methyltetracyclo[4.4.1$^{2,5}$.1$^{7,10}$.0]-3-dodecene; 5-(p-isopropenylphenyl)-5-methylbicyclo[2.2.1]-2-heptene; 8-(p-isopropenylphenyl)-8-methyltetracyclo[4.4.1$^{2,5}$.1$^{7,10}$.0]-3-dodecene; 5-(p-chlorophenyl)-5-methylbicyclo[2.2.1]-2- heptene; 8-(p-chlorophenyl)-8-methyltetracyclo[4.4.1$^{2,5}$.1$^{7,10}$.0]-3-dodecene; 5-cyano-5-(p-methylphenyl)bicyclo[2.2.1]-2-heptene; 8-cyano-8-(p-methylphenyl)tetracyclo[4.4.1$^{2,5}$.1$^{7,10}$.0]-3-dodecene; 6-methyl-5-phenylbicyclo[2.2.1]-2-heptene; 9-methyl-8-phenyltetracyclo[4.4.1$^{2,5}$.1$^{7,10}$.0]-3-dodecene; 5-(p-methoxyphenyl)-6-methylbicyclo[2.2.1]-2-heptene; 8-(p-methoxyphenyl)-9-methyltetracyclo[4.4.1$^{2,5}$.1$^{7,10}$.0]-3-dodecene; 5-(p-hydroxy-o-methoxyphenyl)-6-methylbicyclo[2.2.1]-2-heptene; 8-(p-hydroxy-o-methoxyphenyl)-9-methyltetracyclo[4.4.1$^{2,5}$.1$^{7,10}$.0]-3-dodecene; 5-(3,4-methylenedioxyphenyl)-6-methylbicyclo[2.2.1]-2-heptene; 8-(3,4-methylenedioxyphenyl)-9-methyltetracyclo[4.4.1$^{2,5}$.1$^{7,10}$.0]-3-dodecene; 6-bromo-5-phenylbicyclo[2.2.1]-2-heptene; 8-phenyl-9-bromotetracyclo[4.4.1$^{2,5}$.1$^{7,10}$.0]-3-dodecene; 6-formyl-5-phenylbicyclo[2.2.1]-2-heptene; 9-formyl-8-phenyltetracyclo[4.4.1$^{2,5}$.1$^{7,10}$.0]-3-dodecene; 6-acetyl-5-phenylbicyclo[2.2.1]-2-heptene; 9-acetyl-8-phenyltetracyclo[4.4.1$^{2,5}$.1$^{7,10}$.0]-3-dodecene; 6-benzoyl-5-phenylbicyclo[2.2.1]-2-heptene; 8-phenyl-9-benzoyltetracyclo[4.4.1$^{2,5}$.1$^{7,10}$.0]-3-dodecene; 6-cyano-5-phenylbicyclo[2.2.1]-2-heptene; 9-cyano-8-phenyltetracyclo[4.4.1$^{2,5}$.1$^{7,10}$.0]-3-dodecene; 6-nitro-5-phenylbicyclo[2.2.1]-2-heptene; 9-nitro-8-phenyltetracyclo[4.4.1$^{2,5}$.1$^{7,10}$.0]-3-dodecene; tetracyclo[8.4.1$^{11,14}$.0$^{1,10}$.0$^{4,9}$]pentadeca-4,6,8,12-tetraene; pentacyclo[7.6.1$^{11,14}$.1$^{1,9}$.0$^{10,15}$.0$^{5,17}$]heptadeca-1,3,5,6,8,12-hexaene; pentacyclo[10.6.1$^{14,17}$.0$^{13,18}$.0$^{1,6}$.0$^{7,12}$]nonadeca-1,3,5,7,9,11,15-heptaene; tetracyclo[7.4.1$^{10,13}$.0$^{1,9}$.0$^{2,7}$]tetradeca-2,4,6,11-tetraene; 2-oxotetracyclo[7.4.1$^{10,13}$.0$^{1,9}$.0$^{3,8}$]tetrardeca-3,5,7,11-tetraene; 3-oxotetracyclo[8.4.1$^{11,14}$.0$^{1,10}$.0$^{4,9}$]pentadeca-4,6,8,12-tetraene-2-on; 5-phenyl-6-carboxy(p-methoxyphenyl)bicyclo[2.2.1]-2-heptene; 5-phenyl-6-carboxy(m-methoxyphenyl)bicyclo[2.2.1]-2-heptene; 5-phenyl-6-carboxy(o-methoxyphenyl)bicyclo[2.2.1]-2-heptene; 5-phenyl-6-carboxy(p-methylphenyl)bicyclo[2.2.1]-2-heptene; 5-phenyl-6-carboxy(m-methylphenyl)bicyclo[2.2.1]-2-heptene; 5-phenyl-6-carboxy(o-methylphenyl)bicyclo[2.2.1]-2-heptene; 5-phenyl-6-carboxy(p-chlorophenyl)bicyclo[2.2.1]-2-heptene; 5-phenyl-6-carboxy(m-chlorophenyl)bicyclo[2.2.1]-2-heptene; 5-phenyl-6-carboxy(o-chlorophenyl)bicyclo[2.2.1]-2-heptene; 5-phenyl-6-carboxy(p-nitrophenyl)bicyclo[2.2.1]-2-heptene; 5-phenyl-6-carboxy(m-nitrophenyl)bicyclo[2.2.1]-2-heptene; 5-phenyl-6-carboxy(o-nitrophenyl)bicyclo[2.2.1]-2-heptene; 5-phenyl-6-carboxy(p-bromophenyl)bicyclo[2.2.1]-2-heptene; 5-phenyl-6-carboxy(m-bromophenyl)bicyclo[2.2.1]-2-heptene; 5-phenyl-6-carboxy(o-bromophenyl)bicyclo[2.2.1]-2-heptene; 5-(p-aminophenyl)-6-carboxymethylbicyclo[2.2.1]-2-heptene; 5-(p-aminophenyl)-6-carboxyethylbicyclo[2.2.1]-2-heptene; 5-(p-bromophenyl)-6-carboxybicyclo[2.2.1]-2-heptene; 5-(p-bromophenyl)-6-carboxymethylbicyclo[2.2.1]-2-heptene; 5-(p-bromophenyl)-6-carboxyethylbicyclo[2.2.1]-2-heptene; 5-(o-bromophenyl)-6-carboxybicyclo[2.2.1]-2-heptene; 5-(o-bromophenyl)-6-carboxymethylbicyclo[2.2.1]-2-heptene; 5-(o-bromophenyl)-6-carboxyethylbicyclo[2.2.1]-2-heptene; 5-(m-bromophenyl)-6-carboxybicyclo[2.2.1]-2-heptene; 5-(m-bromophenyl)-6-carboxymethylbicyclo[2.2.1]-2-heptene; 5-(m-bromophenyl)-6-carboxyethylbicyclo[2.2.1]-2-heptene; 5-(p-chlorophenyl)-6-carboxybicyclo[2.2.1]-2-heptene; 5-(p-chlorophenyl)-6-carboxymethylbicyclo[2.2.1]-2-heptene; 5-(p-chlorophenyl)-6-carboxyethylbicyclo[2.2.1]-2-heptene; 5-(m-chlorophenyl)-6-carboxybicyclo[2.2.1]-2-heptene; 5-(m-chlorophenyl)-6-carboxymethylbicyclo[2.2.1]-2-heptene; 5-(m-chlorophenyl)-6-carboxyethylbicyclo[2.2.1]-2-heptene; 5-(o-chlorophenyl)-6-carboxybicyclo[2.2.1]-2-heptene; 5-(o-chlorophenyl)-6-carboxymethylbicyclo[2.2.1]-2-heptene; 5-(o-chlorophenyl)-6-carboxyethylbicyclo[2.2.1]-2-heptene 5-phenyl-6-carboxybicyclo[2.2.1]-2-heptene 5-phenyl-6-carboxybenzylbicyclo[2.2.1]-2-heptene; 5-phenyl-6-carboxyethylbicyclo[2.2.1]-2-heptene; 5-phenyl-6-carboxyphenylbicyclo[2.2.1]-2-heptene; 5-phenyl-6-carboxymethylbicyclo[2.2.1]-2-heptene; 5-(p-hydroxyphenyl)-6-carboxybicyclo[2.2.1]-2-heptene; 5-(p-hydroxyphenyl)-6-carboxymethylbicyclo[2.2.1]-2-heptene; 5-(p-hydroxyphenyl)-6-carboxyethylbicyclo[2.2.1]-2-heptene; 5-(o-hydroxyphenyl)-6-carboxybicyclo[2.2.1]-2-heptene; 5-(o-hydroxyphenyl)-6-carboxymethylbicyclo[2.2.1]-2-heptene; 5-(o-hydroxyphenyl)-6-carboxyethylbicyclo[2.2.1]-2-heptene; 5-cyano-5-phenyl-6-carboxybicyclo[2.2.1]-2-heptene; 5-cyano-5-phenyl-6-carboxymethylbicyclo[2.2.1]-2-heptene; 5-cyano-5-phenyl-6-carboxyethylbicyclo[2.2.1]-2-heptene; 5-cyano-5-phenyl-6-carboxycholesterylbicyclo[2.2.1]-2-heptene; 5-(m-hydroxyphenyl)-6-carboxybicyclo[2.2.1]-2-heptene; 5-(m-hydroxyphenyl)-6-carboxymethylbicyclo[2.2.1]-2-heptene; 5-(m-hydroxyphenyl)-6-carboxyethylbicyclo[2.2.1]-2-heptene; 5-phenyl-6-carboxyallylbicyclo[2.2.1]-2-heptene; 5-phenyl-6-carboxyvinylbicyclo[2.2.1]-2-heptene; 5-phenyl-6-carboxycinnamylbicyclo[2.2.1]-2-heptene; 5-(p-chloro-m-nitrophenyl)-6-carboxybicyclo[2.2.1]-2-heptene; 5-(p-chloro-m-nitrophenyl)-6-carboxymethylbicyclo[2.2.1]-2-heptene; 5-(p-chloro-m-nitrophenyl)-6-carboxyethylbicyclo[2.2.1]-2-heptene; 5-(2-chloro-5-nitrophenyl)-6-carboxybicyclo[2.2.1]-2-heptene; 5-(2-chloro-5-nitrophenyl)-6-carboxy methylbicyclo[2.2.1]-2-heptene; 5-(2-chloro-5-nitrophenyl)-6-carboxyethylbicyclo[2.2.1]-2-heptene; 5-cyano-5-(p-hydroxyphenyl)-6-carboxybicyclo[2.2.1]-2-heptene; 5-cyano-5-(p-hydroxyphenyl)-6-carboxymethylbicyclo[2.2.1]-2-heptene; 5-cyano-5-(p-hydroxyphenyl)-6-carboxyethylbicyclo[2.2.1]-2-heptene; 5-phenyl-6-carboxyisopropylbicyclo[2.2.1]-2-heptene; 5,6-dibromo-5-phenyl-6-carboxybicyclo[2.2.1]-2-heptene; 5,6-dibromo-5-phenyl-6-carboxymethylbicyclo[2.2.1]-2-heptene; 5,6-dibromo-5-phenyl-6-carboxyethylbicyclo[2.2.1]-2-heptene; 5-(3,4-dimethoxyphenyl)-6-carboxybicyclo[2.2.1]-2-heptene; 5-(3,4-dimethoxyphenyl)-6-carboxymethylbicyclo[2.2.1]-2-heptene; 5-(3,4-dimethoxyphenyl)-6-carboxyethylbicyclo[2.2.1]-2-heptene; 5-(3,5-dimethoxy-4-hydroxyphenyl)-6-carboxybicyclo[2.2.1]-2-heptene; 5-(3,5-dimethoxy-4-hydroxyphenyl)-6-carboxymethylbicyclo[2.2.1]-2-heptene; 5-(3,5-dimethoxy-4-hydroxyphenyl)-6-carboxyethylbicyclo[2.2.1]-2-heptene; 5-(2,5-dimethoxyphenyl)-6-carboxylic-methyl-bicyclo[2.2.1]-2-heptene; 5-(2,5-dimethoxyphenyl)-6-carboxymethylbicyclo[2.2.1]-2-heptene; 5-(2,5-dimethoxyphenyl)-6-carboxyethylbicyclo[2.2.1]-2-heptene; 5-(2,3-dimethoxyphenyl)-6-carboxybicyclo[2.2.1]-2-heptene; 5-(2,3-dimethoxyphenyl)-6-carboxymethylbicyclo[2.2.1]-2-heptene; 5-(2,3-dimethoxyphenyl)-6-carboxyethylbicyclo[2.2.1]-2-heptene; 5-(2,4-difluorophenyl)-6-carboxybicyclo[2.2.1]-2-heptene; 5-(2,4-difluorophenyl)-6-carboxymethylbicyclo[2.2.1]-2-heptene; 5-(2,4-difluorophenyl)-6-carboxyethylbicyclo[2.2.1]-2-heptene; 5-(2,4-dimethoxyphenyl)-6-carboxybicyclo[2.2.1]-2-heptene; 5-(2,4-dimethoxyphenyl)-6-carboxymethylbicyclo[2.2.1]-2-heptene; 5-(2,4-dimethoxyphenyl)-6-carboxyethylbicyclo[2.2.1]-2-heptene; 5-(2,4-dichlorophenyl)-6-carboxybicyclo[2.2.1]-2-heptene; 5-(2,4-dichlorophenyl)-6-carboxymethylbicyclo[2.2.1]-2-heptene; 5-(2,4-dichlorophenyl)-6-carboxyethylbicyclo[2.2.1]-2-heptene; 5-(4-fluorophenyl)-6-carboxybicyclo[2.2.1]-2-heptene;

5-(4-fluorophenyl)-6-carboxymethylbicyclo[2.2.1]-2-heptene; 5-(4-fluorophenyl)-6-carboxyethylbicyclo[2.2.1]-2-heptene; 5-(2-fluorophenyl)-6-carboxybicyclo[2.2.1]-2-heptene; 5-(2-fluorophenyl)-6-carboxymethylbicyclo[2.2.1]-2-heptene; 5-(2-fluorophenyl)-6-carboxyethylbicyclo[2.2.1]-2-heptene; 5-(3-fluorophenyl)-6-carboxybicyclo[2.2.1]-2-heptene; 5-(3-fluorophenyl)-6-carboxymethylbicyclo[2.2.1]-2-heptene; 5-(3-fluorophenyl)-6-carboxyethylbicyclo[2.2.1]-2-heptene; 5-(4-hydroxy-3-methyoxyphenyl)-6-carboxybicyclo[2.2.1]-2-heptene; 5-(4-hydroxy-3-methyoxyphenyl)-6-carboxymethylbicyclo[2.2.1]-2-heptene; 5-(4-hydroxy-3-methyoxyphenyl)-6-carboxyethylbicyclo[2.2.1]-2-heptene; 5-(3-hydroxy-4-methyoxyphenyl)-6-carboxybicyclo[2.2.1]-2-heptene; 5-(3-hydroxy-4-methyoxyphenyl)-6-carboxymethylbicyclo[2.2.1]-2-heptene; 5-(3-hydroxy-4-methyoxyphenyl)-6-carboxyethylbicyclo[2.2.1]-2-heptene; 5-(3-methoxyphenyl)-6-carboxybicyclo[2.2.1]-2-heptene; 5-(3-methoxyphenyl)-6-carboxymethylbicyclo[2.2.1]-2-heptene; 5-(3-methoxyphenyl)-6-carboxyethylbicyclo[2.2.1]-2-heptene; 5-(2-methoxyphenyl)-6-carboxybicyclo[2.2.1]-2-heptene; 5-(2-methoxyphenyl)-6-carboxymethylbicyclo[2.2.1]-2-heptene; 5-(2-methoxyphenyl)-6-carboxyethylbicyclo[2.2.1]-2-heptene; 5-(4-methoxyphenyl)-6-carboxybicyclo[2.2.1]-2-heptene; 5-(4-methoxyphenyl)-6-carboxymethylbicyclo[2.2.1]-2-heptene; 5-(4-methoxyphenyl)-6-carboxyethylbicyclo[2.2.1]-2-heptene; 5-(3,4-methylenedioxyphenyl)-6-carboxybicyclo[2.2.1]-2-heptene; 5-(3,4-methylenedioxyphenyl)-6-carboxymethylbicyclo[2.2.1]-2-heptene; 5-(3,4-methylenedioxyphenyl)-6-carboxyethylbicyclo[2.2.1]-2-heptene; 5-(4-methylphenyl)-6-carboxybicyclo[2.2.1]-2-heptene; 5-(4-methylphenyl)-6-carboxymethylbicyclo[2.2.1]-2-heptene; 5-(4-methylphenyl)-6-carboxyethylbicyclo[2.2.1]-2-heptene; 5-(4-mercaptophenyl)-6-carboxybicyclo[2.2.1]-2-heptene; 5-(4-mercaptophenyl)-6-carboxymethylbicyclo[2.2.1]-2-heptene; 5-(4-mercaptophenyl)-6-carboxyethylbicyclo[2.2.1]-2-heptene; 5-(2-methylphenyl)-6-carboxybicyclo[2.2.1]-2-heptene; 5-(2-methylphenyl)-6-carboxymethylbicyclo[2.2.1]-2-heptene; 5-(2-methylphenyl)-6-carboxyethylbicyclo[2.2.1]-2-heptene; 5-(3-methylphenyl)-6-carboxybicyclo[2.2.1]-2-heptene; 5-(3-methylphenyl)-6-carboxymethylbicyclo[2.2.1]-2-heptene; 5-(3-methylphenyl)-6-carboxyethylbicyclo[2.2.1]-2-heptene; 5-methyl-5-phenyl-6-carboxybicyclo[2.2.1]-2-heptene; 5-methyl-5-phenyl-6-carboxymethylbicyclo[2.2.1]-2-heptene; 5-methyl-5-phenyl-6-carboxyethylbicyclo[2.2.1]-2-heptene; 5-(3-nitrophenyl)-6-carboxybicyclo[2.2.1]-2-heptene; 5-(3-nitrophenyl)-6-carboxymethylbicyclo[2.2.1]-2-heptene; 5-(3-nitrophenyl)-6-carboxyethylbicyclo[2.2.1]-2-heptene; 5-(4-nitrophenyl)-6-carboxybicyclo[2.2.1]-2-heptene; 5-(4-nitrophenyl)-6-carboxymethylbicyclo[2.2.1]-2-heptene; 5-(4-nitrophenyl)-6-carboxyethylbicyclo[2.2.1]-2-heptene; 5-(2-nitrophenyl)-6-carboxybicyclo[2.2.1]-2-heptene; 5-(2-nitrophenyl)-6-carboxymethylbicyclo[2.2.1]-2-heptene; 5-(2-nitrophenyl)-6-carboxyethylbicyclo[2.2.1]-2-heptene; 5-(4-n-octadecyloxyphenyl)-6-carboxybicyclo[2.2.1]-2-heptene; 5-(4-n-octadecyloxyphenyl)-6-carboxymethylbicyclo[2.2.1]-2-heptene; 5-(4-n-octadecyloxyphenyl)-6-carboxyethylbicyclo[2.2.1]-2-heptene; 5-(4-stearyloxyphenyl)-6-carboxybicyclo[2.2.1]-2-heptene; 5-(4-stearyloxyphenyl)-6-carboxymethylbicyclo[2.2.1]-2-heptene; 5-(4-stearyloxyphenyl)-6-carboxyethylbicyclo[2.2.1]-2-heptene; 5,5-diphenyl-6-carboxybicyclo[2.2.1]-2-heptene; 5,5-diphenyl-6-carboxymethylbicyclo[2.2.1]-2-heptene; 5,5-diphenyl-6-carboxyethylbicyclo[2.2.1]-2-heptene; 5-(3,4,5-trimethoxyphenyl)-6-carboxybicyclo[2.2.1]-2-heptene; 5-(3,4,5-trimethoxyphenyl)-6-carboxymethylbicyclo[2.2.1]-2-heptene; 5-(3,4,5-trimethoxyphenyl)-6-carboxyethylbicyclo[2.2.1]-2-heptene; 5-(2,4,5-trimethoxyphenyl)-6-carboxybicyclo[2.2.1]-2-heptene; 5-(2,4,5-trimethoxyphenyl)-6-carboxymethylbicyclo[2.2.1]-2-heptene; 5-(2,4,5-trimethoxyphenyl)-6-carboxyethylbicyclo[2.2.1]-2-heptene; 5-(3-trifluoromethylphenyl)-6-carboxybicyclo[2.2.1]-2-heptene; 5-(3-trifluoromethylphenyl)-6-carboxymethylbicyclo[2.2.1]-2-heptene; 5-(3-trifluoromethylphenyl)-6-carboxyethylbicyclo[2.2.1]-2-heptene; 5-(3-trifluoromethoxyphenyl)-6-carboxybicyclo[2.2.1]-2-heptene; 5-(3-trifluoromethoxyphenyl)-6-carboxymethylbicyclo[2.2.1]-2-heptene; 5-(3-trifluoromethoxyphenyl)-6-carboxyethylbicyclo[2.2.1]-2-heptene; 5-(2,3,4-trimethoxyphenyl)-6-carboxybicyclo[2.2.1]-2-heptene; 5-(2,3,4-trimethoxyphenyl)-6-carboxymethylbicyclo[2.2.1]-2-heptene; 5-(2,3,4-trimethoxyphenyl)-6-carboxyethylbicyclo[2.2.1]-2-heptene; 5-(4-cyanomethylphenyl)bicyclo[2.2.1]-2-heptene; 8-(4-cyanomethylphenyl) tetracyclo[4.4.1$^{2,5}$.1$^{7,10}$.0]-3-dodecene; 5,5,6,6-tetraphenylbicyclo[2.2.1]-2-heptene; 8,8,9,9-tetraphenyltetracyclo[4.4.1$^{2,5}$.1$^{7,10}$.0]-3-dodecene; 6-bromo-5,5,6-triphenylbicyclo[2.2.1]-2-heptene; 9-bromo-8,8,9-triphenyltetracyclo[4.4.1$^{2,5}$.1$^{7,10}$.0]-3-dodecene; 5,5,6-triphenylbicyclo[2.2.1]-2-heptene; 8,8,9-triphenyltetracyclo[4.4.1$^{2,5}$.1$^{7,10}$.0]-3-dodecene.

In the meantime, examples of a norbornene monomer represented by the general formula (II-2) in the reaction formula (II) include the following:

bicyclo[2.2.1]hepto-2-ene; tetracyclo[4.4.1$^{2,5}$.1$^{7,10}$.0]-3-dodecene; 5-methylbicyclo[2.2.1]hepto-2-ene; 5-ethyl-bicyclo[2.2.1]hepto-2-ene; 5-methoxycarbonylbicyclo[2.2.1]hepto-2-ene; 5-methyl-5-methoxycarbonylbicyclo[2.2.1]hepto-2-ene; 5-cyanobicyclo[2.2.1]hepto-2-ene; 8-methoxycaronyltetracyclo[4.4.1$^{2,5}$.1$^{7,10}$.0]-3-dodecene; 8-ethoxycarbonyltetracyclo[4.4.1$^{2,5}$.1$^{7,10}$.1]-3-dodecene; 8-n-propoxycarbonyltetracyclo[4.4.1$^{2,5}$.1$^{7,10}$.0]-3-dodecene; 8-isopropoxycarbonyltetracyclo[4.4.1$^{2,5}$.1$^{7,10}$.0]-3-dodecene; 8-n-butoxycarbonyltetracyclo[4.4.1$^{2,5}$.1$^{7,10}$.0]-3-dodecene; 8-methly-8-methoxycaronyltetracyclo[4.4.1$^{2,5}$1$^{7,10}$.0]-3-dodecene; 8-methyl-8-ethoxycarbonyltetracyclo[4.4.1$^{2,5}$.1$^{7,10}$.0]-3-dodecene; 8-methyl-8-n-propoxycarbonyltetracyclo[4.4.1$^{2,5}$.1$^{7,10}$.0]-3-dodecene; 8-methyl-8-isopropoxycarbonyltetracyclo[4.4.1$^{2,5}$.1$^{7,10}$.0]-3-dodecene; 8-methyl-8-n-butoxycarbonyltetracyclo[4.4.1$^{2,5}$.1$^{7,10}$.1]-3-dodecene; 5-ethylidenebicyclo[2.2.1]hepto-2-ene; 8-ethylidenetetracyclo[4.4.1$^{2,5}$.1$^{7,10}$.0]-3-dodecene; 8-methyltetracyclo[4.4.1$^{2,5}$.1$^{7,10}$.0]-3-dodecene; 8-ethyl tetracyclo[4.4.1$^{2,5}$.1$^{7,10}$.0]-3-dodecene; 8-propyltetracyclo[4.4.1$^{2,5}$.1$^{7,10}$.0]-3-dodecene; 8-isopropyltetracyclo[4.4.1$^{2,5}$.1$^{7,10}$.0]-3-dodecene; 8-n-butyltetracyclo[4.4.1$^{2,5}$.1$^{7,10}$.0]-3-dodecene; 5-n-butylbicyclo[2.2.1]hepto-2-ene; 5-n-hexylbicyclo[2.2.1]hepto-2-ene; 5-cyclohexylbicyclo[2.2.1]hepto-2-ene; 5-(2-cyclohexyenyl)bicyclo[2.2.1]hepto-2-ene; 5-n-octylbicyclo[2.2.1]hepto-2-ene; 5-n-decylbicyclo[2.2.1]hepto-2-ene; 5-isopropylbicyclo[2.2.1]hepto-2-ene; 5-cyclohexenylbicyclo[2.2.1]hepto-2-ene; 5-fluorobicyclo[2.2.1]hepto-2-ene; 5,5-difluorobicyclo[2.2.1]hepto-2-ene; 5,6-difluorobicyclo[2.2.1]hepto-2-ene; 5,5,6-trifluorobicyclo[2.2.1]hepto-2-ene; 5,5,6,6-tetrafluorobicyclo[2.2.1]hepto-2-ene; 8-fluorotetracyclo[4.4.1$^{2,5}$.1$^{7,10}$.0]-3-dodecene; 8,8-difluorotetracyclo[4.4.1$^{2,5}$.1$^{7,10}$.0]-3-dodecene;

dicyclopentadiene; tricyclopentadiene; tetracyclopentadiene; and indene-cyclopentadiene adducts (1,4-methano-1,4,4a,9a-tetrahydrofluorene).

Here, a method for producing such a norbornene monomer represented by the general formula (I-1) is not particularly limited, and a method represented by the following reaction formula (III) can be preferably adopted, for example.

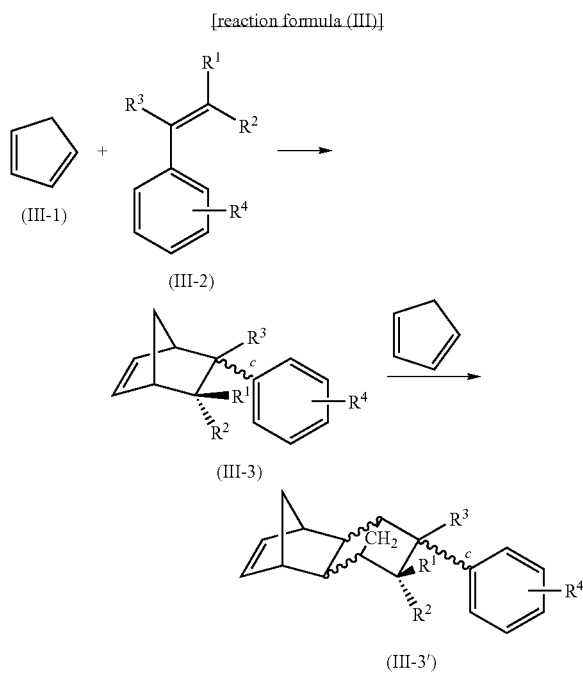

[In the above reaction formula (III), $R^1$, $R^2$, $R^3$, $R^4$, and the wavy line c are respectively synonymous with $R^1$, $R^2$, $R^3$, $R^4$, and the wavy line c in the general formula (1).]

A method represented by the reaction formula (III) is, in particular, a method in which cyclopentadiene represented by the formula (III-1) and a styrene derivative represented by the formula (III-2) are caused to undergo the Diels-Alder reaction, and thereby norbornene monomers represented by the formulas (III-3) and (III-3') can be obtained.

Examples of a styrene derivative represented by the general formula (III-2) which is used in the reaction formula (III) include styrene and cinnamic acid. Such styrene derivatives serve as excellent dienophile in the Diels-Alder reaction, and thereby a desirable reaction rate for industrial production can be achieved. To be more specific, under a temperature condition (160 to 200° C.) where cyclopentadiene is produced from a cyclopentadiene precursor (dicyclopentadiene), a target norbornene monomer can be obtained in good yield by causing the above styrene derivative and cyclopentadiene to react with each other. While a method for obtaining such a styrene derivative is also not particularly limited, there are industrially produced compounds which are readily obtainable. As for compounds which are not on the market industrially, it is possible to synthesize them according to methods described in text books (Polymer Data Handbook, basic edition; edited by the Society of Polymer Science, Japan; Published in 1986 by BAIFUKAN. Co., LTD, and the like).

Examples of such a styrene derivative include the following:

4-aminostyrene; 2-acetoxystyrene; 4-acetoxystyrene; β-bromostyrene; 4-tert-butylstyrene; 4-isopropylstyrene; 3-bromostyrene; 4-bromostyrene; 2-bromostyrene; 4-bromo-β,β-difluorostyrene; 4-chloro-α-methylstyrene; 2-chlorostyrene; 3-chlorostyrene; 4-chlorostyrene; m-chloromethylstyrene; p-chloromethylstyrene; cyanomethylstyrene; o-chloromethylstyrene; 2,6-dichlorostyrene; 4-fluoro-α-methylstyrene; 2-fluorostyrene; 3-fluorostyrene; 4-fluorostyrene; pentafluorostyrene; 2-methoxystyrene; 4-ethoxystyrene; p-phenoxystyrene; p-vinylbenzylalcohol; 4-methoxystyrene; 2-methylstyrene; 3-methylstyrene; 4-methylstyrene; α-methylstyrene; cis-β-methylstyrene; 3-nitrostyrene; 4-nitrostyrene; 4-cyanostyrene; 4-n-octylstyrene; β-methylstyrene; 2,3,4,5,6-pentafluorostyrene; α-(trimethylsiloxy)styrene; styrene; 2,4,6-trimethylstyrene; o-methylstyrene; m-methylstyrene; p-methylstyrene; 2,4-dimethylstyrene; 2,5-dimethylstyrene; 2,4,6-trimethylstyrene; 2,5-dichlorostyrene; 2,6-dichlorostyrene; 3,4-dichlorostyrene; o-iodostyrene; p-phenylstyrene; p-styrenesulfonic acid; p-styrenesulfonyl chloride; 4-carboxystyrene; cis-stilbene; trans-stilbene; 1,1-diphenylethylene; 1-vinylnaphtalene; 2-vinylnaphtalene; 9-vinylanthracene; m-diisopropylbenzene; p-diisopropylbenzene; p-chloro-α-methylstyrene; α-cyano-p-methylstyrene; propenylbenzene; anethole; isoeugenol; isosafrole; β-bromostyrene; cinnamaldehyde; benzalacetone; benzalacetophenone; β-cyanostyrene; β-nitrostyrene; 1,2-dihydronaphtalene; acenaphthylene; phenanthrene; indene; methylenebenzoindene; coumarone; 4-aminocinnamic acid; 4-bromocinnamic acid; 2-bromocinnamic acid; trans-3-bromocinnamic acid; 3,4-dihydroxy cinnamic acid; 4-chlorocinnamic acid; trans-cinnamic acid; cinnamic acid benzyl ester; cinnamic acid ethyl ester; cinnamic acid phenyl ester; cinnamic acid methyl ester; trans-4-hydroxycinnamic acid; trans-2-hydroxycinnamic acid; α-cyanocinnamic acid; α-cyanocinnamic acid ethyl ester; trans-cinnamic acid cholesterol ester; trans-3-hydroxycinnamic acid; cinnamic acid allyl ester; cinnamic acid vinyl ester; cinnamic acid cinnamyl ester; 2-chlorocinnamic acid; 3-chlorocinnamic acid; 4-chloro-3-nitrocinnamic acid; 2-chloro-5-nitrocinnamic acid; 4-chlorocinnamic acid methyl ester; α-cyano-4-hydroxycinnamic acid; cinnamic acid isopropyl ester; α,β-dibromocinnamic acid ethyl ester; 3,4-dimethoxycinnamic acid; 3,5-dimethoxy-4-hydroxycinnamic acid; 3,4-dimethoxycinnamic acid; 2,5-dimethoxycinnamic acid; trans-2,3-dimethoxycinnamic acid; 2,4-difluorocinnamic acid; 2,4-dimethoxycinnamic acid; trans-2,4-dichlorocinnamic acid; α,β-dibromocinnamic acid; 3,5-dimethoxy-4-hydroxycinnamic acid; 4-fluorocinnamic acid; 2-fluorocinnamic acid; 3-fluorocinnamic acid; cinnamic acid; trans-4-hydroxy-3-methoxycinnamic acid; 3-hydroxy-4-methoxycinnamic acid; 4-hydroxycinnamic acid; 3-methoxycinnamic acid; trans-2-methoxycinnamic acid; 4-methoxycinnamic acid; 3,4-methylenedioxy cinnamic acid; 4-methylcinnamic acid; cis-2-methoxycinnamic acid; 4-mercaptocinnamic acid; 4-methoxycinnamic acid-2-ethylhexyl ester; 4-methoxycinnamic acid octyl ester; 4-methoxycinnamic acid ethyl ester; 2-methylcinnamic acid; 3-methylcinnamic acid; α-methylcinnamic acid; 3-nitrocinnamic acid; 4-nitrocinnamic acid; 2-nitrocinnamic acid; 4-nitrocinnamic acid ethyl ester; 4-n-octadecyloxycinnamic acid; 4-stearyloxycinnamic acid; α-phenylcinnamic acid; 3,4,5-trimethoxycinnamic acid; 2,4,5-trimethoxycinnamic acid; 3-(trifluoromethyl)cinnamic acid; 3-(trifluoromethoxy)cinnamic acid; 2,3,4-trimethoxycinnamic acid; coumarin; vinylbenzyl cyanide; tetraphenyl ethylene; 2-bromo-1,1,2-triphenylethylene; and triphenyl ethylene.

Here, in a norbornene monomer obtained by adopting the method represented by the reaction formula (III), there are an exo isomer and an endo isomer as stereoisomers at a connecting site between an aromatic structure and a bicyclo-ring structure. Then, such an exo isomer of a norbornene monomer provides "negative A characteristics" to an obtained norbornene-based ring-opening polymer, while the endo isomer provides "positive A characteristics" to an obtained norbornene-based ring-opening polymer. For this reason, in the retardation film of the present invention, proportions of these isomers to be contained in the film are selected appropriately according to target optical characteristics. For example, it is also possible to obtain a film in which substantially no birefringence occurs by appropriately changing content percentages of these isomers. The positive A characteristics here can be acquired on the basis of a refractive index change occurring when the film is uniaxially stretched, and refer to characteristics in which a refractive index in a stretching direction is larger than a refractive index in a direction perpendicular to the stretching direction. On the other hand, the negative A characteristics are characteristics satisfying the condition in the relational expression (1), and refer to characteristics in which a refractive index in a stretching direction is smaller than a refractive index in a direction perpendicular to the stretching direction. In addition, as for such isomers, for example, the proportions in a product can be easily changed by appropriately changing reaction conditions in the production of monomer, and the proportions can also be easily changed even after a monomer is produced by applying heat treatment and changing conditions of the heat treatment.

As a method for production a norbornene monomer represented by the general formula (I-1) or (II-1), for example, a method represented by the following reaction formula (IV) can be preferably adopted.

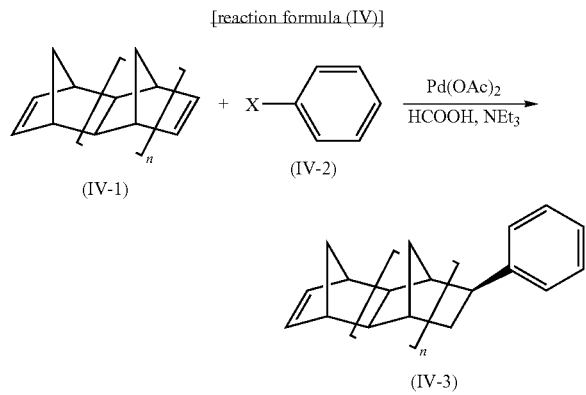

[reaction formula (IV)]

[In the reaction formula (IV), n is synonymous with n in the general formula (1), and X represents any one of a chlorine atom, a bromine atom, and an iodine atom.]

A method represented by this reaction formula (IV) is a method in which a norbornene monomer represented by a general formula (IV-3) is obtained by causing a norbornadiene derivative represented by a general formula (IV-1) and a halogenated benzene derivative represented by a general formula (IV-2) to undergo a reductive Heck reaction. By such a reaction, a norbornene monomer in which a configuration of the benzene ring in the general formula (IV-3) is an exo configuration can be obtained.

Furthermore, in the case where the value of n in the above reaction formula (IV) is 0 (in the case of norbornadiene), only a norbornene monomer in which a configuration of the benzene ring is exo is obtained. On the other hand, in the case where the value of n in the reaction formula (IV) is 1 (in the case of tetracyclo[1.1.0.0$^{2,5}$.1$^{7,10}$]-3,8-dodecadiene), although the configuration of the benzene ring is an exo configuration with respect to the norbornene ring as in the case of n=0, two kinds comprising exo isomer and endo isomer exist as stereoisomers of the site where the norbornene rings are linked to each other. As for such isomers, the content percentages can be easily changed by, for example, appropriately changing reaction conditions in the production of a norbornadiene derivative represented by the general formula (IV-1) to be used as a raw material. Moreover, even after the production of norbornene monomer represented by the general formula (IV-3), the content percentages of the isomers can also be changed by applying isomerization treatment and changing conditions of the isomerization treatment.

As for a ring-opening polymerization catalyst used in a reaction in which such a norbornene monomer is subjected to ring-opening polymerization (a reaction described in the reaction formula (I) or a reaction described in the reaction formula (II)), although it is not particularly limited, a metathesis polymerization catalyst described in Olefin Metathesis and Metathesis Polymerization (K. J. IVIN, J. C. MOL, Academic Press 1997) is used, for example. To be more specific, examples of the catalyst include catalysts comprising a combination of (a) at least one selected from compounds containing W, Mo, Re, V, and Ti, and (b) at least one selected from compounds containing elements, such as Li, Na, K, Mg, Ca, Zn, Cd, Hg, B, Al, Si, Sn, and Pb, and having at least one of a bond between the element and a carbon and a bond between the element and a hydrogen. In the case where the ring-opening polymerization is caused to progress using such a catalyst, an additive agent (c), which will be described later, may be added in order to enhance the catalytic activity. In addition, examples of other catalysts include metathesis catalysts (d), which do not require any auxiliary catalyst, comprising periodic table groups 4 to 8 transition metal-carbene complexes, metallacyclobutene complexes, and the like. Here, representative examples of the compounds containing W, Mo, Re, V, or Ti appropriate for the above (a) component include $WCl_6$, $MoCl_5$, $ReOCl_3$, $VOCl_3$, and $TiCl_4$. Concrete examples of the compounds used as the (b) component are compounds like n-$C_4H_9Li$, $(C_2H_5)_3Al$, $(C_2H_5)_2AlCl$, $(C_2H_5)_{1.5}AlCl_{1.5}$, $(C_2H_5)AlCl_2$, methylalumoxane, and LiH. Furthermore, representative examples of the additive agents as the (c) component include alcohols, aldehydes, ketones, and amines. Meanwhile, representative examples of the (d) component include W(=N-2,6-$C_6H_3iPr_2$) (=CHtBu) (OtBu)$_2$, Mo(=N-2,6-$C_6H_3iPr_2$) (=CHtBu) (OtBu)$_2$, Ru(=CHCH=CPh$_2$) (PPh$_3$)$_2$Cl$_2$, Ru(=CHPh) (PC$_6$H$_{11}$)$_2$Cl$_2$(Grubbs I (first generation) catalyst), Grubbs II (second generation) catalysts, Hoveyda-Grubbs catalysts (first and second generations).

As a usage amount of such a metathesis catalyst, a proportion between the (a) component and a total amount of the norbornene monomer (the proportion refers to a proportion between the (a) component and the norbornene monomer represented by the formula (I-1) in the reaction formula (I), and refers to a proportion between the (a) component and a total amount of norbornene monomers represented by the formulas (II-1) and (II-2) in the reaction formula (II)) in molar ratio, [(a) component: total amount of norbornene monomer], is preferably in a range from 1:500 to 1:500000, and more preferably in a range from 1:1000 to 1:100000. As a proportion between the (a) component and the (b) component, [(a) component: (b) component] in metal atom ratio is preferably in a range from 1:1 to 1:100, and more preferably in a range from 1:2 to 1:50. As a proportion between the (a) component and the (c) component in molar ratio, [(c) component: (a)

component], is preferably in a range from 0.005:1 to 15:1, and more preferably in a range from 0.05:1 to 10:1. Meanwhile, as an usage amount of the catalyst (d), a proportion between the (d) component and a total amount of the norbornene monomer (the proportion refers to a proportion between the (d) component and a total amount of norbornene monomer represented by the formula (I-1) in the reaction formula (I), and refers to a proportion between the (d) component and a total amount of norbornene monomers represented by (II-1) and (II-2) in the reaction formula (II)) in molar ratio, [(d) component: total amount of norbornene monomer], is preferably in a range from 1:30 to 1:100000, and more preferably in a range from 1:50 to 1:50000.

Meanwhile, in the reaction in which the norbornene monomer is subjected to ring-opening polymerization (the reaction described in the reaction formula (I) or the reaction described in the reaction formula (II)), a method for controlling the molecular weight of an obtained norbornene-based ring-opening polymer is not particularly limited. Accordingly, for example, a method for appropriately controlling molecular weight by changing a polymerization temperature, a type of catalyst, a type of solvent, and the like may be adopted. Then, as such a method for controlling molecular weight, a method in which a molecular weight controlling agent is added to a reaction system can be preferably adopted. A preferred molecular weight controlling agent includes, for example, α-olefins, such as ethylene, propene, 1-butene, 1-pentene, 1-hexene, 1-heptene, 1-octene, 1-nonene, and 1-decene, and styrene. Among these, 1-butene and 1-hexene are especially preferable. These molecular weight controlling agents may be used as a single agent or in combination of two or more kinds. A usage amount of such a molecular weight controlling agent to 1 mol of the norbornene monomer is preferably in a range from 0.005 to 1.0 mol, more preferably in a range from 0.02 to 0.5 mol.

Moreover, as a solvent used in the reaction in which the norbornene monomer is subjected to ring-opening polymerization (the reaction described in the reaction formula (I) or the reaction described in the reaction formula (II)), a solvent which is capable of dissolving the norbornene monomers, metathesis catalysts, and molecular weight controlling agents is preferable. Examples of such a solvent include alkanes, such as pentane, hexane, heptane, octane, nonane, and decane; cycloalkanes, such as cyclohexane, cycloheptane, cyclooctane, decalin, and norbornane; aromatic hydrocarbons, such as benzene, toluene, xylene, ethylbenzene, and cumene; halogenated alkanes, such as chlorobutane, bromohexane, methylene chloride, dichloroethane, hexamethylene dibromide, chlorobenzene, chloroform, and tetrachloroethylene; compounds, such as aryls; saturated carboxylic esters, such as ethyl acetate, n-butyl acetate, iso-butyl acetate, methyl propionate, dimethoxyethane, and γ-butyrolactone; and ethers, such as dibutyl ether, tetrahydrofuran, and dimethoxyethane. Among these, aromatic hydrocarbons are especially preferable. These solvents may be used alone or in combination of two or more kinds. As for a usage amount of such a solvent, an amount which satisfies [solvent: norbornene monomer] in mass ratio from 1:1 to 30:1 is preferable, and an amount which satisfies the mass ratio from 1:1 to 20:1 is more preferable.

As described above, the norbornene-based ring-opening polymer obtained in state of a ring-opening polymer is a norbornene-based ring-opening polymer comprising a structural unit represented by the formula (I-2) when the reaction formula (I) is adopted. Whereas, when the reaction formula (II) is adopted, the norbornene-based ring-opening polymer is a norbornene-based ring-opening copolymer comprising structural units represented by the formulas (II-3) and (II-4). Moreover, a norbornene-based ring-opening polymer thus obtained is the one having a vinylene group in the structural unit. Such a norbornene-based ring-opening polymer can be used as it is for the retardation film of the present invention for various applications. From the perspective of improving heat stability of a retardation film to be obtained, it is preferable to form a hydrogen additive in which the vinylene group is converted to an ethylene group (a norbornene-based ring-opening polymer comprising a structural unit represented by the formula (I-2') or a norbornene-based ring-opening polymer comprising structural units represented by (II-3') and (II-4')) by hydrogenating a part of or all vinylene groups in the norbornene-based ring-opening polymer as illustrated in the reaction formulas (I) and (II). It should be noted that, in such a hydrogen additive, an aromatic ring of a side-chain in a structural unit represented by the formula (I-2') or (II-3') is not substantially hydrogenated. In addition, a percentage of hydrogenation to the vinylene groups is preferably 90% or above, more preferably 95% or above, and especially preferably 98% or above. When a percentage of hydrogenation to vinylene group is higher, heat resistance of a norbornene-based ring-opening polymer to be obtained is more improved; thus, coloring and deterioration which are caused by heat tend to be sufficiently prevented.

A reaction in which the norbornene-based ring-opening polymer comprising a structural unit represented by the general formula (I-2) or the norbornene-based ring-opening copolymer comprising structural units represented by the general formulas (II-3) and (II-4) is hydrogenated is not particularly limited, but needs to be carried out under the condition where the aromatic ring of the side-chain is not substantially hydrogenated as described above.

Accordingly, the reaction is generally carried out by adding a hydrogenation catalyst to a solution of the norbornene-based ring-opening polymer comprising a structural unit represented by the formula (I-2) or to a solution of the norbornene-based ring-opening copolymer comprising structural units represented by the formulas (II-3) and (II-4), and then applying a hydrogen gas at a pressure in a range from an ordinary pressure to 30 MPa, preferably from 3 to 20 MPa, at a temperature from 0 to 200° C., preferably from 20 to 180° C.

As for such a hydrogenation catalyst used in a hydrogenation reaction, those used for a hydrogenation reaction of an ordinary olefin compounds can be used, and both homogenous catalyst and heterogeneous catalyst can be employed. Concrete examples of such heterogeneous catalysts include solid catalysts in which a noble metal catalytic material, such as palladium, platinum, nickel, rhodium, and ruthenium, is supported on a support, such as carbon, silica, alumina, and titania. Concrete examples of the homogenous catalysts include nickel naphthenate/triethylaluminum, nickel acetylacetonate/triethylaluminum, cobalt octenoate/n-butyllithium, titanocene dichloride/diethylaluminum monochloride, rhodium acetate, chlorotris(triphenylphosphine) rhodium, dichlorotris(triphenylphosphine)ruthenium, chlorohydrocarbonyltris(triphenylphosphine)ruthenium, and dichlorocarbonyltris(triphenylphosphine)ruthenium. The form of such hydrogenation catalysts may be powder or particle.

Furthermore, in such a hydrogenation catalyst, the additive amount needs to be adjusted so that the aromatic ring of the side-chain in the norbornene-based ring-opening polymer comprising the structural unit represented by the formula (I-2) or a norbornene-based ring-opening copolymer comprising structural units represented by the formulas (II-3) and (II-4) will not be substantially hydrogenated. Accordingly, such a hydrogenation catalyst is used in an amount so that a ratio of [ring-opening polymer: hydrogenation catalyst] in weight ratio can be in a range from $1:1\times10^{-6}$ to 1:2.

Here, a retardation film of the present invention is formed by stretching a film made of the norbornene-based ring-opening polymer according to the present invention described above. A method for producing such a film made of the norbornene-based ring-opening polymer is not particularly limited, and any publicly-known method can be adopted accordingly. In the production of such a film, in a range which does not exceed the gist of the present invention, in other words, in a range which does not impair the optical characteristics of the retardation film of the present invention, other polymer molecules, surfactants, high-polymer electrolytes, conductive complexes, silica, alumina, coloring materials, heat stabilizers, ultraviolet absorbers, antistats, anti-blocking agent, lubricants, plasticizers, oils, and the like may be added. In addition, a method for stretching the norbornene-based ring-opening polymer after formed into a film is not particularly limited, and any publicly-known stretching method can be adopted accordingly.

For a preferred method for producing such a film of a norbornene-based ring-opening polymer, examples include publicly-known publicly-used methods, such as a casting method (a solution casting method), a melt extrusion method, a calendaring method, and a compression molding method. Additionally, as a molding apparatus used in such a casting method, a drum-type casting machine, a band-type casting machine, a spin coater, and the like can be used. For a melt extrusion method, a T-die method and an inflation method can be cited.

Concrete examples of a solvent used for the casting method include: cyclic ketones, such as cyclohexanone and cyclopentanone; lactones, such as γ-butyrolactone and δ-valerolactone; aromatic hydrocarbons, such as benzene, toluene, xylene, ethylbenzene, and cumene; halogenated alkanes, such as methylene chloride, dichloroethane, chlorobenzene, dichlorobenzene, chloroform, and tetrachloroethylene; polar solvents including compounds, such as aryls, ethers, such as dibutylether, tetrahydrofuran, and dimethoxyethane, N-methylpyrrolidone, N,N-dimethylformamide, N,N-dimethylacetamide, and dimethylsulphoxide. Among these compounds, aromatic hydrocarbons, halogenated alkanes, and aryls are preferable. Here, these solvents may be used alone or in combination of two or more kinds.

Meanwhile, as for a method for stretching the norbornene-based ring-opening polymer after it has been formed into a film, a tentering method, a tube method, and the like can be cited as a biaxial stretching method, and then a water-tank stretching method, a radiation stretching method, a hot-air heating method, a hot-plate overheating method, a roll heating method, and the like can be cited as an uniaxial stretching method.

The thickness of a retardation film of the present invention thus obtained is not particularly limited. The thickness of a retardation film is preferably in a range from 10 to 500 μm, and more preferably from 30 to 200 μm. If the thickness of a retardation film falls below 10 μm, mechanical characteristics and handling ability in a secondary processing tend to be lowered. On the other hand, if the thickness exceeds 500 μm, a problem tends to arise in terms of flexibility. A stretching magnification for obtaining the retardation film of the present invention is also not particularly limited, but it is preferably approximately in a range from 1.1 to 5.0 times.

As for a retardation value of the retardation film of the present invention, it should be selected within a range from 5 to 2000 nm in accordance with the application. In the case of using the retardation film of the present invention as a ½λ plate, a retardation at a visible light having a wavelength of 550 nm is preferably in a range from 200 to 400 nm. In the case of using the retardation film of the present invention as a ¼λ plate, a retardation at a visible light having a wavelength of 550 nm is preferably in a range from 90 to 200 nm.

Furthermore, the retardation film of the present invention may be further provided with a thin film for the purpose of providing functions, such as gas barrier, anti-scratching, chemical resistance, and anti-glare. As a method for forming such a thin film, for example, a method, in which each of various thermoplastic resins, thermosetting resins having an amino group, an imino group, an epoxy group, a silyl group, or the like, radiation hardening-type resins having an acryloyl group, a methacryloyl group, a vinyl group, or the like, or a mixture of these resins is mixed with a polymerization inhibitor, waxes, a dispersant, a coloring material, a solvent, a plasticizer, an ultraviolet absorbent, an inorganic filler or the like, and the mixture thus obtained is applied to coating by a method, such as a gravure roll coating method, a Meyer bar coating method, a reverse roll coating method, a dip coating method, an air knife coating method, a calendar coating method, a squeeze coating method, a kiss coating method, a fountain coating method, a spray coating method, and a spin coating method, can be adopted. In addition, such a thin film may be formed to be a hardened thin-film layer by subjecting the thin film, after being applied to coating, to hardening by a radiation irradiation or thermal hardening by heat if necessary. In the case where printing is performed during the formation of such a thin film, a method, such as a gravure method, an offset method, a flexo method, and a silk screen method, can be adopted. In addition, the retardation film of the present invention may be further provided with a metal oxide layer mainly comprising aluminum, silicon, magnesium, zinc, or the like for the purpose of providing gas sealing function and the like. Such a metal oxide layer can be formed by a vacuum deposition method, a spattering method, an ion plating method, a plasma CVD method, and the like.

Moreover, the retardation film of the present invention may be laminated with another film. As a method for laminating the retardation film of the present invention with another film, any publicly-known method can be adopted accordingly. Heat bonding methods, such as a heat sealing method, an impulse sealing method, an ultrasound bonding method, and a high-frequency bonding method, and laminating methods, such as an extrusion laminating method, a hot-melt laminating method, a dry laminating method, a wet laminating method, a solventless bonding laminating method, a thermal laminating method, and a co-extrusion method can be cited as examples of the method. As for a film to be laminated, examples include polyester based resin films, polyvinyl alcohol based resin films, cellulose based resin films, polyvinyl fluoride resin films, polyvinylidene chloride resin films, polyacrylonitrile resin films, nylon based resin films, polyethylene based resin films, polypropylene based resin films, acetate resin films, polyimide resin films, polycarbonate resin films, and polyacrylate based resin films.

Next, a liquid crystal display device of the present invention will be described. To be more specific, the liquid crystal display device of the present invention is a device comprising the above-described retardation film of the present invention.

The above-described retardation film of the present invention is a retardation film having high transparency and excellent wavelength dispersion characteristics, and being capable of providing a specific retardation to broadband light, has an extremely high adhesiveness to other materials, is further capable of attaining optical characteristics as a negative A which are unique even among negative birefringence characteristics, and is also capable of giving a reverse dispersion of birefringence wavelength dispersion characteristics. Accordingly, the retardation film of the present invention is useful as a ¼λ plate in a reflective liquid crystal display device, a ½λ plate and a ¼λ plate in a liquid crystal projector apparatus, a ½λ plate and a ¼λ plate in a transmission liquid crystal displaying device, a protection film for a polarizing film used in a liquid crystal displaying device, an antireflection film, and the like.

Therefore, the liquid crystal display device of the present invention is only required to include the above retardation film of the present invention as a ½λ plate, a ¼λ plate, a protection film, an antireflection film, or the like. Accordingly, other configurations may be the same as those of any publicly-known liquid crystal display device.

Moreover, the retardation film of the present invention can be provided on a surface thereof with a ceramic thin film, such as indium tin oxide and indium zinc oxide, formed by plasma processing using DC or glow discharge, and then be used as a transparent electrode film in a touch panel, a liquid crystal display device, and the like.

EXAMPLES

Hereinafter, the present invention will be more concretely described on the basis of Examples and Comparative Examples. However, the present invention is not limited to the following Examples.

Firstly, a method for evaluating characteristics of polymers respectively obtained in Synthesis Examples and retardation films respectively obtained in Examples will be described.

<Glass Transition Temperature: Tg>

Glass transition temperatures of polymers respectively obtained in Synthesis Examples were measured by using a differential scanning calorimeter (manufactured by Perkin-Elmer Inc., product name: DSC7) at a temperature-rising speed of 20° C. per minute under nitrogen gas stream.

<Molecular Weight and Molecular Weight Distribution>

By using a gel permeation chromatography (GPC, manufactured by Tosoh Corporation, product name: HLC-8020/4 columns: manufactured by Tosoh Corporation, product name: TSK gel $GMH_{HR}$) as a measurement apparatus, and tetrahydrofuran (THF) as a solvent, a polystyrene-conversion weight-average molecular weight (Mw) and a molecular weight distribution (Mw/Mn) were obtained for individual polymers respectively obtained in Synthesis Examples. Here, Mn represents a number average molecular weight.

<Structures of Monomer and Polymer Molecules>

By using a superconducting nuclear magnetic resonance absorption apparatus (NMR, manufactured by VARIAN, Inc., product name: UNITY INOVA-600), $^1$H-NMR and $^{13}$C-NMR were measured in deuterated chloroform for individual polymers respectively obtained in Synthesis Examples. Based on obtained data, calculation was performed for an endo/exo ratio of monomer and a hydrogenation percentage of polymer (a percentage of $X^1$ in a norbornene-based ring-opening polymer comprising a structure unit represented by the general formula (1) or $X^1$ and $X^2$ in a norbornene-based ring-opening copolymer comprising structure units represented by the general formulas (2) and (3) having been converted into a group represented by a formula: —$CH_2CH_2$—), and identification of molecular structure was carried out.

<Evaluations of Retardation and Birefringence, and Evaluation of Wavelength Dispersion Value of Birefringence>

The retardation films respectively obtained in Examples and Comparative Examples were subjected to measurements of retardation (Re) and a wavelength dispersion value of birefringence (D), which are defined by the following formula, by using a retardation measuring device (manufactured by Oji Scientific Instruments, product name: KOBRA21DH).

$Re=(nx-ny)\times d$ nx: refractive index in a stretching direction ny: refractive index in a direction perpendicular to the stretching direction d: film thickness (nm)

D: wavelength dispersion value of birefringence $\Delta n$ ($\lambda$=481 nm)/$\Delta n$ ($\lambda$=589 nm)

Synthesis Example 1

Synthesis of Norbornene Monomers (Monomer) A and B 4-tBu-styrene (856 g: 5.36 mol), dicyclopentadiene (709 g: 5.36 mol), 4-tBu-catechol (44.6 g: 0.27 mol), and toluene (200 ml) were put into a 2 L autoclave, and heated while being stirred at 185° C. for 4 hours. Although a pressure was indicated to be 0.4 MPa in the early stage of the reaction, it gradually decreased as time passed, and finally a pressure of 0.2 MPa was indicated. Then, after termination of the heating, the autoclave was opened after its temperature was naturally lowered to room temperature, and a reactant was taken out.

Next, the reactant thus obtained was purified by distillation, and a fraction A in a range from 118 to 120° C./1 mmHg and a fraction B in a range from 165 to 170° C./1 mmHg were obtained. The yield of the fraction A was 640 g (yield rate of 53%, based on tBu-styrene) and the yield of the fraction B was 97 g (yield rate of 6%, based on tBu-styrene). According to results of gas chromatographic analysis and NMR analysis performed on the fraction A, it was confirmed to be 5-(p-tBu-phenyl)bicyclo[2.2.1]-2-heptene (the following general formula (4)) having an endo/exo ratio (isomer ratio) of 79/21.

[fraction A]

(4)

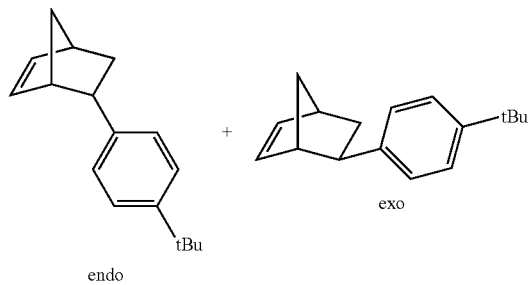

Meanwhile, according to results of gas chromatographic analysis and NMR analysis performed on the fraction B, it was confirmed to be 8-(p-tBu-phenyl)tetracyclo[4.4.1$^{2,5}$.1$^{7,10}$.0]-3-dodecene (the following general formula (5)) having an endo-endo/endo-exo ratio of 87/13.

[fraction B]

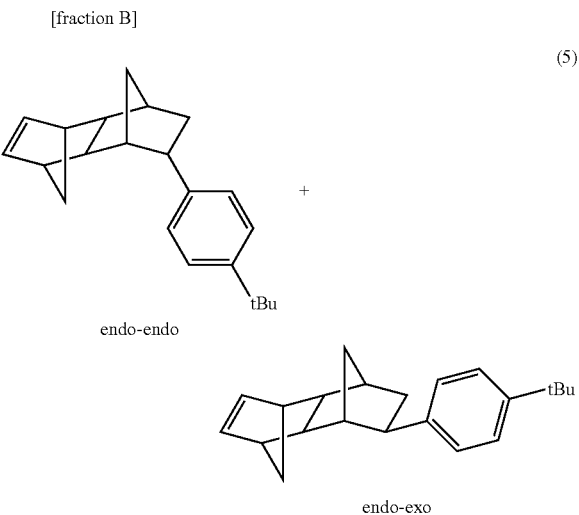

(5)

Next, 300 g of the fraction A was dissolved into 1200 ml of methanol by heating, and then naturally cooled down. As a result, 165 g of crystal of 5-(p-tBu-phenyl)bicyclo[2.2.1]-2-heptene (A) was obtained. The purity of the obtained crystal was 98%, and the endo/exo ratio was 80/20. In the meantime, 30 g of the fraction B was dissolved into 150 ml of isopropyl alcohol by heating, and then naturally cooled down. As a result, 18 g of crystal of 8-(p-tBu-phenyl)tetracyclo[4.4.1$^{2,5}$.1$^{7,10}$.0]-3-dodecene (B) was obtained. The purity of the obtained crystal was 99%, and the endo-endo/endo-exo ratio was 100/0.

<Polymerization of Norbornene Monomer A>

Under a nitrogen atmosphere, an anhydrous toluene solution (2 ml) of 1-hexene (2.5 µl: 0.2 mol %) and a Grubbs I catalyst (4.1 mg: 0.05 mol %) was added to an anhydrous toluene solution (20 ml) of 5-(p-tBu-phenyl)bicyclo[2.2.1]-2-heptene (A) (2.26 g: 0.01 mol) having an endo/exo ratio of 80/20, and then stirred at room temperature for 20 hours. Consecutively, a viscous polymer solution was diluted with 100 ml of toluene, and then poured into 3000 ml of methanol to obtain a precipitate. The precipitate thus obtained was filtered. Next, the precipitate was dried by use of a vacuum drier, and 1.90 g (yield rate of 85%) of a ring-opening polymer of the A (pA) was obtained. The obtained product was examined by GPC, and it was found that a polystyrene-conversion weight average molecular weight (Mw) was 90000, and Mw/Mn was 1.6.

<Polymerization of Norbornene Monomer B>

Under a nitrogen atmosphere, an anhydrous toluene solution (2 ml) of 1-hexene (2.5 µl: 0.2 mol %) and a Grubbs I catalyst (4.1 mg: 0.05 mol %) was added to an anhydrous toluene solution (20 ml) of 8-(p-tBu-phenyl)tetracyclo[4.4.1$^{2,5}$.1$^{7,10}$.0]-3-dodecene (B) (2.90 g: 0.01 mol) having an endo-endo/endo-exo ratio of 100/0, and then stirred at room temperature for 20 hours. Consecutively, a viscous polymer solution was diluted with 100 ml of toluene, and then poured into 3000 ml of methanol to obtain a precipitate. The precipitate thus obtained was filtered. Next, the precipitate was dried by use of a vacuum drier, and 2.84 g (yield rate of 98%) of a ring-opening polymer of the B (pB) was obtained. The obtained product was examined by GPC, and it was found that a polystyrene-conversion weight average molecular weight (Mw) was 125000, and Mw/Mn was 1.5.

<Hydrogenation of Ring-Opening Polymer (pA) of Norbornene Monomer A>

To an autoclave having a capacity of 0.2 L, 1.9 g of the ring-opening polymer of 5-(p-tBu-phenyl)bicyclo[2.2.1]-2-heptene (pA), xylene (150 ml), and RuHCl(CO)(PPh$_3$)$_3$ (19 mg) were fed, and nitrogen substitution was carried out. Next, under conditions of a hydrogen gas pressure of 10 MPa and a reaction temperature of 165° C., a hydrogenation reaction was performed by 30-hour heating, thereafter an obtained reaction solution was cooled down, and then the pressure of the hydrogen gas was discharged. Then, the reaction solution thus obtained was poured into 3000 ml of methanol, and a precipitate was separated and collected. The obtained precipitate was dried, and 1.69 g (yield rate of 89%) of hydrogenated ring-opening polymer of 5-(p-tBu-phenyl)bicyclo[2.2.1]-2-heptene (HpA) was obtained.

The obtained product was examined by GPC, and it was found that a polystyrene-conversion weight average molecular weight (Mw) was 97000, and Mw/Mn was 1.5. A hydrogenation ratio of olefinic unsaturated bonds was measured by using NMR for the obtained product, and it was observed to be 99.9%. Note that, since the signal from aromatic ring did not change, it was observed that the aromatic ring was not substantially hydrogenated. The obtained NMR chart is shown in FIG. 1. In addition, according to a result of measurement of Tg using DSC, Tg was 118° C.

<Hydrogenation of Ring-Opening Polymer (Pb) of Norbornene Monomer B>

To an autoclave having a capacity of 0.2 L, 2.0 g of the ring-opening polymer of 8-(p-tBu-phenyl)tetracyclo[4.4.1$^{2,5}$.1$^{7,10}$.0]-3-dodecene (pB), xylene (150 ml), and RuHCl(CO)(PPh$_3$)$_3$ (20 mg) were fed, and nitrogen substitution was carried out. Consecutively, under conditions of a hydrogen gas pressure of 10 MPa and a reaction temperature of 165° C., a hydrogenation reaction was performed by 30-hour heating, thereafter the obtained reaction solution was cooled down, and then the pressure of the hydrogen gas was discharged. Next, the reaction solution was poured into 3000 ml of methanol, and a precipitate was separated and collected. The obtained precipitate was dried, and 1.99 g (yield rate of 99.5%) of hydrogenated ring-opening polymer of 8-(p-tBu-phenyl)tetracyclo[4.4.1$^{2,5}$.1$^{7,10}$.0]-3-dodecene (HpB) was obtained.

Figure 2:
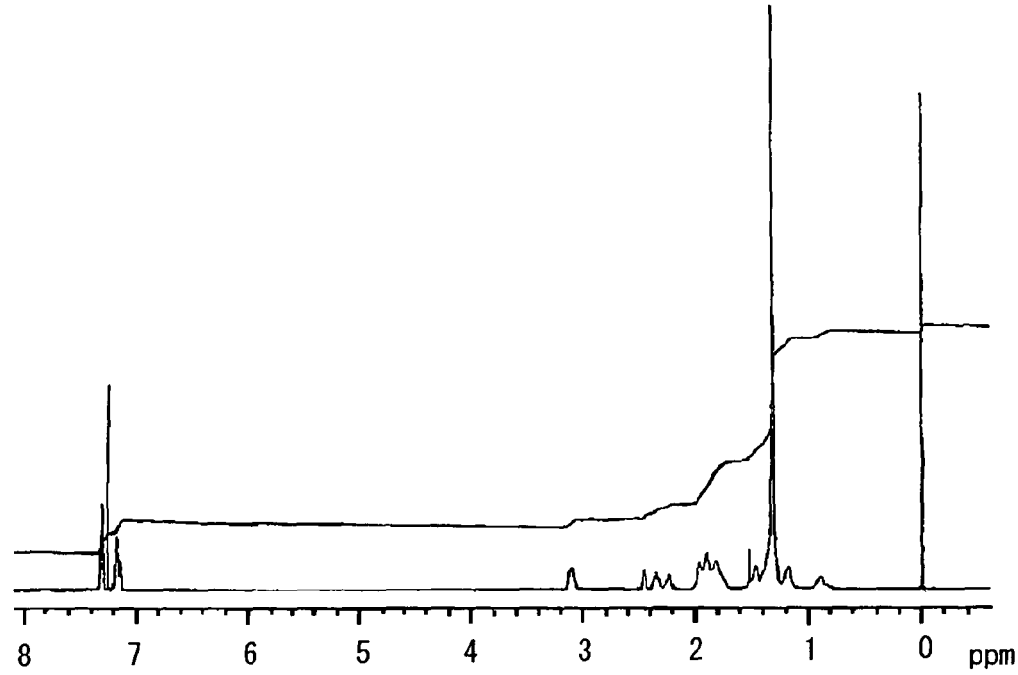
FIG. 2 is an NMR chart of a hydrogenated norbornene ring-opening polymer (HpB) obtained in Synthesis Example 1.

The product thus obtained was examined by GPC, and it was found that a polystyrene-conversion weight average molecular weight (Mw) was 96400, and Mw/Mn was 1.5. A hydrogenation ratio of olefinic unsaturated bonds was measured by using NMR for the obtained product, and it was observed to be 99.9%. Note that, since the signal from aromatic ring did not change, it was observed that the aromatic ring was not substantially hydrogenated. The obtained NMR chart is shown in FIG. 2. In addition, according to a result of measurement of Tg using DSC, Tg was 226° C.

Synthesis Example 2

Synthesis of Norbornene Monomers C and D Having Different Endo/Exo Ratios

Silica wool was filled into a glass straight tube (made of quartz) having a length of approximately 10 cm, and then heated at approximately 340 to 380° C. Under a vacuum condition, 5-(p-tBu-phenyl)bicyclo[2.2.1]-2-heptene (endo/exo=79/21) was added dropwise into the glass straight tube by using a dropping funnel, and thermal decomposition was performed. The reaction product was tBu-styrene, cyclopentadiene, and 5-(p-tBu-phenyl)bicyclo[2.2.1]-2-heptene having a high content of the exo isomer. This is because the content of the exo isomer was increased by increasing a thermal decomposition temperature, since the endo isomer was thermally less stable. Note that, as the temperature went up, the yield rate of 5-(p-tBu-phenyl)bicyclo[2.2.1]-2-heptene was decreased. As a result of thermal decomposition at a thermal decomposition temperature of 340° C., 5-(p-tBu-phenyl)bicyclo[2.2.1]-2-heptene (C) having an endo/exo ratio of 50/50 was obtained at a yield rate of 50%. Furthermore, when the thermal decomposition temperature was increased to 380° C., 5-(p-tBu-phenyl)bicyclo[2.2.1]-2-heptene (D) having an endo/exo ratio of 24/76 was obtained at a yield rate of 13%.

<Polymerization of Norbornene Monomer C>

Under a nitrogen atmosphere, an anhydrous toluene solution (2 ml) of 1-hexene (2.5 μl: 0.2 mol %) and a Grubbs I catalyst (4.1 mg: 0.05 mol %) was added to an anhydrous toluene solution (20 ml) of 5-(p-tBu-phenyl)bicyclo[2.2.1]-2-heptene (C) (2.26 g: 0.01 mol) having an endo/exo ratio of 50/50, and then stirred at room temperature for 20 hours. Consecutively, a viscous polymer solution was diluted with 100 ml of toluene, and then poured into 3000 ml of methanol to obtain a precipitate. The precipitate thus obtained was filtered. Next, the precipitate was dried by use of a vacuum drier, and 2.19 g (yield rate of 97%) of a ring-opening polymer of the C (pC) was obtained. The obtained product was examined by GPC, and it was found that a polystyrene-conversion weight average molecular weight (Mw) was 113000, and Mw/Mn was 1.4.

<Polymerization of Norbornene Monomer D>

Under a nitrogen atmosphere, an anhydrous toluene solution (2 ml) of 1-hexene (2.5 μl: 0.2 mol %) and a Grubbs I catalyst (4.1 mg: 0.05 mol %) was added to an anhydrous toluene solution (20 ml) of 5-(p-tBu-phenyl)bicyclo[2.2.1]-2-heptene (D) (2.26 g: 0.01 mol) having an endo/exo ratio of 24/76, and then stirred at room temperature for 20 hours. Consecutively, a viscous polymer solution was diluted with 100 ml of toluene, and then poured into 3000 ml of methanol to obtain a precipitate. The precipitate thus obtained was filtered. Next, the precipitate was dried by use of a vacuum drier, and 1.74 g (yield rate of 77%) of a ring-opening polymer of the D (pD) was obtained. The obtained product was examined by GPC, and it was found that a polystyrene-conversion weight average molecular weight (Mw) was 129000, and Mw/Mn was 1.7.

<Hydrogenation of Ring-Opening Polymer (pC) of Norbornene Monomer C>

To an autoclave having a capacity of 0.2 L, 2.0 g of the ring-opening polymer of 5-(p-tBu-phenyl)bicyclo[2.2.1]-2-heptene (pC) having an endo/exo ratio of 50/50, xylene (150 ml), and RuHCl(CO)(PPh$_3$)$_3$ (20 mg) were fed, and nitrogen substitution was carried out. Consecutively, under conditions of a hydrogen gas pressure of 10 MPa and a reaction temperature of 165° C., a hydrogenation reaction was performed by 30-hour heating, thereafter the obtained reaction solution was cooled down, and then the pressure of the hydrogen gas was discharged. Next, the reaction solution was poured into 3000 ml of methanol, and a precipitate was separated and collected. The obtained precipitate was dried, and 1.96 g (yield rate of 98%) of hydrogenated ring-opening polymer of 5-(p-tBu-phenyl)bicyclo[2.2.1]-2-heptene (HpC) having an endo/exo ratio of 50/50 was obtained.

Figure 3:
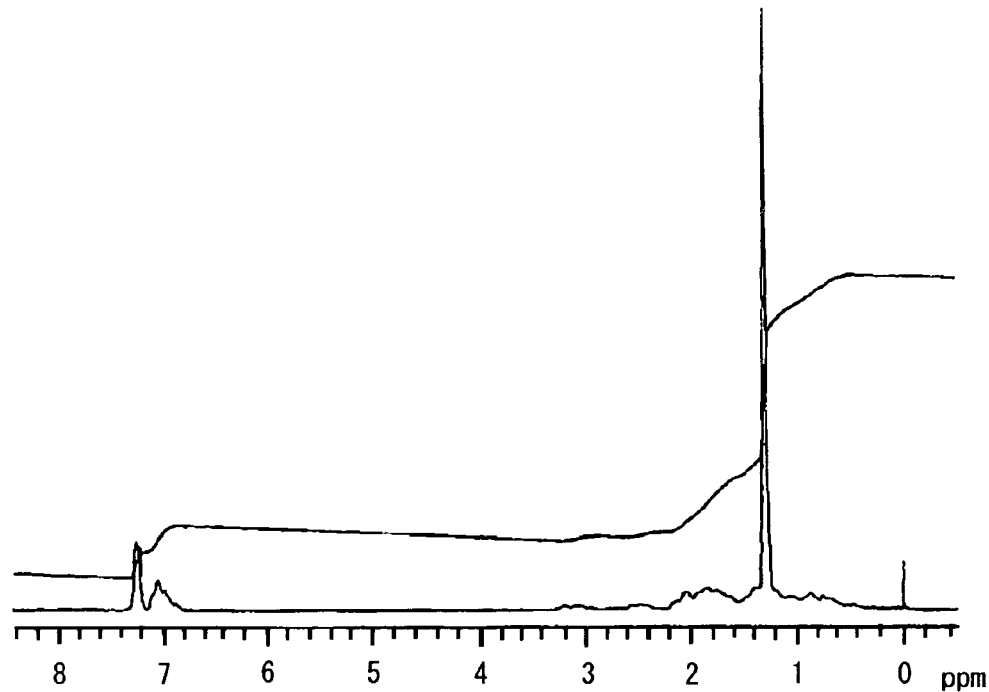
FIG. 3 is an NMR chart of a hydrogenated norbornene ring-opening polymer (HpC) obtained in Synthesis Example 2.

The product thus obtained was examined by GPC, and it was found that a polystyrene-conversion weight average molecular weight (Mw) was 112000, and Mw/Mn was 1.5. A hydrogenation ratio of olefinic unsaturated bonds was measured by using NMR for the obtained product, and it was observed to be 99.9%. Note that, since the signal from aromatic ring did not change, it was observed that the aromatic ring was not substantially hydrogenated. The obtained NMR chart is shown in FIG. 3. In addition, according to a result of measurement of Tg using DSC, Tg was 107° C.

<Hydrogenation of Ring-Opening Polymer (pD) of Norbornene Monomer D>

To an autoclave having a capacity of 0.2 L, 2.0 g of the ring-opening polymer of 5-(p-tBu-phenyl)bicyclo[2.2.1]-2-heptene (pD) having an endo/exo ratio of 24/76, xylene (150 ml), and RuHCl(CO)(PPh$_3$)$_3$ (20 mg) were fed, and nitrogen substitution was carried out. Consecutively, under conditions of a hydrogen gas pressure of 10 MPa and a reaction temperature of 165° C., a hydrogenation reaction was performed by 30-hour heating, thereafter the obtained reaction solution was cooled down, and then the pressure of the hydrogen gas was discharged. Next, the reaction solution was poured into 3000 ml of methanol, and a precipitate was separated and collected. The obtained precipitate was dried, and 1.70 g (yield rate of 85%) of hydrogenated ring-opening polymer of 5-(p-tBu-phenyl)bicyclo[2.2.1]-2-heptene (HpD) having an endo/exo ratio of 24/76 was obtained.

Figure 4:
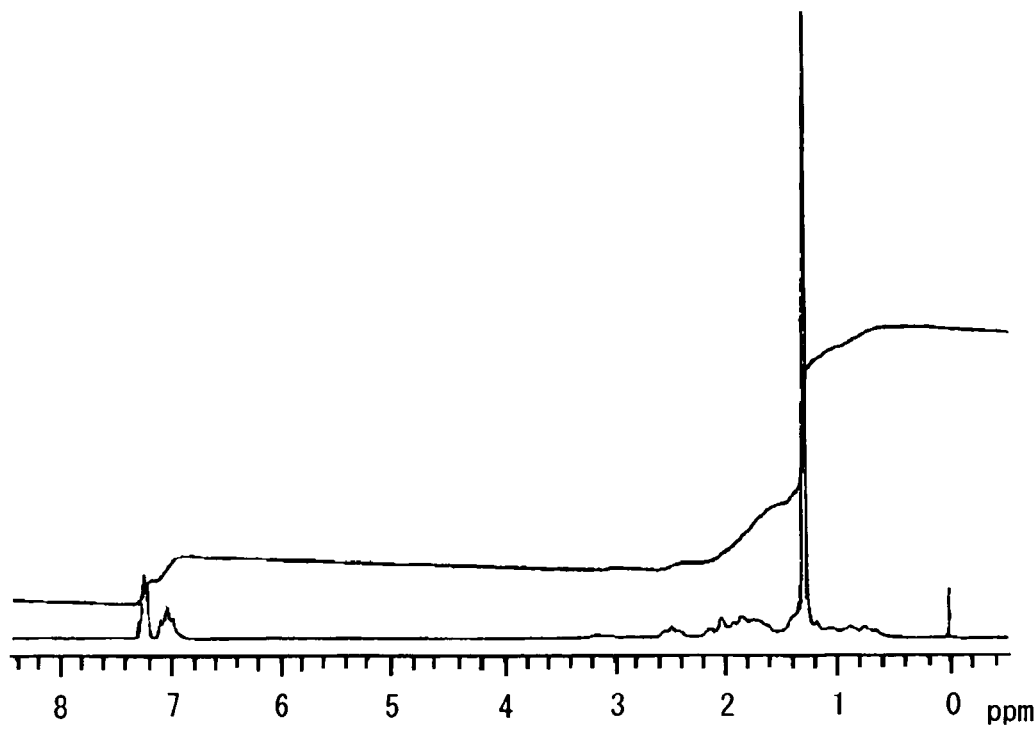
FIG. 4 is an NMR chart of a hydrogenated norbornene ring-opening polymer (HpD) obtained in Synthesis Example 2.

The obtained product was examined by GPC, and it was found that a polystyrene-conversion weight average molecular weight (Mw) was 117000, and Mw/Mn was 1.5. A hydrogenation ratio of olefinic unsaturated bonds was measured by using NMR for the obtained product, and it was observed to be 99.9%. Note that, since the signal from aromatic ring did not change, it was observed that the aromatic ring was not substantially hydrogenated. The obtained NMR chart is shown in FIG. 4. In addition, according to a result of measurement of Tg using DSC, Tg was 105° C.

Synthesis Example 3

Synthesis of Exo-Norbornene Monomer E>

In reference to methods described in Angew. Chem. Int. Ed., 39, p1946 (issued in 2000) and ibid., 34, p1844 (issued in 1995), an exo-norbornene monomer E was synthesized. Firstly, 4-tBu-iodobenzene (5 g: 19.22 mmol), dinorbornadiene (5.66 g: 61.50 mmol), trans-di(μ-acetonato)bis[o-(di-o-tolyl-phosphino)benzyl]dipalladium (II) (90 mg: 0.5 mol %), DMSO (82 ml), NEt$_3$ (6.22 g: 61.5 mmol), and formic acid (2.26 g: 49.2 mmol) were put into a 0.3 L three-neck flask, and heated while being stirred at 120° C. for 16 hours. Next, the obtained reaction solution was cooled down, then poured into 300 ml of ice water, and then subjected to extraction with n-hexane using a separating funnel (50 ml×3 times). Thereafter, the n-hexane solution was washed with a saturated saline solution, and then dried with anhydrous magnesium sulfate. By filtering and concentrating the extraction liquid, 3.62 g of a crude product was obtained. Consecutively, the obtained crude product was purified by distillation, and a fraction E at 104° C./1 mmHg was obtained. The yield of the fraction E was 2.45 g (yield rate of 55%). According to results of gas chromatographic analysis and NMR analysis performed on the fraction E, it was confirmed to be 5-(p-tBu-phenyl)bicyclo[2.2.1]-2-heptene having an endo/exo ratio (isomer ratio) of 0/100.

<Polymerization of Norbornene Monomer E>

Under a nitrogen atmosphere, an anhydrous toluene solution (2 ml) of 1-hexene (7.5 μl: 0.6 mol %) and a Grubbs I catalyst (4.7 mg: 0.05 mol %) was added to an anhydrous toluene solution (23 ml) of 5-(p-tBu-phenyl)bicyclo[2.2.1]-2-heptene (E) (2.61 g: 11.6 mmol) having an endo/exo ratio of 0/100, and then stirred at room temperature for 20 hours. Consecutively, a viscous polymer solution was diluted with 200 ml of toluene, and then poured into 3000 ml of methanol to obtain a precipitate. The precipitate thus obtained was filtered. Next, the precipitate was dried by use of a vacuum drier, and 2.28 g (yield rate of 87%) of a ring-opening polymer of the E (pE) was obtained. The obtained product was examined by GPC, and it was found that a polystyrene-conversion weight average molecular weight (Mw) was 174000, and Mw/Mn was 2.4.

<Hydrogenation of Ring-Opening Polymer (pE) of Norbornene Monomer E>

To an autoclave having a capacity of 0.2 L, 2.3 g of the ring-opening polymer of 5-(p-tBu-phenyl)bicyclo[2.2.1]-2-heptene (pE) having an endo/exo ratio of 0/100, xylene (150 ml), and RuHCl(CO)(PPh$_3$)$_3$ (23 mg) were fed, and nitrogen substitution was carried out. Consecutively, under conditions of a hydrogen gas pressure of 10 MPa and a reaction temperature of 165° C., a hydrogenation reaction was performed by 30-hour heating, thereafter the obtained reaction solution was cooled down, and then the pressure of the hydrogen gas was discharged. Next, the reaction solution was poured into 2000 ml of methanol, and a precipitate was separated and collected. The obtained precipitate was dried, and 2.0 g (yield rate of 89%) of hydrogenated ring-opening polymer of 5-(p-tBu-phenyl)bicyclo[2.2.1]-2-heptene (HpE) having an endo/exo ratio of 0/100 was obtained.

Figure 5:
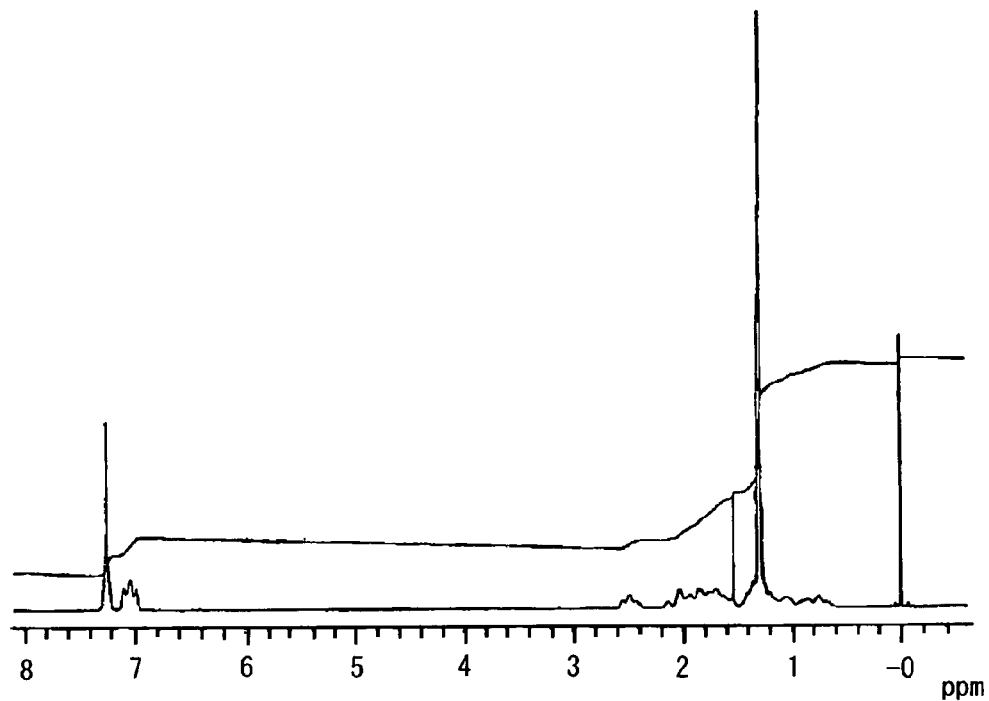
FIG. 5 is an NMR chart of a hydrogenated norbornene ring-opening polymer (HpE) obtained in Synthesis Example 3.

The product thus obtained was examined by GPC, and it was found that a polystyrene-conversion weight average molecular weight (Mw) was 173900, and Mw/Mn was 2.4. A hydrogenation ratio of olefinic unsaturated bonds was measured by using NMR for the obtained product, and it was observed to be 99.9%. Note that, since the signal from aromatic ring did not change, it was observed that the aromatic ring was not substantially hydrogenated. The obtained NMR chart is shown in FIG. 5. In addition, according to a result of measurement of Tg using DSC, Tg was 108° C.

Synthesis Example 4

Synthesis of Norbornene Monomer F>

(i) Synthesis of Cinnamic Acid Phenyl Ester

To a 1-L three-neck flask, under a nitrogen gas stream, trans-cinnamic acid chloride (100 g, 0.60 mol), phenol (59.3 g, 0.63 mol), and THF (500 ml) were fed, and a THF solution (100 ml) of triethylamine (63.8 g, 0.63 mol) were added dropwise using a dripping funnel while being chilled with ice. After the completion of dropwise addition, 12-hour stirring was performed at room temperature, and the reaction solution was poured into water. The obtained white precipitate was filtered and dried under reduced pressure, and thereafter the yield was 135.5 g (yield rate of 99.9%). This was dissolved into approximately 200 ml of methanol by heating, and then cooled. As a result, white crystal was obtained (112.6 g, yield rate of 83.8%). Note that, the obtained crystal was confirmed to be a target trans-cinnamic acid phenyl ester by NMR structural analysis.

(ii) Synthesis of Norbornene Monomer F

Trans-cinnamic acid phenyl ester obtained as described above (112 g, 0.5 mol), dicyclopentadiene (36.4 g, 0.55 mol), and toluene (100 ml) were put into an autoclave having a capacity of 0.3 L, and heated while being stirred at 180° C. for 4 hours. Then, after the termination of heating, the autoclave was opened after its temperature was naturally lowered to room temperature, and a reactant was taken out. Next, the reactant was concentrated, and a part (1.2 g) of the concentrate was separated and purified by a recycle preparative HPLC (LC-918 manufactured by Japan Analytical Industry, Co., Ltd.) to obtain 0.58 g (reaction yield rate of 40%) of a target 5-phenyl-6-carboxylphenylbicyclo[2.2.1]-2-heptene (norbornene monomer F: a compound indicated by the following chemical formula (6):

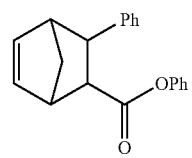

(6)

was obtained (a number of recycling of 7).

Furthermore, such a preparative isolation operation was repeated 4 times, and 2.7 g of the target was obtained. The target thus obtained was a mixture having an isomer ratio endo/exo ratio of 60/40 according to a result of structural analysis by NMR.

<Polymerization of Norbornene Monomer F>

Under a nitrogen atmosphere, an anhydrous THF solution (5 ml) of a Grubbs II catalyst (3.9 mg: 0.05 mol %) was added to an anhydrous THF solution (25 ml) of 5-phenyl-6-carboxyphenyl bicyclo[2.2.1]-2-heptene (F) (2.67 g: 9.2 mmol) having an endo/exo ratio of 60/40, and then stirred at room temperature for 20 hours. Consecutively, a viscous polymer solution was diluted with 200 ml of THF, and then poured into 3000 ml of methanol to obtain a precipitate. The precipitate thus obtained was filtered. Next, the precipitate was dried by use of a vacuum drier, and 2.3 g (yield rate of 87%) of a ring-opening polymer (pF) of 5-phenyl-6-carboxyphenyl bicyclo[2.2.1]-2-heptene (F) was obtained. The obtained product was examined by GPC, and it was found that a polystyrene-conversion weight average molecular weight (Mw) was 3096000, and Mw/Mn was 2.7.

<Hydrogenation of Ring-Opening Polymer (pF) of Norbornene monomer F>

To an autoclave having a capacity of 0.2 L, 2.20 g of the ring-opening polymer of 5-phenyl-6-carboxyphenyl bicyclo[2.2.1]-2-heptene (pF), xylene (150 ml), and RuHCl(CO)(PPh$_3$)$_3$ (22 mg) were fed, and nitrogen substitution was carried out. Consecutively, under conditions of a hydrogen gas pressure of 10 MPa and a reaction temperature of 165° C., a hydrogenation reaction was performed by 30-hour heating, thereafter the obtained reaction solution was cooled down, and then the pressure of the hydrogen gas was discharged. Next, the obtained reaction solution was poured into 3000 ml of methanol, and a precipitate was separated and collected. The obtained precipitate was dried, and 1.97 g (yield rate of 89.5%) of hydrogenated ring-opening polymer of 5-phenyl-6-carboxyphenyl bicyclo[2.2.1]-2-heptene (HpF) was obtained.

Figure 6:
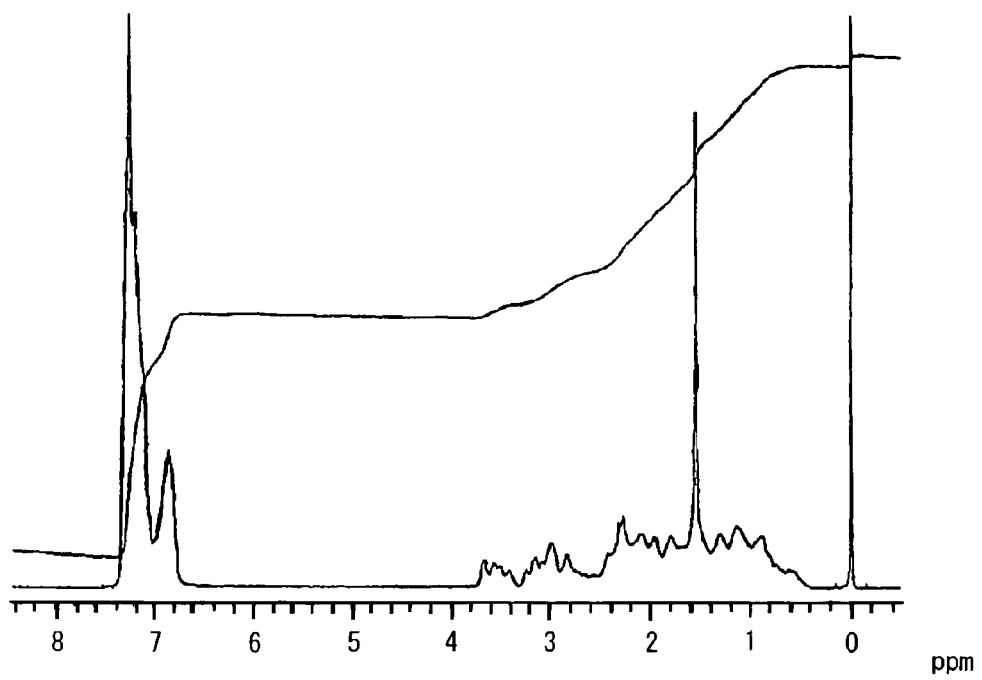
FIG. 6 is an NMR chart of a hydrogenated norbornene ring-opening polymer (HpF) obtained in Synthesis Example 4.

The product thus obtained was examined by GPC, and it was found that a polystyrene-conversion weight average molecular weight (Mw) was 3920000, and Mw/Mn was 1.8. A hydrogenation ratio of olefinic unsaturated bonds was measured by using NMR for the obtained product, and it was observed to be 99.9%. Note that, since the signal from aromatic ring did not change, it was observed that the aromatic ring was not substantially hydrogenated. The obtained NMR chart is shown in FIG. 6. In addition, according to a result of measurement of Tg using DSC, Tg was 103° C.

Examples 1 to 7 and Comparative Example 1

Norbornene-based ring-opening polymers obtained in Synthesis Examples 1 to 4 {HpA (Example 1), HpB (Comparative Example 1), HpC (Example 2), HpD (Example 3), HpE (Example 4), HpF (Example 5)} were respectively used to prepare retardation films (Examples 1 to 5) of the present invention and retardation film (Comparative Example 1). Furthermore, HpG (Example 6) produced from a polymer solution blend of HpA (0.925 g) and HpC (0.695 g) and HpH (Example 7) produced from a polymer solution blend of HpC (0.462 g) and HpD (0.420 g) were respectively used to prepare retardation films (Examples 6 to 7). To be more specific, firstly, chlorobenzene solutions containing the respective polymers at a concentration of 5 wt % were prepared, each of those were flow-casted on a glass plate to form a film by a casting method, and dried naturally for 24 hours. Consecutively, each of obtained films was detached from the glass plate, and then dried until a residual solvent concentration of 1.0% by weight or below was achieved by use of a vacuum drier maintained at a temperature near Tg of the polymer used as a material of the film (Tg of the respective polymers −10° C.). All the films thus obtained had sufficiently high transparency. The thicknesses of the obtained films were in a range from 30 to 150 μm. Next, the obtained films were each cut into strips (size: 5.0×4.0 cm), and 200% (2.0-fold) uniaxial stretching was performed at a temperature condition of Tg of the polymer used as a material of the film +10° C. at a stretching speed of 50 mm/minute by using a biaxial stretching apparatus (product name "SS-60 model" manufactured by Shibayama Scientific Co., Ltd.), and the retardation films (Examples 1 to 7) of the present invention and retardation film (Comparative Example 1) were obtained.

<Evaluation of Optical Characteristics of Retardation Films Obtained in Examples 1 to 7 and Comparative Example 1>

Birefringence of the retardation films obtained in Examples 1 to 7 and Comparative Example 1 was measured by using a retardation measuring device. Obtained results are shown in Table 1. Here, refractive index was measured by using a product name "2010 Prism Coupler" manufactured by Metricon Corporation. With a stretching direction in the uniaxial stretching of film defined as X-axis, and directions orthogonal to the X-axis defined as Y-axis and Z-axis (Y-axis and Z-axis were also orthogonal), a refractive index of X-axis (Nx), a refractive index of Y-axis (Ny), and a refractive index of Z-axis (Nz) were measured.

Figure 7:
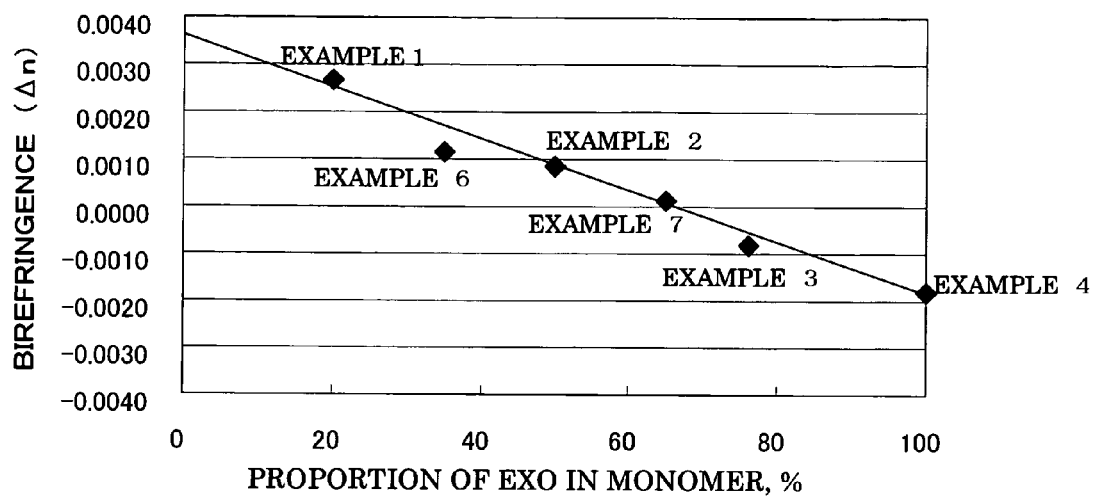
FIG. 7 is a graph illustrating the relationship between an exo proportion and birefringence in stretched films respectively obtained in Example 1 to 4, and Examples 6 to 7.
Figure 8:
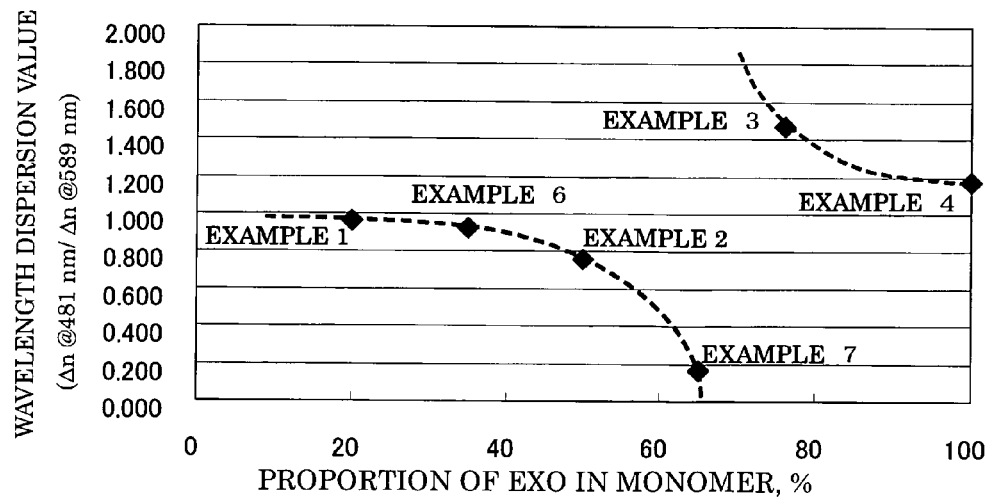
FIG. 8 is a graph illustrating the relationship between an exo proportion and a wavelength dispersion value of birefringence in stretched films respectively obtained in Example 1 to 4, and Examples 6 to 7.

Meanwhile, as for the retardation films obtained in Example 1 to 4, and Examples 6 to 7, a graph illustrating the relationship between a ratio of exo-isomer contained and birefringence is shown in FIG. 7. Furthermore, as for the retardation films obtained in Example 1 to 4, and Examples 6 to 7, a graph illustrating the relationship between a ratio of exo-isomer contained and a wavelength dispersion value {D=(Δn: λ481 nm)/(Δn: λ589 nm)} is shown in FIG. 8.

TABLE 1

| | Retardation (nm) | Nx | Ny | Nz | Film thickness μm | Wavelength dispersion value D*[1] | Endo/exo ratio of monomer |
|---|---|---|---|---|---|---|---|
| Example 1 (HpA) | 73.2 | 1.544 | 1.541 | 1.541 | 40 | 0.94 | 80/20 |
| Comparative Example 1 (HpB) | 296.4 | 1.521 | 1.516 | 1.516 | 65 | 1.04 | 100/0*[2] |
| Example 2 (HpC) | 26.3 | 1.543 | 1.542 | 1.542 | 31 | 0.76 | 50/50 |
| Example 3 (HpD) | 15.7 | 1.543 | 1.544 | 1.544 | 50 | 1.41 | 24/76 |
| Example 4 (HpE) | 108.2 | 1.541 | 1.543 | 1.543 | 60 | 1.17 | 0/100 |
| Example 5 (HpF) | 130.2 | 1.600 | 1.596 | 1.596 | 31 | 1.02 | 60/40 |
| Example 6 (HpG) | 116.6 | 1.545 | 1.543 | 1.543 | 99 | 0.91 | 65/35 |
| Example 7 (HpH) | 11.1 | 1.544 | 1.544 | 1.544 | 97 | 0.16 | 35/65 |

*[1]Δn @481 nm/Δn @589 nm
*[2]endo-endo/endo-exo ratio

As apparent from the results shown in Table 1 and FIG. 7, the retardation films obtained in respective Examples were confirmed to function well as a retardation film. Furthermore, as for the retardation films of HpD and HpE (Examples 3 and 4), since the relationship expressed by the following formula (2):

$$Ny=Nz>Nx \qquad (2)$$

was satisfied, they were confirmed to be able to function as a so-called negative A retardation film.

Furthermore, as apparent from the results shown in FIG. 8, a wavelength dispersion value of birefringence {D=(Δn: λ481 nm)/(Δn: λ589 nm)} of each of the retardation films was observed to vary according to the end/exo ratio of the monomer. The retardation films obtained in Examples 1, 2, 6, and 7 were each observed to be a reverse dispersion retardation film.

<Evaluation of Adhesion of the Retardation Films Obtained in Examples 1 to 7 and Comparative Example 1>

The retardation films respectively obtained in Examples 1 to 7 and Comparative Example 1 were each caused to attach to the surface of a triacetyl cellulose substrate by use of an ultraviolet hardening-type adhesive agent (UVX-1620 manufactured by Toagosei Co., Ltd.), and their adhesion was evaluated based on the method described in JIS-K5400. All the retardation films were observed to have an extremely high adhesiveness to the triacetyl cellulose films.

Synthesis Example 5

1-Synthesis of Norbornene Monomer I>

Under an nitrogen atmosphere, 2-dicyclohexyl phosphino-2'-methylbiphenyl (258 mg: 0.708 mmol), palladium acetate (13.3 mg: 0.059 mmol), DMSO (250 ml), norbornadiene (19 ml: 190 mmol), 4-tBu-bromobenzene (10 ml: 59 mmol), NEt$_3$ (26.7 ml: 192 mmol), and formic acid (5.9 ml: 154 mmol) were put into a 1.0-L three-neck flask, and heated while being stirred at a temperature condition of 80° C. for 6 hours to obtain a reaction solution. Next, the reaction solution was cooled down to 30° C., poured into 300 ml of ice water, and thereafter subjected to extraction with n-hexane (50 ml×3 times) using a separation funnel to obtain an n-hexane solution. Then, the n-hexane solution was washed with water and a saturated saline solution, and thereafter dried with anhydrous magnesium sulfate to obtain an extract liquid. Then, the extract liquid was filtered and concentrated to obtain 13.4 g of a crude product.

Next, the crude product was purified by distillation, and then a fraction (product) of 104° C./1 mmHg was obtained. The yield of such a product was 10.7 g (yield rate of 80%). According to the results of gas chromatographic analysis and NMR analysis, the obtained product was confirmed to be exo-5-(p-tBu-phenyl)bicyclo[2.2.1]-2-heptene (norbornene monomer I: a compound represented by the following chemical formula (7)) having an endo/exo ratio (isomer ratio) of 0/100.

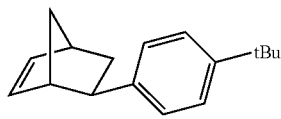

(7)

Synthesis Example 6

2-Synthesis of Norbornene Monomer I

Under an nitrogen atmosphere, 2-(dicyclohexyl phosphino)biphenyl (248 mg: 0.708 mmol), palladium acetate (13.3 mg: 0.059 mmol), DMSO (250 ml), norbornadiene (19 ml: 190 mmol), 4-tBu-bromobenzene (10 ml: 59 mmol), NEt$_3$ (26.7 ml: 192 mmol), and formic acid (5.9 ml: 154 mmol) were put into a 1.0-L three-neck flask, and heated while being stirred at a temperature condition of 80° C. for 8 hours to obtain a reaction solution. Next, the reaction solution was cooled down to 30° C., poured into 300 ml of ice water, and thereafter subjected to extraction with n-hexane (50 ml×3 times) using a separation funnel to obtain an n-hexane solution. Thereafter, the n-hexane solution was washed with water and a saturated saline solution, and thereafter dried with anhydrous magnesium sulfate to obtain an extract liquid. Then, the extract liquid was filtered and concentrated to obtain 13.8 g of a crude product.

Next, the crude product was purified by distillation, and then a fraction (product) of 104° C./1 mmHg was obtained. The yield of such a product was 11.2 g (yield rate of 84%). According to the results of gas chromatographic analysis and NMR analysis, the obtained product was confirmed to be exo-5-(p-tBu-phenyl)bicyclo[2.2.1]-2-heptene (norbornene monomer I) having an endo/exo ratio (isomer ratio) of 0/100.

Synthesis Example 7

1-Copolymerization of Norbornene Monomer I and Tetracyclo[4.4.1$^{2,5}$.1$^{7,10}$.0]-3-dodecene (norbornene Monomer J)

Under a nitrogen atmosphere, an anhydrous toluene solution (23 ml) containing the norbornene monomer I (1.70 g: 7.5 mmol) obtained in Synthesis Example 5 and a norbornene monomer J (0.40 g: 2.5 mmol) represented by the following chemical formula (8):

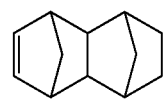

(8)

was prepared. To the anhydrous toluene solution, an anhydrous toluene solution (2 ml) containing 1-hexene (7.5 μl: 0.6 mol %) and a Grubbs I catalyst (4.1 mg: 0.05 mol %) was added, and it was stirred at room temperature (25° C.) for 20 hours to obtain a polymer solution. Consecutively, the obtained viscous polymer solution was diluted with 200 ml of toluene, and poured into 3000 ml of methanol to obtain a precipitate. The obtained precipitate was filtered. Then, the precipitate was dried by use of a vacuum drier, and 1.71 g (yield rate of 82%) of a ring-opening copolymer (pI) of the norbornene monomer I and the norbornene monomer J was obtained. The obtained copolymer (pI) was examined by GPC, and it was found that a polystyrene-conversion weight average molecular weight (Mw) was 290000 and Mw/Mn was 4.9.

<Hydrogenation of Ring-Opening Copolymer (pI) of Norbornene Monomer I and Norbornene Monomer J>

To an autoclave having a capacity of 0.2 L, pI (1.68 g), xylene (150 ml), and RuHCl(CO) (PPh$_3$)$_3$ (8.5 mg: 0.5% by mass) were fed, and nitrogen substitution was carried out. Consecutively, under conditions of a hydrogen gas pressure of 10 MPa and a reaction temperature of 165° C., a hydrogenation reaction was performed by 30-hour heating, and thereafter the obtained reaction solution was cooled down to 30° C., and then the pressure of the hydrogen gas was discharged. Next, this reaction solution was poured into 2000 ml of methanol, and a precipitate was separated and collected. The obtained precipitate was dried, and 1.4 g (yield rate of 81%) of a hydrogenated pI (copolymer (HpI)) was obtained.

Figure 9:
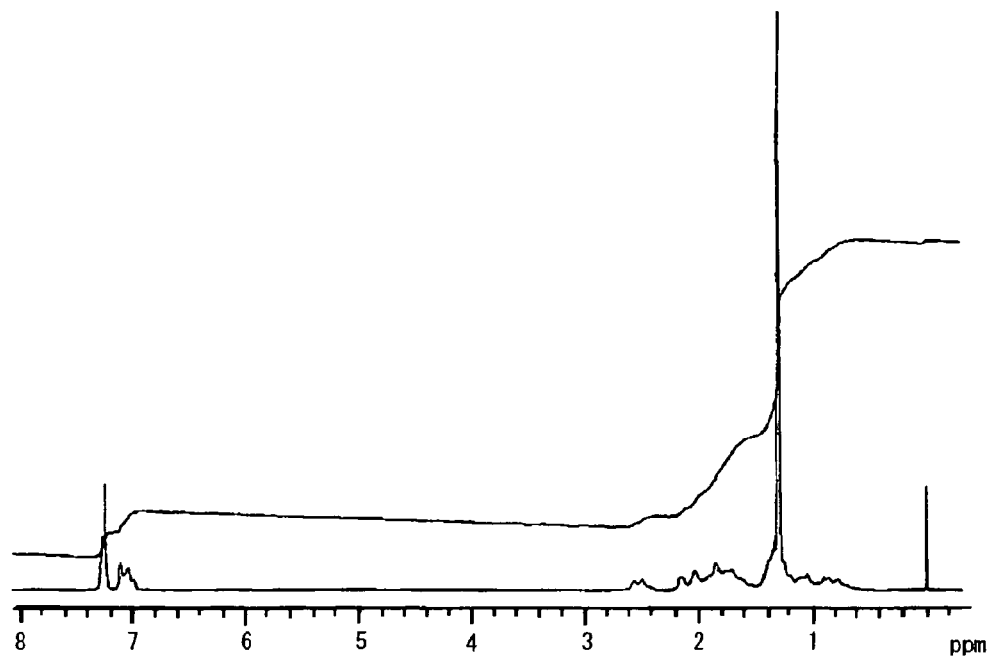
FIG. 9 is an NMR chart of a hydrogenated norbornene ring-opening polymer (HpI) obtained in Synthesis Example 7.

The copolymer (HpI) thus obtained was examined by GPC, and it was found that a polystyrene-conversion weight average molecular weight (Mw) was 263000, and Mw/Mn was 4.5. According to a result of measurement of Tg using DSC, Tg was 123° C. Furthermore, a hydrogenation ratio of olefinic unsaturated bonds was measured by using NMR for the obtained copolymer (HpI). An obtained NMR chart is shown in FIG. 9. As apparent from the result shown in FIG. 9, the hydrogenation ratio of olefinic unsaturated bonds in the obtained copolymer (HpI) was observed to be 99.9%. In addition, in the obtained copolymer (HpI), since the signal from aromatic ring did not change, it was observed that the aromatic ring of the side-chain was not substantially hydrogenated.

Synthesis Example 8

2-Copolymerization of Norbornene Monomer I and Tetracyclo[$4.4.1^{2,5}.1^{7,10}$.0]-3-Dodecene (Norbornene Monomer J)

Under a nitrogen atmosphere, an anhydrous toluene solution (23 ml) containing the norbornene monomer I (1.13 g: 5.0 mmol) obtained in Synthesis Example 5 and the norbornene monomer J (0.80 g: 5.0 mmol) represented by the chemical formula (8) was prepared. To the anhydrous toluene solution, an anhydrous toluene solution (2 ml) containing 1-hexene (7.5 µl: 0.6 mol %) and a Grubbs I catalyst (4.1 mg: 0.05 mol %) was added, and it was stirred at room temperature for 20 hours to obtain a polymer solution. Consecutively, the obtained viscous polymer solution was diluted with 200 ml of toluene, and poured into 3000 ml of methanol to obtain a precipitate. The obtained precipitate was filtered. Then, the precipitate was dried by use of a vacuum drier, and 1.70 g (yield rate of 88%) of a ring-opening copolymer (pJ) of the norbornene monomer I and the norbornene monomer J. The obtained copolymer (pJ) was examined by GPC, and it was found that a polystyrene-conversion weight average molecular weight (Mw) was 160000 and Mw/Mn was 3.3.

<Hydrogenation of Ring-Opening Copolymer (pJ) of Norbornene Monomer I and Norbornene Monomer J>

To an autoclave having a capacity of 0.2 L, pJ (1.66 g), xylene (150 ml), and RuHCl(CO) (PPh$_3$)$_3$ (8.5 mg: 0.5% by mass) were fed, and nitrogen substitution was carried out. Consecutively, under conditions of a hydrogen gas pressure of 10 MPa and a reaction temperature of 165° C., a hydrogenation reaction was performed by 30-hour heating, and thereafter the obtained reaction solution was cooled down to 30° C., and then the pressure of the hydrogen gas was discharged. Next, the reaction solution was poured into 2000 ml of methanol, and a precipitate was separated and collected. The obtained precipitate was dried, and 1.6 g (yield rate of 98%) of a hydrogenated copolymer (pJ) (copolymer (HpJ)) was obtained.

Figure 10:
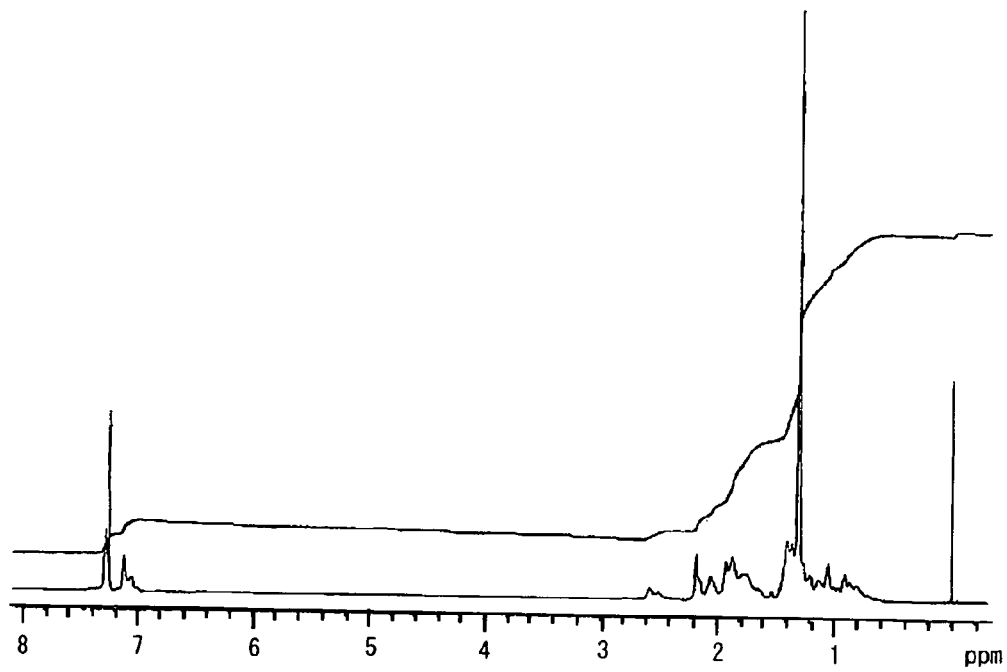
FIG. 10 is an NMR chart of a hydrogenated norbornene ring-opening polymer (HpJ) obtained in Synthesis Example 8.

The copolymer (HpJ) thus obtained was examined by GPC, and it was found that a polystyrene-conversion weight average molecular weight (Mw) was 131000, and Mw/Mn was 3.6. According to a result of measurement of Tg using DSC, Tg was 137° C. Furthermore, a hydrogenation ratio of olefinic unsaturated bonds was measured by using NMR for the obtained copolymer (HpJ). An NMR chart of the obtained copolymer (HpJ) is shown in FIG. 10. As apparent from the result shown in FIG. 10, the hydrogenation ratio of olefinic unsaturated bonds in the obtained hydrogenated compound (HpJ) was observed to be 99.9%. In addition, in the obtained hydrogenated compound (HpJ), since the signal from aromatic ring did not change, it was observed that the aromatic ring of the side-chain was not substantially hydrogenated.

Synthesis Example 9

3-Copolymerization of Norbornene Monomer I and Tetracyclo[$4.4.1^{2,5}.1^{7,10}$.0]-3-Dodecene (Norbornene Monomer J)

Under a nitrogen atmosphere, an anhydrous toluene solution (23 ml) containing the norbornene monomer I (0.57 g: 2.5 mmol) obtained in Synthesis Example 5 and the norbornene monomer J (1.20 g: 7.5 mmol) represented by the chemical formula (8) was prepared. To the anhydrous toluene solution (23 ml), an anhydrous toluene solution (2 ml) containing 1-hexene (7.5 µl: 0.6 mol %) and a Grubbs I catalyst (4.1 mg: 0.05 mol %) was added, and it was stirred at room temperature for 20 hours to obtain a polymer solution. Consecutively, the obtained viscous polymer solution was diluted with 200 ml of toluene, and poured into 3000 ml of methanol to obtain a precipitate. The obtained precipitate was filtered. Then, the precipitate was dried by use of a vacuum drier, and 1.70 g (yield rate of 96%) of a ring-opening copolymer (pK) of the norbornene monomer I and the norbornene monomer J was obtained. The obtained copolymer (pK) was examined by GPC, and it was found that a polystyrene-conversion weight average molecular weight (Mw) was 123000 and Mw/Mn was 2.6.

<Hydrogenation of Ring-Opening Copolymer (pK) of Norbornene Monomer I and Norbornene Monomer J>

To an autoclave having a capacity of 0.2 L, pK (1.66 g), xylene (150 ml), and RuHCl(CO) (PPh$_3$)$_3$ (8.5 mg: 0.5% by mass) were fed, and nitrogen substitution was carried out. Consecutively, under conditions of a hydrogen gas pressure of 10 MPa and a reaction temperature of 165° C., a hydrogenation reaction was performed by 30-hour heating, and thereafter the obtained reaction solution was cooled down to 30° C., and then the pressure of the hydrogen gas was discharged. Next, the reaction solution was poured into 2000 ml of methanol, and a precipitate was separated and collected. The obtained precipitate was dried, and 1.6 g (yield rate of 98%) of a hydrogenated pK (copolymer (HpK)) was obtained.

Figure 11:
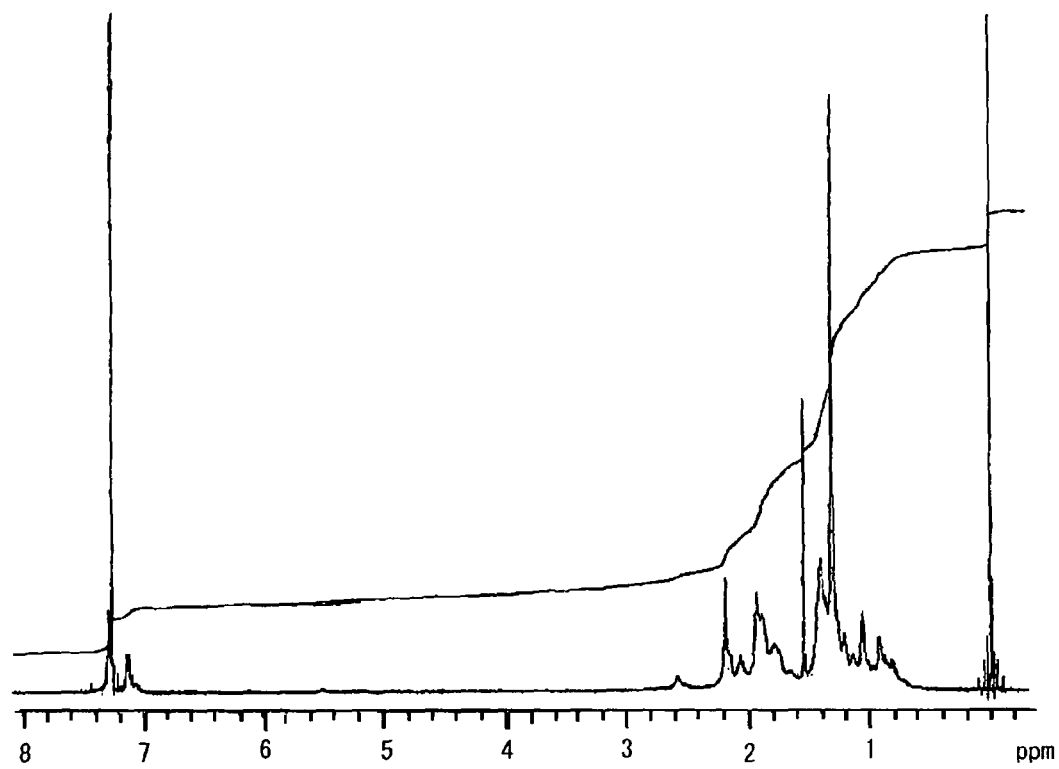
FIG. 11 is an NMR chart of a hydrogenated norbornene ring-opening polymer (HpK) obtained in Synthesis Example 9.

According to a result of measurement of Tg of the copolymer (HpK) thus obtained using DSC, Tg was 147° C. Furthermore, a hydrogenation ratio of olefinic unsaturated bonds was measured by using NMR for the copolymer (HpK). An obtained NMR chart is shown in FIG. 11. As apparent from the result shown in FIG. 11, the hydrogenation ratio of olefinic unsaturated bonds in the obtained copolymer (HpK) was observed to be 97.0%. In addition, in the obtained copolymer (HpK), since the signal from aromatic ring did not change, it was observed that the aromatic ring was not substantially hydrogenated.

Synthesis Example 10

4-Copolymerization of Norbornene Monomer I and Tetracyclo[$4.4.1^{2,5}.1^{7,10}$.0]-3-Dodecene (Norbornene Monomer J)

Firstly, under a nitrogen atmosphere, an anhydrous toluene solution (23 ml) containing the norbornene monomer I (1.98 g: 8.75 mmol) obtained in Synthesis Example 5 and the norbornene monomer J (0.20 g: 1.25 mmol) represented by the chemical formula (8) was prepared. To the anhydrous toluene solution, an anhydrous toluene solution (2 ml) containing 1-hexene (7.5 µl: 0.6 mol %) and a Grubbs I catalyst (4.1 mg: 0.05 mol %) was added, and it was stirred at room temperature for 20 hours to obtain a polymer solution. Consecutively, the obtained viscous polymer solution was diluted with 200 ml of toluene, and poured into 3000 ml of methanol to obtain a precipitate. The obtained precipitate was filtered. Then, the precipitate was dried by use of a vacuum drier, and 1.74 g (yield rate of 80%) of a ring-opening copolymer (pL) of the norbornene monomer I and the norbornene monomer J was obtained.

<Hydrogenation of Ring-Opening Copolymer (pL) of Norbornene Monomer I and Norbornene Monomer J>

To an autoclave having a capacity of 0.2 L, pL (1.66 g), xylene (150 ml), and RuHCl (CO) (PPh$_3$)$_3$ (8.5 mg: 0.5% by mass) were fed, and nitrogen substitution was carried out. Consecutively, under conditions of a hydrogen gas pressure of 10 MPa and a reaction temperature of 165° C., a hydrogenation reaction was performed by 30-hour heating, and thereafter the obtained reaction solution was cooled down to 30° C., and then the pressure of the hydrogen gas was discharged. Next, the reaction solution was poured into 2000 ml of methanol, and a precipitate was separated and collected. The obtained precipitate was dried, and 1.3 g (yield rate of 80%) of a hydrogenated pL (copolymer (HpL)) was obtained.

According to a result of measurement of Tg of the copolymer (HpL) thus obtained using DSC, Tg was 116° C. Furthermore, a hydrogenation ratio of olefinic unsaturated bonds was measured by using NMR for the obtained copolymer (HpL), and the hydrogenation ratio was observed to be 99.9%. In addition, in the obtained copolymer (HpL), since the signal from aromatic ring did not change, it was observed that the aromatic ring was not substantially hydrogenated.

Synthesis Example 11

5-Copolymerization of Norbornene Monomer I and Tetracyclo[4.4.1$^{2,5}$.1$^{7,10}$.0]-3-Dodecene (Norbornene Monomer J)

Firstly, under a nitrogen atmosphere, an anhydrous toluene solution (23 ml) containing the norbornene monomer I (2.15 g: 9.50 mmol) obtained in Synthesis Example 5 and the norbornene monomer J (0.08 g: 0.5 mmol) represented by the chemical formula (8) was prepared. To the anhydrous toluene solution, an anhydrous toluene solution (2 ml) containing 1-hexene (7.5 μl: 0.6 mol %) and a Grubbs I catalyst (4.1 mg: 0.05 mol %) was added, and it was stirred at room temperature for 20 hours to obtain a polymer solution. Consecutively, the obtained viscous polymer solution was diluted with 200 ml of toluene, and poured into 3000 ml of methanol to obtain a precipitate. The obtained precipitate was filtered. Then, the precipitate was dried by use of a vacuum drier, and 1.81 g (yield rate of 81%) of a ring-opening copolymer (pM) of the norbornene monomer I and the norbornene monomer J was obtained.

<Hydrogenation of Ring-Opening Copolymer (pM) of Norbornene Monomer I and Norbornene Monomer J>

To an autoclave having a capacity of 0.2 L, pM (1.66 g), xylene (150 ml), and RuHCl(CO) (PPh$_3$)$_3$ (8.5 mg: 0.5% by mass) were fed, and nitrogen substitution was carried out. Consecutively, under conditions of a hydrogen gas pressure of 10 MPa and a reaction temperature of 165° C., a hydrogenation reaction was performed by 30-hour heating, and thereafter the obtained reaction solution was cooled down to 30° C., and then the pressure of the hydrogen gas was discharged. Next, the reaction solution was poured into 2000 ml of methanol, and a precipitate was separated and collected. The obtained precipitate was dried, and 1.35 g (yield rate of 82%) of a hydrogenated pM (copolymer (HpM)) was obtained.

According to a result of measurement of Tg of the copolymer (HpM) thus obtained using DSC, Tg was 112° C. Furthermore, a hydrogenation ratio of olefinic unsaturated bonds was measured by using NMR for the obtained copolymer (HpM), and the hydrogenation ratio was observed to be 99.9%. In addition, in the obtained copolymer (HpM), since the signal from aromatic ring did not change, it was observed that the aromatic ring was not substantially hydrogenated.

Synthesis Example 12

1-Copolymerization of Norbornene Monomer 1 and 8-methoxycarbonyl-8-methyltetracyclo[4.4.0.1$^{2,5}$.1$^{7,10}$]-3-Dodecene (Norbornene Monomer K)

Firstly, under a nitrogen atmosphere, an anhydrous toluene solution (23 ml) containing the norbornene monomer I (1.13 g: 5.0 mmol) obtained in Synthesis Example 5 and a norbornene monomer K (1.16 g: 5.0 mmol: endo/exo ratio=79.2/20.8) represented by the following chemical formula (9):

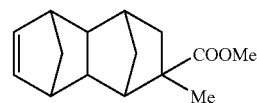

(9)

was prepared. To the anhydrous toluene solution (23 ml), an anhydrous toluene solution (2 ml) containing 1-hexene (7.5 μl: 0.6 mol %) and a Grubbs I catalyst (4.1 mg: 0.05 mol %) was added, and it was stirred at room temperature for 20 hours to obtain a polymer solution. Consecutively, the obtained viscous polymer solution was diluted with 200 ml of toluene, and poured into 3000 ml of methanol to obtain a precipitate. The obtained precipitate was filtered. Then, the precipitate was dried by use of a vacuum drier, and 1.88 g (yield rate of 82%) of a ring-opening copolymer (pN) of the norbornene monomer I and the norbornene monomer K was obtained. The obtained copolymer (pN) was examined by GPC, and it was found that a polystyrene-conversion weight average molecular weight (Mw) was 147000 and Mw/Mn was 4.5.

<Hydrogenation of Ring-Opening Copolymer (pN) of Norbornene Monomer I and Norbornene Monomer K>

To an autoclave having a capacity of 0.2 L, pN (1.68 g), xylene (150 ml), and RuHCl(CO) (PPh$_3$)$_3$ (8.5 mg: 0.5% by mass) were fed, and nitrogen substitution was carried out. Consecutively, under conditions of a hydrogen gas pressure of 10 MPa and a reaction temperature of 165° C., a hydrogenation reaction was performed by 30-hour heating, and thereafter the obtained reaction solution was cooled down, and then the pressure of the hydrogen gas was discharged. Next, the reaction solution was poured into 2000 ml of methanol, and a precipitate was separated and collected. The obtained precipitate was dried, and 1.36 g (yield rate of 81%) of a hydrogenated pN (copolymer (HpN)) was obtained.

The copolymer (HpN) thus obtained was examined by GPC, and it was found that a polystyrene-conversion weight average molecular weight (Mw) was 129000, and Mw/Mn was 4.1. According to a result of measurement of Tg of the copolymer (HpN) thus obtained using DSC, Tg was 147° C. Furthermore, a hydrogenation ratio of olefinic unsaturated bonds was measured by using NMR for the obtained copolymer (HpN), and the hydrogenation ratio was observed to be 99.9%. In addition, in the obtained copolymer (HpN), since the signal from aromatic ring did not change, it was observed that the aromatic ring was not substantially hydrogenated.

Comparative Synthesis Example 1

Polymerization of Tetracyclo[4.4.1$^{2,5}$.1$^{7,10}$.0]-3-Dodecene (Norbornene Monomer J)

Under a nitrogen atmosphere, an anhydrous toluene solution (2 ml) containing 1-hexene (75 µl: 6.0 mol %) and a Grubbs I catalyst (4.1 mg: 0.05 mol %) was added to an anhydrous toluene solution (23 ml) containing the norbornene monomer J (1.60 g: 10.0 mmol), and stirred at room temperature for 20 hours. However, the reaction system was heterogeneous, and a polymer was precipitated. The obtained polymer (pO) was insoluble to chloroform, THF, and the like.

Examples 8 to 13

The copolymers obtained in Synthesis Examples 7 to 12 {HpI obtained in Synthesis Example 7 (Example 8), HpJ obtained in Synthesis Example 8 (Example 9), HpK obtained in Synthesis Example 9 (Example 10), HpL obtained in Synthesis Example 10 (Example 11), HpM obtained in Synthesis Example 11 (Example 12), HpN obtained in Synthesis Example 12 (Example 13)} were respectively used to prepare the retardation film of the present invention (Examples 8 to 13).

To be more specific, firstly, chlorobenzene solutions containing the respective copolymers at a concentration of 5 wt % were prepared, each of those were flow-casted on a glass plate to form a film by a casting method, and dried naturally for 24 hours to obtain a film precursor. Consecutively, each of obtained film precursors was detached from the glass plate, and then dried until a residual solvent concentration of 1.0% by weight or below by use of a vacuum drier maintained at a temperature near Tg of the polymer used as a material of the film (Tg of the polymer −10° C.). Thereby films made of the respective copolymers were obtained. The films thus obtained each had a sufficiently high transparency. The thickness of the obtained films was in a range from 30 to 150 µm.

Next, the obtained films were each cut into strips (size: 5.0×4.0 cm), and 200% (2.0-fold) uniaxial stretching was performed at a temperature condition of Tg of the copolymer used as a material of the film +10° C. at a stretching speed of 50 mm/minute by using a biaxial stretching apparatus (product name "SS-60 model" manufactured by Shibayama Scientific Co., Ltd.), and the retardation films (Examples 8 to 13) of the present invention were obtained.

<Evaluation of Optical Characteristics of Retardation Films Obtained in Examples 8 to 13>

Birefringence of the retardation films obtained in Examples 8 to 13 was measured by using a retardation measuring device (product name "KOBRA21DH" manufactured by Oji Scientific Instruments). Refractive index was measured by using a product name "2010 Prism Coupler" manufactured by Metricon Corporation as refractive index measurement apparatus. With a stretching direction in the uniaxial stretching of film defined as X-axis, and directions orthogonal to the X-axis defined as Y-axis and Z-axis (Y-axis and Z-axis were also orthogonal), a refractive index of X-axis (Nx), a refractive index of Y-axis (Ny), and a refractive index of Z-axis (Nz) were measured. Obtained results are shown in Table 2.

TABLE 2

| | Retardation (nm) | Nx | Ny | Nz | Film thickness (µm) | Wavelength dispersion value D*[1] | Proportion of (fed)monomer I |
|---|---|---|---|---|---|---|---|
| Example 8 (HpI) | 12.4 | 1.538 | 1.537 | 1.537 | 79 | 0.16 | 75 |
| Example 9 (HpJ) | 197.9 | 1.536 | 1.534 | 1.534 | 93 | 0.94 | 50 |
| Example 10 (HpK) | 307.5 | 1.533 | 1.529 | 1.529 | 75 | 1.02 | 25 |
| Example 11 (HpL) | 78.3 | 1.540 | 1.541 | 1.541 | 87 | 1.47 | 87.5 |
| Example 12 (HpM) | 102.1 | 1.541 | 1.543 | 1.543 | 60 | 1.20 | 95 |
| Example 13 (HpN) | 49.5 | 1.549 | 1.549 | 1.549 | 99 | 0.71 | 50 |

*[1]Δn @481 nm/Δn @589 nm

Figure 12:
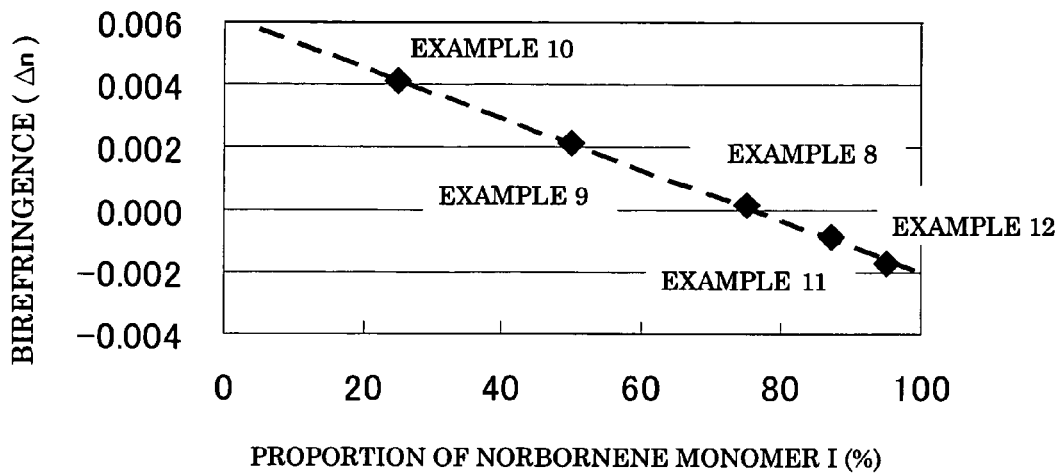
FIG. 12 is a graph illustrating the relationship between a copolymer proportion and birefringence in stretched films respectively obtained in Examples 8 to 12.
Figure 13:
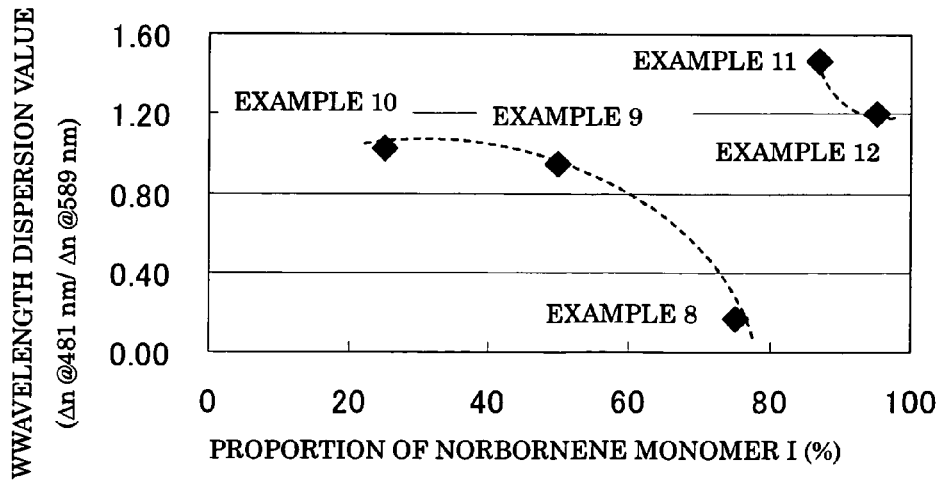
FIG. 13 is a graph illustrating the relationship between a copolymer proportion and a wavelength dispersion value of birefringence in stretched films respectively obtained in Examples 8 to 12.
Figure 14:
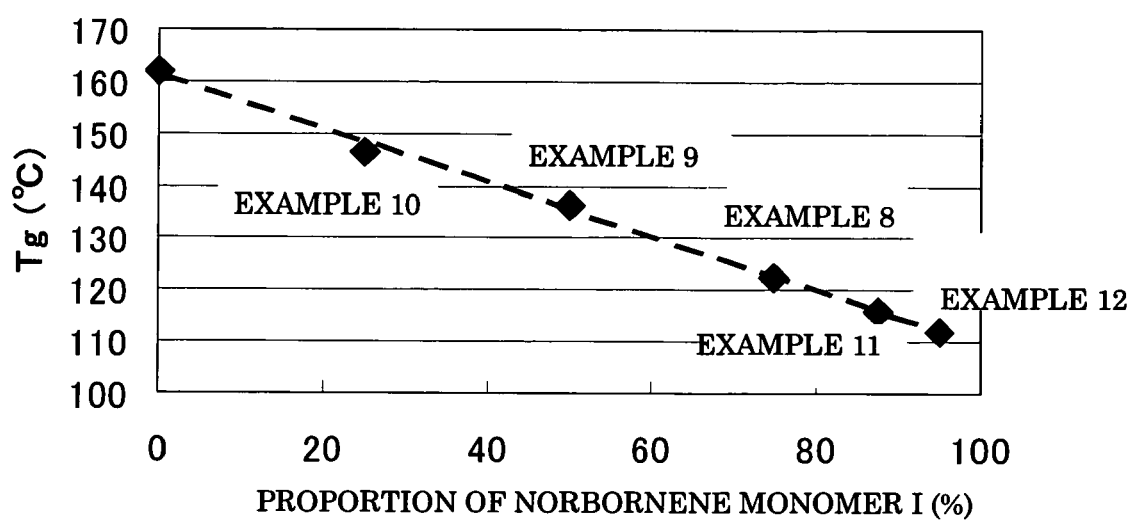
FIG. 14 is a graph illustrating the relationship between a copolymer proportion and Tg in stretched films respectively obtained in Examples 8 to 12.

Furthermore, for the retardation films obtained in Examples 8 to 12, a graph illustrating the relationship between a ratio of norbornene monomer I contained and birefringence is shown in FIG. 12. Furthermore, for the retardation films obtained in Examples 8 to 12, a graph illustrating the relationship between a ratio of the norbornene monomer I contained and a wavelength dispersion value {D=(Δn: λ481 nm)/(Δn: λ589 nm)} is shown in FIG. 13. In the meantime, for the retardation films obtained in Examples 8 to 12, a graph illustrating the relationship between a ratio of norbornene monomer I contained and Tg is shown in FIG. 14. In FIG. 14, Tg (162° C.) for the ratio of the norbornene monomers I and J (norbornene monomer I/norbornene monomer J) of 0/100 was quoted from Journal of the Chemical Society of Japan 1998, No. 2, page 81. Note that the norbornene monomer I has an endo/exo ratio (isomer ratio) of 0/100 in terms of the configuration of the aromatic ring of the side-chain.

As apparent from the results shown in Table 2 and FIG. 12, the retardation films obtained in respective Examples were confirmed to function well as a retardation film. Furthermore, as for the retardation film of HpL (Example 11) and the retardation film of HpM (Example 12), since the relationship expressed by the following relational expression (1):

$$Ny=Nz>Nx \qquad (1)$$

was satisfied, they were confirmed to be able to function as a so-called negative A retardation film.

Furthermore, as apparent from the results shown in FIG. 13, a wavelength dispersion value of birefringence {D=(Δn: λ481 nm)/(Δn: λ589 nm)} of each of the retardation film was confirmed to vary according to the copolymerization ratio. The retardation films obtained in Examples 8 and 9 were each confirmed to be a reverse dispersion retardation film.

<Evaluation of Adhesion of the Retardation Films Obtained in Examples 8 to 13>

The retardation films obtained in Examples 8 to 13 were each caused to attach to the surface of a triacetyl cellulose substrate by use of an ultraviolet hardening-type adhesive agent (UVX-1620 manufactured by Toagosei Co., Ltd.), and their adhesion was evaluated based on the method described in JIS-K5400. All the retardation films were confirmed to have an extremely high adhesiveness to the triacetyl cellulose films.

As described above, according to the present invention, it is possible to provide the retardation film which has, in a single layer, high transparency and excellent wave dispersion characteristics, is capable of providing a specific retardation to broadband light, has an extremely high adhesiveness to other materials, is capable of attaining optical characteristics as a negative A which are unique even among negative birefringence characteristics, and is also capable of giving reverse dispersion of birefringence wavelength dispersion characteristics. It is also possible to provide the liquid crystal display device using the same.

Hence, the retardation film of the present invention is especially useful as a ½λ plate, a ¼λ plate, a protection film, an antireflection film, and the like which are used in a liquid crystal display device and the like.

What is claimed is:

1. A retardation film, formed by stretching a film comprising
    a norbornene-based ring-opening polymer containing a structural unit (A) represented by the following general formula (1):

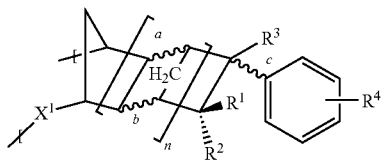

(1)

wherein
    n represents an integer of any one of 0 and 1,
    $X^1$ represents any one of a group represented by a formula: —CH═CH— and a group represented by a formula: —CH$_2$CH$_2$—,
    $R^1$, $R^2$, $R^3$, and $R^4$, which may be the same or different, each represent any one of atoms and groups selected from the group consisting of: a hydrogen atom; halogen atoms; substituted or unsubstituted hydrocarbon groups, each of which may include at least one linking group selected from the group consisting of an oxygen atom, a nitrogen atom, a sulfur atom, and a silicon atom, and which has 1 to 30 carbon atoms; and polar groups,
    wavy lines a and b each represent a configuration of any one of an endo and an exo, and
    a wavy line c represents a configuration of any one of an endo and an exo, wherein
    a content percentage of a structural unit (A-1), in which the wavy line c represents an exo configuration, among the structural units (A) is in a range from 20 mol % to 100 mol %.

2. The retardation film according to claim 1, wherein
    the content percentage of the structural unit (A-1), in which the wavy line c represents the exo configuration, among the structural units (A) is in a range from 20 mol % to 65 mol %, and
    the retardation film is a reverse dispersion retardation film.

3. The retardation film according to claim 1, wherein
    the content percentage of the structural unit (A-1), in which the wavy line c represents the exo configuration, among the structural units (A) is in a range between above 65 mol % and 100 mol % or less, and
    the retardation film is a negative A-plate retardation film.

4. The retardation film according to claim 3, wherein, when a stretching direction in uniaxial stretching of the film is defined as X-axis, and directions orthogonal to the X-axis are defined as Y-axis and Z-axis, an X-axis refractive index (Nx), a Y-axis refractive index (Ny), and a Z-axis refractive index (Nz) satisfy a relationship expressed by the following relational expression (1):

$$Ny=Nz>Nx \qquad (1).$$

5. The retardation film according to claim 1, wherein a content percentage of a structural unit, in which $X^1$ in the general formula (1) is a group represented by a formula: —CH$_2$CH$_2$—, to all the structural units in the norbornene-based ring-opening polymer is not less than 90 mol %.

6. The retardation film according to claim 1, wherein the norbornene-based ring-opening polymer is a norbornene-based ring-opening co-polymer containing a structural unit (A') represented by the following general formula (2):

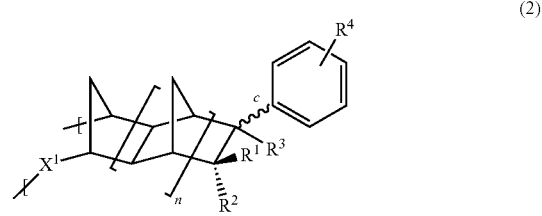

(2)

wherein
    n, $X^1$, $R^1$, $R^2$, $R^3$, $R^4$ and the wavy line c are respectively synonymous with n, $X^1$, $R^1$, $R^2$, $R^3$, $R^4$, and the wavy line c in the general formula (1) and a structural unit (B) represented by the following general formula (3):

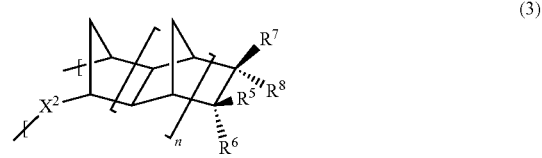

(3)

wherein:

n represents an integer of any one of 0 and 1;

$X^2$ represents any one of a group represented by a formula —CH=CH— and a group represented by a formula —CH$_2$CH$_2$—;

$R^5$, $R^6$, $R^7$, and $R^8$, which may be the same or different, each represent any one of atoms and groups selected from the group consisting of a hydrogen atom, halogen atoms, a cyano group, alkyl groups having 1 to 20 carbon atoms, alkenyl groups having 1 to 20 carbon atoms, alkyl carbonyl groups having 1 to 20 carbon atoms, and ester groups comprising a hydrocarbon group having 1 to 20 carbon atoms;

any two or more of $R^5$ to $R^8$ may link with each other to form any one of a monocyclic hydrocarbon, which may contain an unsaturated bond, having a number of 3 to 20 carbon atoms, and a polycyclic hydrocarbon, which may contain an unsaturated bond, having 4 to 20 carbon atoms; and $R^5$ and $R^6$ or $R^7$ and $R^8$ may form together an alkylidene group having a number of 1 to 20 carbon atoms.

7. The retardation film according to claim 6, wherein the norbornene-based ring-opening copolymer has a content percentage of a structure unit (A'-1), in which a configuration of a substituted or unsubstituted phenyl group in the general formula (2) is an exo configuration, among the structural units (A') being in a range not less than 90 mol %.

8. The retardation film according to claim 6, wherein a content percentage of a structural unit (A'-1), in which a configuration of a substituted or unsubstituted phenyl group in the general formula (2) is an exo configuration, to all structural units in the norbornene-based ring-opening copolymer is in a range from 40 mol % to less than 80 mol %, and the retardation film is a reverse dispersion difference film.

9. The retardation film according to claim 6, wherein a content percentage of the structural unit (A'-1), in which a configuration of a substituted or unsubstituted phenyl group in the general formula (2) is an exo configuration, to all the structural units in the norbornene-based ring-opening copolymer is in a range from 80 mol % to 99 mol %, and the retardation film is a negative A-plate retardation film.

10. The retardation film according to claim 9, wherein, when a stretching direction in uniaxial stretching of the film is defined as X-axis, and the directions orthogonal to the X-axis are defined as Y-axis and Z-axis, an X-axis refractive index (Nx), a Y-axis refractive index (Ny), and a Z-axis refractive index (Nz) satisfy a relationship expressed by the following relational expression (1):

$$Ny=Nz>Nx \qquad (1).$$

11. The retardation film according to claim 6, wherein a structural unit, in which $X^1$ in the general formula (2) is a group represented by a formula: —CH$_2$CH$_2$—, and a structural unit, in which $X^2$ in the general formula (3) is a group represented by a formula: —CH$_2$CH$_2$—, are contained at a percentage not less than 90 mol % to all structural units in the norbornene-based ring-opening polymer.

12. A liquid crystal display device comprising the retardation film according to claim 1.

* * * * *